(12) United States Patent
Kawaguchi et al.

(10) Patent No.: US 10,853,591 B2
(45) Date of Patent: *Dec. 1, 2020

(54) INTELLIGENT TRACKING SYSTEM AND METHODS AND SYSTEMS THEREFOR

(71) Applicant: CULVERT-IOT CORPORATION, Campbell, CA (US)

(72) Inventors: Dean Mamoru Kawaguchi, San Jose, CA (US); Alberto Vidal, San Jose, CA (US); Edward John Boling, Fremont, CA (US); Prasad Panchalan, San Jose, CA (US); Edward Maurice Farrell, Saratoga, CA (US)

(73) Assignee: CULVERT-IOT CORPORATION, Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/506,559

(22) Filed: Jul. 9, 2019

(65) Prior Publication Data

US 2020/0004996 A1 Jan. 2, 2020

Related U.S. Application Data

(63) Continuation of application No. PCT/US2019/034975, filed on May 31, 2019.
(Continued)

(51) Int. Cl.
*G06K 7/10* (2006.01)
*H04W 4/80* (2018.01)
(Continued)

(52) U.S. Cl.
CPC ....... *G06K 7/10158* (2013.01); *G06F 21/602* (2013.01); *G06F 21/74* (2013.01);
(Continued)

(58) Field of Classification Search
CPC .......... G06K 7/10158; G06K 7/10405; H04W 4/029; H04W 4/80; G06N 20/00; G06F 21/602; G06F 21/74
(Continued)

(56) References Cited

U.S. PATENT DOCUMENTS 5,456,779 A 10/1995 Sinha
5,599,205 A 2/1997 Cronin
(Continued)

FOREIGN PATENT DOCUMENTS

KR 2008-0031014 4/2008
WO 2009032637 A2 3/2009

OTHER PUBLICATIONS

PCT International Search Report and Written Opinion dated Dec. 20, 2019 for International Application No. PCT/US2019/034975, 22 pages.
(Continued)

*Primary Examiner* — Omar Casillashernandez
(74) *Attorney, Agent, or Firm* — Pillsbury Winthrop Shaw Pittman LLP

(57) ABSTRACT

An intelligent tracking system generally includes one or more tracking devices, some of which may be passive tracking devices. Each passive tracking device includes one or more transceivers and is energized by an energizing signal. Some of these passive tracking devices may operate in a first communication mode or a second communication mode based on the energizing signal. Some tracking devices may include encryption modules or authentication modules. Some of these devices may incorporate a bulk acoustic wave oscillator.

31 Claims, 20 Drawing Sheets

Related U.S. Application Data

(60) Provisional application No. 62/812,442, filed on Mar. 1, 2019, provisional application No. 62/771,320, filed on Nov. 26, 2018, provisional application No. 62/679,327, filed on Jun. 1, 2018.

(51) Int. Cl.

| | | |
|---|---|---|
| H04L 9/08 | (2006.01) | |
| H04W 4/029 | (2018.01) | |
| G06K 9/00 | (2006.01) | |
| G06K 9/62 | (2006.01) | |
| H04B 7/0413 | (2017.01) | |
| G06N 20/00 | (2019.01) | |
| H04W 12/00 | (2009.01) | |
| G06F 21/60 | (2013.01) | |
| G06F 21/74 | (2013.01) | |
| H04L 29/06 | (2006.01) | |
| H04W 12/06 | (2009.01) | |
| G06K 19/07 | (2006.01) | |
| H04W 4/14 | (2009.01) | |
| H04W 8/18 | (2009.01) | |

(52) U.S. Cl.
CPC ..... *G06K 7/10099* (2013.01); *G06K 7/10108* (2013.01); *G06K 7/10128* (2013.01); *G06K 7/10188* (2013.01); *G06K 7/10405* (2013.01); *G06K 9/00718* (2013.01); *G06K 9/6267* (2013.01); *G06K 19/0708* (2013.01); *G06N 20/00* (2019.01); *H04B 7/0413* (2013.01); *H04L 9/088* (2013.01); *H04L 9/0838* (2013.01); *H04L 9/0861* (2013.01); *H04L 9/0894* (2013.01); *H04L 63/0435* (2013.01); *H04L 63/083* (2013.01); *H04L 63/0876* (2013.01); *H04W 4/029* (2018.02); *H04W 4/14* (2013.01); *H04W 4/80* (2018.02); *H04W 8/18* (2013.01); *H04W 12/001* (2019.01); *H04W 12/06* (2013.01); *H04L 2209/805* (2013.01)

(58) Field of Classification Search
USPC .......................................... 340/572.4; 342/42
See application file for complete search history.

(56) References Cited

U.S. PATENT DOCUMENTS

| | | | |
|---|---|---|---|
| 8,994,586 B1 | 3/2015 | Choi et al. | |
| 9,699,655 B1* | 7/2017 | Silis | H04L 9/006 |
| 9,712,963 B2 | 7/2017 | Kim et al. | |
| 10,381,710 B1 | 8/2019 | Kuo et al. | |
| 2003/0080978 A1 | 5/2003 | Navab et al. | |
| 2003/0104848 A1 | 6/2003 | Brideglall | |
| 2004/0030894 A1 | 2/2004 | Labrou et al. | |
| 2007/0146083 A1 | 6/2007 | Hein et al. | |
| 2007/0279231 A1 | 12/2007 | Cheng et al. | |
| 2010/0019955 A1 | 1/2010 | Durgin | |
| 2011/0234397 A1* | 9/2011 | Fetzer | G08B 25/016 340/539.13 |
| 2012/0076184 A1 | 3/2012 | Tran et al. | |
| 2012/0238216 A1 | 9/2012 | Hallowell et al. | |
| 2013/0211270 A1 | 8/2013 | Laurent et al. | |
| 2014/0133656 A1* | 5/2014 | Wurster | H04W 12/08 380/270 |
| 2015/0007347 A1 | 1/2015 | Rajakarunanayake et al. | |
| 2015/0022016 A1 | 1/2015 | Kim et al. | |
| 2015/0186694 A1 | 7/2015 | Fessler et al. | |
| 2015/0253362 A1* | 9/2015 | Louzir | G01R 19/2513 324/126 |
| 2016/0021079 A1* | 1/2016 | Schimmelpfeng | H04L 63/0421 713/171 |
| 2016/0277879 A1 | 9/2016 | Daoura et al. | |
| 2016/0294829 A1* | 10/2016 | Angus | H04L 9/3247 |
| 2017/0039784 A1* | 2/2017 | Gelbart | G07C 5/00 |
| 2017/0104467 A1* | 4/2017 | Nikitin | H01F 38/14 |
| 2017/0161679 A1 | 6/2017 | Stingel et al. | |
| 2017/0167287 A1* | 6/2017 | Jacobs | G01L 25/003 |
| 2017/0180919 A1 | 6/2017 | Rittner | |
| 2018/0019621 A1* | 1/2018 | Lin | H02J 50/80 |
| 2018/0049003 A1 | 2/2018 | Maulsby et al. | |
| 2018/0262894 A1 | 9/2018 | Daoura et al. | |
| 2019/0131953 A1 | 5/2019 | Gong et al. | |
| 2020/0030938 A1* | 1/2020 | Knudson | B24B 49/00 |

OTHER PUBLICATIONS

U.S. Appl. No. 16/506,496, filed Jul. 9, 2019, Kawaguchi.
U.S. Appl. No. 16/506,540, filed Jul. 9, 2019, Kawaguchi.
U.S. Appl. No. 16/506,584, filed Jul. 9, 2019, Kawaguchi.
U.S. Appl. No. 16/506,603, filed Jul. 9, 2019, Kawaguchi.
U.S. Appl. No. 16/506,630, filed Jul. 9, 2019, Kawaguchi.
U.S. Appl. No. 16/506,649, filed Jul. 9, 2019, Kawaguchi.
U.S. Appl. No. 16/506,671, filed Jul. 9, 2019, Kawaguchi.
U.S. Appl. No. 16/506,705, filed Jul. 9, 2019, Kawaguchi.
PCT International Search Report and Written Opinion dated Sep. 18, 2020, for International Application No. PCT/US2020/035303, 10 pages.
Notice of Allowance dated Sep. 3, 2020, in related U.S. Appl. No. 16/506,705.

* cited by examiner ial Patent Application
INTELLIGENT TRACKING SYSTEM AND METHODS AND SYSTEMS THEREFOR

PRIORITY CLAIM

This application is a bypass continuation of International Pat. App. No. PCT/US2019/034975 filed on May 31, 2019, which claims priority to U.S. Provisional Patent Application No. 62/679,327 filed on Jun. 1, 2018 entitled "INTELLIGENT TRACKING SYSTEM AND METHODS AND SYSTEMS THEREFOR", U.S. Provisional Patent Application No. 62/771,320 filed on Nov. 26, 2018 entitled "INTELLIGENT TRACKING SYSTEM AND METHODS AND SYSTEMS THEREFOR", and U.S. Provisional Patent Application No. 62/812,442 filed on Mar. 1, 2019 entitled "INTELLIGENT TRACKING SYSTEM AND METHODS AND SYSTEMS THEREFOR", the contents of which are all herein incorporated by reference in their entirety.

FIELD

The present disclosure relates to an intelligent tracking system including a tracking system and a backend server system that supports the tracking system. The disclosure further relates to different configurations of devices that may be used in the tracking system, including configurations of powered tracking devices, passive tracking devices, and aggregator devices that may be used in a tracking system.

BACKGROUND

Tracking devices are used to track various items. Typically a tracking device includes a GPS module. GPS modules may be power hungry. As such, typical tracking devices need constant powering and are therefore, ill-suited for tracking shipments on long routes (e.g., ship, train, and long-distance truck). GPS modules may also be expensive. As such, typical tracking devices cannot be used to track many items due to the costs associated with placing a large amount of tracking devices in a single shipment or on a group of items. GPS modules may also be large. As such, typical tracking devices may be ill-suited for tracking smaller items. Furthermore, while small tracking tags can be used for tracking smaller items, most of these tags rely on the use of cellular modems and include batteries and can be rather expensive.

SUMMARY

According to some embodiments of the present disclosure, a passive tracking device is disclosed. The passive tracking device includes a first antenna that transmits first response signals in a first frequency band, a second antenna that receives first energizing signals in a second frequency band, and a third antenna that both transmits second response signals and receives second energizing signals in a third frequency band. The passive tracking device further includes an energy harvest module that receives an energizing signal from a remote device via the second antenna and/or the third antenna, and converts the energizing signal from RF electrical energy to DC electrical energy that energizes the passive tracking device. The passive tracking device further includes a first transmission module that modulates a first response signal for transmission in the first frequency band and outputs the modulated first response signal to the first antenna for transmission when the passive tracking device operates in a first mode in accordance with a first communication protocol, wherein the first response signal includes a first message indicating a first device identifier of the passive tracking device. The passive device also includes a second transmission module that prepares a second response signal for transmission in the third frequency band and facilitates transmission of the prepared second response signals by toggling impedance of the third antenna when the passive tracking device operates in a second mode in accordance with a second communication protocol. The second response signal includes a second message indicating a second device identifier of the passive tracking device. The passive tracking device also includes a mode selection module that determines whether the passive tracking device is to operate in the first mode or the second mode based on the energizing signal.

In embodiments, the first communication protocol is one of a Bluetooth, Bluetooth Low Energy, or Wi-Fi communication protocol and the first frequency band is suitable for carrying signals in accordance with the one of Bluetooth, Bluetooth Low Energy, or Wi-Fi communication protocol. In these embodiments, the second frequency band is equal to the first frequency band, the second communication protocol is an RFID communication protocol, and the third frequency band is suitable for carrying signals in accordance with the RFID communication protocol. In some of these embodiments, the first frequency band and the second frequency band are substantially equal to 2.4 GHz and the third frequency band is substantially equal to 900 MHz. In some embodiments, the second communication protocol is an EPC UHF RFID communication protocol.

In embodiments, the passive tracking device modulates and transmits the first response signals according to one of a Bluetooth communication protocol, a Bluetooth Low Energy communication protocol, and a Wi-Fi communication protocol while operating in the first mode, and prepares and transmits the second response signals according to an RFID communication protocol while operating in the second mode. In some of these embodiments, the mode selection module determines to modulate and transmit the first response signals according to the Bluetooth Low Energy protocol as a default, unless the energizing signal is received on the third frequency band and contains a recognized RFID command.

In embodiments, the mode selection module determines that the passive tracking device is to operate in the first mode in response to receiving energizing signals in the second frequency band via the second antenna.

In embodiments, the mode selection module determines that the passive tracking device is to operate in the first mode in response to determining that the energizing signal received does not contain an RFID header or command. In some of these embodiments, the first mode selection module determines that the passive tracking device is to operate in the first mode in response to determining that the energizing signal received does not contain an EPC UHF RFID header or command.

In embodiments, the first transmission module determines when the passive tracking device is to transmit the modulated first response signal based on an amount of energy stored by the passive tracking device. In some of these embodiments, the first transmission module determines that the passive tracking device is to transmit the modulated first response signal substantially immediately when the amount of energy stored by the passive tracking device exceeds a first power threshold. In some of these embodiments, the first transmission module determines that the passive tracking device is to transmit the modulated first response signal after a delay when the amount of energy stored by the passive tracking device exceeds a second power threshold and is less than the first power threshold, the second power threshold being less than the first power threshold. In some of these embodiments, the first power threshold is 0 dBm and the second power threshold is −20 dBm.

In embodiments, the mode selection module determines that the passive tracking device is to operate in the second mode in response to receiving energizing signals in the third frequency band via the third antenna.

In embodiments, the mode selection module determines that the passive tracking device is to operate in the second mode based on contents of the energizing signal. In these embodiments, the mode selection module determines that the passive tracking device is to operate in the second mode in response to determining that the energizing signal includes an RFID-formatted header. In some embodiments, the mode selection module determines that the passive tracking device is to operate in the second mode in response to the energizing signals received containing a complete RFID-formatted message.

In embodiments, the first mode is a default mode of transmission and the second mode is selected by the mode selection module in response to receiving the energizing signal in the third frequency band via the third antenna and the energizing signal containing an RFID-formatted header and a complete RFID-formatted message containing an EPC command. In some embodiments, the energy harvest module outputs the DC electrical energy to one or more of first and second transmission modules and the mode selection module. In some embodiments, the first device identifier and the second device identifier are the same.

In embodiments, the passive tracking device further includes a sensor module, the sensor module including one or more sensors, wherein the sensor module outputs sensor data generated by the one or more sensors to the first transmission module when the passive tracking device operates in the first mode and the first transmission module includes at least a portion of the sensor data in the modulated first response signal for transmission via the first antenna. In some embodiments, the one or more sensors include one or more of a temperature sensor, a light sensor, a sound sensor, a humidity sensor, a motion sensor, a shock sensor, and an acceleration sensor. In some embodiments, the first transmission module includes at least a portion of the sensor data in the modulated first response signal for transmission via the first antenna when a value of the sensor data satisfies a predefined condition. In some of these embodiments, the first transmission module includes a temperature value obtained from a temperature sensor in the first response signal when the temperature value exceeds an upper threshold. In some embodiments, the first transmission module includes a temperature value obtained from a temperature sensor in the first response signal when the temperature value is less than a lower threshold. In some embodiments, the first transmission module includes sensor data generated by the one or more sensors in the first response signals when a value of the sensor data has met and/or exceeded a threshold. In some of these embodiments, the first transmission module refrains from including the sensor data in the first response signal when the predefined condition is not satisfied by the sensor data.

In embodiments, the passive tracking device includes an encryption module that encrypts messages and outputs the encrypted messages to the first transmission module when the passive tracking device communicates in the first mode and the first transmission module includes at least a portion of the encrypted messages in the modulated first response signal for transmission via the first antenna. In some embodiments, the encryption module encrypts the first device identifier of the passive tracking device based on a secret pattern and a secret key to obtain an encrypted message and outputs the encrypted message to the first transmission module.

In embodiments, the energy harvest module includes a transformer that substantially matches impedance of the energizing signals to the passive tracking device.

According to some embodiments of the present disclosure, a passive tracking device is disclosed. The passive tracking device includes a first antenna that transmits first response signals in a first frequency band, a second antenna that receives first energizing signals in a second frequency band, and a third antenna that both transmits second response signals and receives second energizing signals in a third frequency band. The passive tracking device further includes an energy harvester that receives an energizing signal from a remote device via the second antenna and/or the third antenna and at least partially converts the energizing signal from RF electrical energy to DC electrical energy. The passive tracking device also includes a clamp circuit that receives the energizing signal from the energy harvester and at least partially converts the energizing signal from the RF electrical energy to the DC electrical energy together with the energy harvester. The passive tracking device further includes a storage capacitor that receives the DC electrical energy from the clamp circuit and stores the DC electrical energy, and a voltage regulator that receives the DC electrical energy from one or both of the clamp circuit and the storage capacitor, and regulates voltage of the DC electrical energy. The passive tracking device also includes a power bus that receives the regulated DC electrical energy from the voltage regulator and energizes the passive tracking device, and a phase-locked loop that modulates a first response signal for transmission in the first frequency band and outputs the modulated first response signal to the first antenna for transmission when the passive tracking device operates in a first mode in accordance with a first communication protocol, wherein the first response signal includes a first message indicating a first device identifier of the passive tracking device. The passive tracking device also includes an amplifier that receives the modulated first response signal from the phase-locked loop and amplifies the modulated first response signal for transmission via the first antenna, and an AC power source that provides signals to the phase-locked loop for modulation. The passive tracking device also includes a reference oscillator that provides a reference frequency to the AC power source, and a Gaussian frequency shift keying modulator that works with the phase-locked loop to modulate first response signal. The passive tracking device further includes a state machine that outputs information to the Gaussian frequency shift keying modulator for inclusion in modulated first response signal, and a non-volatile memory that stores information that is available for retrieval by the state machine and inclusion in the modulated first response signal. The passive tracking device also includes a backscatter switch that prepares a second response signal for transmission in the third frequency band and facilitates transmission of the prepared second response signals by toggling impedance of the third antenna when the passive tracking device operates in a second mode in accordance with a second communication protocol, wherein the second response signal includes a second message indicating a second device identifier of the passive tracking device. The passive tracking device also includes an EPC modem that actuates the backscatter switch to prepare the second response signal, and a mode selector that receives an energizing signal from the second antenna or the third antenna and determines whether the passive tracking device is to operate in the first mode or the second mode based on the energizing signal.

In embodiments the first communication protocol is one of a Bluetooth, Bluetooth Low Energy, or Wi-Fi communication protocol, the first frequency band is suitable for carrying signals in accordance with the one of Bluetooth, Bluetooth Low Energy, or Wi-Fi communication protocol, the second frequency band is equal to the first frequency band, the second communication protocol is an RFID communication protocol, and the third frequency band is suitable for carrying signals in accordance with the RFID communication protocol. In some of these embodiments, the first frequency band and the second frequency band are substantially equal to 2.4 GHz and the third frequency band is substantially equal to 900 MHz.

In embodiments, the second communication protocol is an EPC UHF RFID protocol communication protocol. In some embodiments, the passive tracking device modulates and transmits the first response signals according to one of a Bluetooth communication protocol, a Bluetooth Low Energy communication protocol, and a Wi-Fi communication protocol while operating in the first mode, and prepares and transmits the second response signals according to RFID while operating in the second mode. In some embodiments, the mode selection module determines to modulate and transmit the first response signals according to the Bluetooth Low Energy protocol as a default, unless the energizing signal is received on the third frequency band and contains a recognized RFID command. In some embodiments, the mode selector determines that the passive tracking device is to operate in the first mode in response to receiving the energizing signal in the second frequency band via the second antenna. In some embodiments, the mode selector determines that the passive tracking device is to operate in the first mode in response to determining that the energizing signal does not contain an RFID header or command. In some embodiments, the mode selector determines that the passive tracking device is to operate in the first mode in response to determining that the energizing signal does not contain an EPC UHF RFID header or command.

In embodiments, the state machine determines when the passive tracking device is to transmit the modulated first response signal based on an amount of energy stored by the storage capacitor. In some of these embodiments, the state machine determines that the passive tracking device is to transmit the modulated first response signal substantially immediately when the amount of energy stored by the storage capacitor exceeds a first power threshold. In some embodiments, the state machine determines that the passive tracking device is to transmit the modulated first response signal after a delay when the amount of energy stored by the storage capacitor exceeds a second power threshold and is less than the first power threshold, the second power threshold being less than the first power threshold. In some of these embodiments, the first power threshold is 0 dBm and the second power threshold is −20 dBm.

In embodiments, the mode selector determines that the passive tracking device is to operate in the second mode in response to receiving the energizing signal in the third frequency band via the third antenna. In some embodiments, the mode selector determines that the passive tracking device is to operate in the second mode based on contents of the energizing signal. In some of these embodiments, the mode selector determines that the passive tracking device is to operate in the second mode in response to determining that the energizing signal includes an RFID-formatted header. In some embodiments, the mode selector determines that the passive tracking device is to operate in the second mode in response to the energizing signals received containing a complete RFID-formatted message.

In embodiments, the mode selector determines that the passive tracking device is to operate in the second mode in response to an amount of energy converted from the energizing signal by the energy harvester and the clamp circuit. In some embodiments, the first mode is a default mode of transmission and the second mode is selected by the mode selector in response to receiving energizing signals in the third frequency band via the third antenna, and the energizing signal containing an RFID-formatted header and a complete RFID-formatted message containing an EPC command. In some embodiments, the power bus transmits the DC electrical energy to one or more of first and second transmission modules and the mode selector. In some embodiments, the first device identifier and the second device identifier are the same.

In embodiments, the passive tracking device further includes a sensor module. The sensor module includes one or more sensors. The sensor module outputs sensor data generated by the one or more sensors to the state machine and/or the non-volatile memory when the passive tracking device operates in the first mode and the state machine includes at least a portion of the sensor data in the modulated first response signal for transmission via the first antenna. In some embodiments, the one or more sensors include one or more of a temperature sensor, a light sensor, a sound sensor, a humidity sensor, a motion sensor, a shock sensor, and an acceleration sensor. In some of these embodiments, the state machine includes at least a portion of the sensor data in the modulated first response signal for transmission via the first antenna when a value of the sensor data satisfies a predefined condition. In some embodiments, the state machine includes a temperature value obtained from a temperature sensor in the first response signal when the temperature value exceeds an upper threshold. In some of these embodiments, the state machine includes a temperature value obtained from a temperature sensor in the first response signal when the temperature value is less than a lower threshold.

In embodiments, the sensor module outputs sensor data generated by the one or more sensors to the state machine and/or the non-volatile memory when a value of the sensor data has met and/or exceeded a threshold. In some embodiments, the state machine refrains from including the sensor data in the first response signal when the predefined condition is not satisfied by the sensor data.

In embodiments, the passive tracking device further includes an encryption module that encrypts messages and outputs the encrypted messages to the state machine when the passive tracking device communicates in the first mode, and the state machine includes at least a portion of the encrypted messages in the modulated first response signal for transmission via the first antenna. In some embodiments, the encryption module encrypts the first device identifier of the passive tracking device based on a secret pattern and a secret key to obtain an encrypted message and outputs the encrypted message to the state machine.

In embodiments, the reference oscillator is a bulk acoustic wave oscillator.

In embodiments, the passive tracking device further includes a transformer connected to the second antenna and the energy harvester that substantially matches impedance of energizing signals received via the second antenna to the passive tracking device and outputs the impedance matched energizing signal to the energy harvester.

According to some embodiments of the present disclosure, a passive tracking device is disclosed. The passive tracking device includes a first antenna that transmits response signals in a first frequency band, and a second antenna that receives energizing signals in a second frequency band. The passive tracking device further includes an energy harvest module that receives an energizing signal from a remote device via the second antenna and converts the energizing signal from RF electrical energy to DC electrical energy that energizes the passive tracking device. The passive tracking device also includes a transmission module that modulates a response signal for transmission in the first frequency band and outputs the modulated response signal to the first antenna for transmission in accordance with a communication protocol, wherein the response signal includes a message indicating a device identifier of the passive tracking device. The passive tracking device further includes a sensor module including one or more sensors. In response to being energized by the energy harvest module, the sensor module outputs sensor data generated by the one or more sensors to the transmission module and the transmission module includes at least a portion of the sensor data in the modulated response signal for transmission via the first antenna.

In embodiments, the one or more sensors include one or more of a temperature sensor, a light sensor, a sound sensor, a humidity sensor, a motion sensor, a shock sensor, and an acceleration sensor.

In embodiments, the transmission module includes at least a portion of the sensor data in the modulated response signal when a value of the sensor data satisfies a predefined condition. In some embodiments, the transmission module includes a temperature value obtained from a temperature sensor in the modulated response signal when the temperature value exceeds an upper threshold. In some embodiments, the transmission module includes a temperature value obtained from a temperature sensor in the modulated response signal when the temperature value is less than a lower threshold. In some embodiments, the transmission module includes sensor data generated by the one or more sensors in the modulated response signal when a value of the sensor data has met and/or exceeded a threshold. In some embodiments, the transmission module refrains from including the sensor data in the response signal when the predefined condition is not satisfied by the sensor data.

In embodiments, the transmission module is a first transmission module, the response signals are first response signals, the energizing signals are first energizing signals, the communication protocol is a first communication protocol, the message is a first message, and the device identifier is a first device identifier. In some of these embodiments, the first transmission module modulates the first response signal and outputs the modulated response signal to the first transmission module when the passive tracking device operates in a first mode, and the sensor module outputs sensor data to the first transmission module when the passive tracking device operates in the first mode.

In embodiments, the passive tracking device further includes a third antenna that both transmits second response signals and receives second energizing signals in a third frequency band, and a second transmission module that prepares a second response signal for transmission in the third frequency band and facilitates transmission of the prepared second response signals by toggling impedance of the third antenna when the passive tracking device operates in a second mode in accordance with a second communication protocol. The second response signal includes a second message indicating a second device identifier of the passive tracking device. The passive tracking device also includes a mode selection module that determines whether the passive tracking device is to operate in the first mode or the second mode based on a received energizing signal from a remote device via the second antenna and/or the third antenna.

In embodiments, the first communication protocol is one of a Bluetooth, Bluetooth Low Energy, or Wi-Fi communication protocol. The first frequency band is suitable for carrying signals in accordance with the one of Bluetooth, Bluetooth Low Energy, or Wi-Fi communication protocol. The second frequency band is equal to the first frequency band. The second communication protocol is an RFID communication protocol. The third frequency band is suitable for carrying signals in accordance with the RFID communication protocol. In some embodiments, the first frequency band and the second frequency band are substantially equal to 2.4 GHz and the third frequency band is substantially equal to 900 MHz. In some of these embodiments, the second communication protocol is an EPC UHF RFID communication protocol.

In embodiments, the passive tracking device modulates and transmits the first response signals according to one of a Bluetooth communication protocol, a Bluetooth Low Energy communication protocol, and a Wi-Fi communication protocol while operating in the first mode, and prepares and transmits the second response signals according to RFID while operating in the second mode. In some embodiments, the mode selection module determines to modulate and transmit the first response signals according to the Bluetooth Low Energy protocol as a default, unless the energizing signal is received on the third frequency band and contains a recognized RFID command. In some embodiments, the mode selection module determines that the passive tracking device is to operate in the first mode in response to receiving energizing signals in the second frequency band via the second antenna.

In embodiments, the mode selection module determines that the passive tracking device is to operate in the first mode in response to determining that the energizing signal received does not contain an RFID header or command. In some of these embodiments, the first mode selection module determines that the passive tracking device is to operate in the first mode in response to determining that the energizing signal received does not contain an EPC UHF RFID header or command.

In embodiments, the first transmission module determines when the passive tracking device is to transmit the modulated first response signal based on an amount of energy stored by the passive tracking device. In some of these embodiments, the first transmission module determines that the passive tracking device is to transmit the modulated first response signal substantially immediately when the amount of energy stored by the passive tracking device exceeds a first power threshold. In some embodiments, the first transmission module determines that the passive tracking device is to transmit the modulated first response signal after a delay when the amount of energy stored by the passive tracking device exceeds a second power threshold and is less than the first power threshold, the second power threshold being less than the first power threshold. In some embodiments, the first power threshold is 0 dBm and the second power threshold is −20 dBm.

In embodiments, the mode selection module determines that the passive tracking device is to operate in the second mode in response to receiving energizing signals in the third frequency band via the third antenna.

In embodiments, the mode selection module determines that the passive tracking device is to operate in the second mode based on contents of the energizing signal. In some embodiments, the mode selection module determines that the passive tracking device is to operate in the second mode in response to determining that the energizing signal includes an RFID-formatted header. In some embodiments, the mode selection module determines that the passive tracking device is to operate in the second mode in response to the energizing signals received containing a complete RFID-formatted message.

In embodiments, the first mode is a default mode of transmission and the second mode is selected by the mode selection module in response to receiving the energizing signal in the third frequency band via the third antenna, and the energizing signal containing an RFID-formatted header and a complete RFID-formatted message containing an EPC command.

In embodiments, the energy harvest module outputs the DC electrical energy to one or more of first and second transmission modules and the mode selection module. In embodiments, the first device identifier and the second device identifier are the same.

In embodiments, the sensor module includes a bulk acoustic wave temperature sensor.

In embodiments, the transmission module includes a reference oscillator that is a bulk acoustic wave oscillator.

According to some embodiments of the present disclosure, a tracking device is disclosed. The tracking device includes a first antenna that transmits response signals in a first frequency band. The tracking device also includes a transmission module that modulates a response signal for transmission in the first frequency band and outputs the modulated response signal to the first antenna for transmission in accordance with a communication protocol. The tracking device further includes an encryption module. The encryption module obtains a device identifier that uniquely identifies the tracking device, generates an obscured device identifier based on the device identifier and a secret pattern, generates a message based on the obscured device identifier, encrypts the message using a secret key to obtain an encrypted message, and outputs the encrypted message to the transmission module. The transmission module includes the encrypted message in the modulated response signal for transmission via the first antenna.

In embodiments, generating the obscured device identifier includes generating a random N-bit string and inserting the random N-bit string into the device identifier according to the secret pattern. In some of these embodiments, the secret pattern defines N different insertion slots, wherein each insertion slot respectively defines a bit position of the device identifier where a respective bit of the random N-bit string is inserted. In some embodiments, an authentication device decrypts the message using the secret key to obtain the obscured device identifier, and authenticates the tracking device by removing the random N-bit string from the decrypted message to obtain the device identifier of the tracking and verifying the device identifier from a list of known device identifiers.

In embodiments, the encrypted message includes an encrypted portion and an unencrypted portion, the unencrypted portion including a secret key identifier that identifies the secret key to an authentication device. In some of these embodiments, the authentication device retrieves the secret key based on the secret key identifier and decrypts the encrypted message using the secret key. In some embodiments, the encrypted message further includes a secret pattern identifier that identifies the secret pattern to the authentication device. In some of these embodiments, the secret pattern is included in the unencrypted portion of the encrypted message. In some embodiments, the secret pattern is included in the encrypted portion of the encrypted message.

In embodiments, the tracking device is a passive tracking device that is energized upon receiving an energizing signal from a remote device. In some of these embodiments, the response signal is received by a reading device, which in turn transmits the encrypted message contained therein to an authentication device that authenticates the tracking device based on the encrypted message, the secret key, and the secret pattern. In some embodiments, the passive tracking device is a dual-mode tracking device that selectively operates in a first mode and a second mode based on the frequency band of the energizing signal and contents of the energizing signal. In embodiments, the encryption module generates the encrypted message only when the dual-mode tracking device operates in the first mode. In some embodiments, the first mode corresponds to a Bluetooth Low Energy communication protocol and the second mode corresponds to RFID communication protocol.

In embodiments, the tracking device includes a power source. In some of these embodiments, the tracking device transmits the encrypted message to an authentication device directly.

In embodiments, the tracking device is authenticated by an authentication device based on the encrypted message, the secret pattern, and the secret key. In some of these embodiments, the authenticating device is an authentication server that authenticates tracking devices.

According to some embodiments of the present disclosure, a method for generating encrypted messages that are used to authenticate a tracking device by an authentication device is disclosed. The method includes obtaining, by an encryption module of the passive tracking device a device identifier that uniquely identifies the tracking device. The method also includes generating, by the encryption module, an obscured device identifier based on the device identifier and a secret pattern. The method further includes generating, by the encryption module, a message based on the obscured device identifier. The method also includes encrypting, by the encryption module, the message using a secret key to obtain an encrypted message. The method further includes outputting, by the encryption module, the encrypted message to a transmission module of the tracking device. The method further includes modulating, by the transmission module, a response signal that includes the encrypted message for transmission via an antenna of the tracking device.

In embodiments, generating the obscured device identifier includes generating a random N-bit string and inserting the random N-bit string into the device identifier according to the secret pattern. In some embodiments, the secret pattern defines N different insertion slots, wherein each insertion slot respectively defines a bit position of the device identifier where a respective bit of the random N-bit string is inserted. In some embodiments, an authentication device decrypts the message using the secret key to obtain the obscured device identifier, and authenticates the tracking device by removing the random N-bit string from the decrypted message to obtain the device identifier of the tracking and verifying the device identifier from a list of known device identifiers.

In embodiments, the encrypted message includes an encrypted portion and an unencrypted portion, the unencrypted portion including a secret key identifier that identifies the secret key to an authentication device. In some of these embodiments, the authentication device retrieves the secret key based on the secret key identifier and decrypts the encrypted message using the secret key. In some embodiments, the encrypted message further includes a secret pattern identifier that identifies the secret pattern to the authentication device. In some embodiments, the secret pattern is included in the unencrypted portion of the encrypted message. In some embodiments, the secret pattern is included in the encrypted portion of the encrypted message.

In embodiments, the tracking device is a passive tracking device that is energized upon receiving an energizing signal from a remote device. In some of these embodiments, the response signal is received by a reading device, which in turn transmits the encrypted message contained therein to an authentication device that authenticates the tracking device based on the encrypted message, the secret key, and the secret pattern. In some embodiments, the passive tracking device is a dual-mode tracking device that selectively operates in a first mode and a second mode based on the frequency band of the energizing signal and contents of the energizing signal. In some embodiments, the encryption module generates the encrypted message only when the dual-mode tracking device operates in the first mode. In some embodiments, the first mode corresponds to a Bluetooth Low Energy communication protocol and the second mode corresponds to RFID communication protocol.

In embodiments, the tracking device includes a power source. In some of these embodiments, the tracking device transmits the encrypted message to an authentication device directly.

In embodiments, the tracking device is authenticated by an authentication device based on the encrypted message, the secret pattern, and the secret key. In some of these embodiments, the authenticating device is an authentication server that authenticates tracking devices. In some embodiments, the authenticating device is an aggregator device. In some embodiments, the authenticating device is a backend server system. In some embodiments, the authenticating device is a user device.

According to some embodiments of the present disclosure, a system for authenticating tracking devices is disclosed. The system includes a tracking device that generates an encrypted message that indicates a tracking identifier that uniquely identifies the tracking device and modulates a response signal that includes the encrypted message for transmission via an antenna of the tracking device. The system also includes an authentication server that receives the encrypted message, determines the device identifier based on the encrypted message, and verifies the device identifier based on a list of known device identifiers, wherein the list of known device identifiers indicates device identifiers of valid tracking devices.

In embodiments, the tracking device includes an encryption module. The encryption module generates an obscured device identifier based on the device identifier and a secret pattern. The encryption module also generates a message based on the obscured device identifier. The encryption module further encrypts the message using a secret key to obtain the encrypted message, and outputs the encrypted message to the transmission module.

In embodiments, generating the obscured device identifier includes generating a random N-bit string and inserting the random N-bit string into the device identifier according to the secret pattern. In some of these embodiments, the secret pattern defines N different insertion slots, wherein each insertion slot respectively defines a bit position of the device identifier where a respective bit of the random N-bit string is inserted. In some embodiments, the authentication device decrypts the encrypted message using the secret key to obtain the obscured device identifier, and determines the device identifier of the tracking device by removing the random N-bit string from the decrypted message.

In embodiments, the encrypted message includes an encrypted portion and an unencrypted portion, the unencrypted portion including a secret key identifier that identifies the secret key to the authentication device. In some of these embodiments, the authentication device retrieves the secret key based on the secret key identifier and decrypts the encrypted message using the secret key. In some embodiments, the encrypted message further includes a secret pattern identifier that identifies the secret pattern to the authentication device. In some of these embodiments, the secret pattern is included in the unencrypted portion of the encrypted message. In some embodiments, the secret pattern is included in the encrypted portion of the encrypted message.

In embodiments, the system further includes a reading device. The reading device receives the response signal from the tracking device, and transmits the encrypted message contained in the response signal to the authentication server via a communication network. In some of these embodiments, the tracking device is a passive tracking device and the reading device broadcasts an energizing signal that energizes the passive tracking device. In some embodiments, the passive tracking device is a dual-mode tracking device that selectively operates in a first mode and a second mode based on the frequency band of the energizing signal and contents of the energizing signal. In some of these embodiments, the encryption module generates the encrypted message only when the dual-mode tracking device operates in the first mode. In some embodiments, the first mode corresponds to a Bluetooth Low Energy communication protocol and the second mode corresponds to RFID communication protocol.

In embodiments, the tracking device includes a power source. In some of these embodiments, the tracking device transmits the encrypted message to an authentication device directly. In some embodiments, the authentication server confirms a presence of the tracking device in a general location based on the encrypted message.

According to some embodiments of the present disclosure, the passive tracking device is disclosed. The passive tracking device includes a first antenna that transmits response signals in a first frequency band and a second antenna that receives energizing signals in a second frequency band. The passive tracking device also includes an energy harvest module that receives an energizing signal from a remote device via the second antenna and converts the energizing signal from RF electrical energy to DC electrical energy that energizes the passive tracking device. The passive tracking device further includes a transmission module that modulates a response signal for transmission in the first frequency band and outputs the modulated response signal to the first antenna for transmission in accordance with a communication protocol. The response signal includes a message indicating a device identifier of the passive tracking device. The transmission module includes a bulk acoustic wave reference oscillator that produces an output frequency, the bulk acoustic wave reference oscillator including a bulk acoustic wave delay reference. The transmission module modulates the response signal such that the response signal has a carrier frequency based on the output frequency of the bulk acoustic wave reference oscillator.

In embodiments, the bulk acoustic wave reference oscillator includes a master clock, a time difference detector, a phase frequency detection module, and a loop filter. In some embodiments, the master clock outputs the output frequency to other components of the first transmission module for use as a carrier frequency reference and outputs the output frequency to the time difference detector. In some embodiments, the time difference detector detects a plurality of echoes of the bulk acoustic wave delay reference, generates a first echo signal and a second echo signal based on a first echo and a second echo of the plurality of echoes, respectively, compares the first echo signal to the output frequency to generate an end pulse, and outputs both the end pulse and the second echo signal to the phase frequency detection module. In some embodiments, the phase frequency detection module compares a phase of the end pulse to a phase of the second echo signal, generates a pump pulse, and generates a current based on the pump pulse. In some embodiments, the loop filter amplifies the current and outputs the amplified current to the master clock, thereby forming a feedback loop and correcting the output frequency.

In some embodiments, the pump pulse is a pump-down pulse when the phase of the end pulse is earlier than the phase of the second echo signal, and the phase frequency detection module generates negative current based on the pump-down pulse. In some of these embodiments, the pump pulse is a pump-up pulse when the phase of the end pulse is later than the phase of the second echo signal, and the phase frequency detection module generates positive current based on the pump-up pulse. In some embodiments, the time difference detector includes a temperature compensation module that receives a temperature reading and outputs a temperature adjustment signal to the time difference detector based on the temperature reading, and the time difference detector adjusts one or both of the echo signals and the end pulse based on the temperature adjustment signal.

In embodiments, the bulk acoustic wave delay reference is a first bulk acoustic wave delay reference and the plurality of echoes is a first plurality of echoes. In some of these embodiments, the bulk acoustic wave oscillator includes a bulk acoustic wave temperature sensor. The bulk acoustic wave temperature sensor detects a second plurality of echoes of the bulk acoustic wave delay reference, generates a first echo signal and a second echo signal based on a first echo and a second echo of the second plurality of echoes, generates a coarse temperature reading based on the first and second echo signals based on the first echo and the second echo of the second plurality of echoes, respectively, and outputs the coarse temperature reading to the time difference detector of the bulk acoustic wave oscillator. In some embodiments, the bulk acoustic wave temperature sensor receives the output frequency from the bulk acoustic wave generator and generates a precise temperature reading based on the fifth and sixth echo signals and the output frequency. In some embodiments, the passive tracking device further includes a bulk acoustic wave temperature sensor that generates one or both of a coarse temperature reading and a precise temperature reading, the bulk acoustic wave temperature sensor including a second bulk acoustic wave delay reference.

In embodiments, the bulk acoustic wave temperature sensor detects a second plurality of echoes of the second bulk acoustic wave delay reference, generates a first echo signal and a second echo signal based on a first echo and a second echo of the second plurality of echoes, respectively, generates the coarse temperature reading based on the first and second echo signals based on the first echo and the second echo of the second plurality of echoes, and outputs the coarse temperature reading to the bulk acoustic wave oscillator. In some of these embodiments, the bulk acoustic wave temperature sensor receives the output frequency from the bulk acoustic wave generator and generates the precise temperature reading based on both the output frequency and the first and second echo signals based on the first echo and the second echo of the second plurality of echoes. In some embodiments, the bulk acoustic wave temperature sensor outputs the precise temperature reading to the transmission module for inclusion in the response signal.

In embodiments, the passive tracking device further includes a bulk acoustic wave transformer that transforms energizing signals received via the second antenna, the bulk acoustic wave transformer including a second bulk acoustic wave delay reference. In some of these embodiments, the bulk acoustic wave transformer increases an impedance of the energizing signals.

In embodiments, the transmission module modulates the response signal such that the response signal has a carrier frequency substantially equal to a factor of the output frequency of the bulk acoustic wave reference oscillator.

In embodiments, the transmission module is a first transmission module, the response signals are first response signals, the energizing signals are first energizing signals, the communication protocol is a first communication protocol, the message is a first message, and the device identifier is a first device identifier. In some of these embodiments, the passive tracking device further includes a third antenna that both transmits second response signals and receives second energizing signals in a third frequency band. The passive tracking device also includes a second transmission module that prepares a second response signal for transmission in the third frequency band and facilitates transmission of the prepared second response signals by toggling impedance of the third antenna when the passive tracking device operates in a second mode in accordance with a second communication protocol, and wherein the second response signal includes a second message indicating a second device identifier of the passive tracking device. The passive tracking device further includes a mode selection module that determines whether the passive tracking device is to operate in the first mode or the second mode based on a received energizing signal from a remote device via the second antenna and/or the third antenna. In some of these embodiments, the first frequency band is equal to the second frequency band.

According to some embodiments of the present disclosure, an aggregator device of an intelligent tracking system is disclosed. The aggregator device may include one or more storage devices; one or more long distance communication units that communicate with external devices using one or more long distance communication protocols; at least one short distance communication units that communicate with proximate devices using one or more short range communication protocols; a GPS device; and one or more processors that execute executable instructions. The instruction cause the processing device to: broadcast, via the short distance communication unit, energizing signals to tracking devices in a read range of the aggregator device, wherein the energizing signals trigger the tracking devices to broadcast tracking messages; receive one or more response signals from one or more respective responding tracking devices via the short distance communication unit, wherein each response signal includes a tracking messages from a respective responding tracking device that includes tracking information; generate a tracking record based on a respective response signal; and report the tracking record to a backend server system.

In embodiments, the one or more short distance communication units include a multiple-output-multiple-input (MOMI) communication device that is configured to receive a response signal from a responding tracking device and to determine a range and bearing of the responding tracking device with respect to aggregator device based on the response signal. In some of these embodiments, the MOMI communication device includes at least one MOMI transceiver that comprises: a first radio frequency (RF) antenna; and a second RF antenna that is in close proximity to the first RF antenna and is set at an angle that is greater than zero degrees and less than 180 degrees from the first RF antenna. In some of these embodiments, the MOMI device is configured to: receive an energizing command from the one or more processors; modulate an energizing signal between the first RF antenna and the second RF antenna to the tracking devices in the read range of the aggregator device; receive a first response signal at the first RF antenna and a second response signal at the second RF antenna from the responding tracking device; determine the range and bearing of the responding tracking device based on a first signal strength of the first response signal and a second signal strength of the second response signal; and outputting the range and bearing to the processing device.

In embodiments, the aggregator device further includes a set of one or more environmental sensors that respectively output sensor data. In some of these embodiments, the executable instructions further cause the one or more processors to: receive the sensor data; classify an existence of an environmental incident based on the sensor data and a machine learned model; and in response to classifying the environmental incident: generate an environmental incident record; and report the environmental incident to the backend server system.

In embodiments, the executable instructions further cause the one or more processors to receive a camera signal. In some of these embodiments, the executable instructions further cause the one or more processors to classify a trackable item in one or more frames in the camera signal using an image classifier trained to identify trackable items. In some of these embodiments, the executable instructions further cause the one or more processors to determine that a tracking device is missing, damaged, or otherwise unreadable in response to classifying a trackable item and not receiving a tracking message corresponding to the trackable item. In some embodiments, the executable instructions further cause the one or more processors to classify visual indicia affixed to a trackable item in one or more frames in the camera signal using an image classifier trained to identify trackable items and visual indicia. In some of these embodiments, the executable instructions further cause the one or more processors to: scan the visual indicia; and decode the visual indicia to obtain a value, the value being indicative of tracking information of the item to which the visual indicia are affixed. In some of these embodiments, the executable instructions further cause the one or more processors to determine that a tracking device is missing, damaged, or otherwise unreadable in response to not receiving a tracking message that corresponds to the value decoded from the visual indicia.

In some embodiments, the aggregator device further includes a camera that outputs the camera signal. In some embodiments, the one or more processors receive the video signal from a remote video camera via the long distance communication unit or the short distance communication unit or via a connector cable. In some embodiments, the video signal is a 3D video signal that includes high resolution color video and depth video. In some embodiments, the executable instructions further cause the one or more processors to: receive first range and bearing data derived from a first response signal from a first tracking device; determine first tracking data corresponding to the first tracking device based on the first response signal; receive second range and bearing data derived from a second response signal from a second tracking device; determine second tracking data corresponding to the second tracking device based on the second response signal; classify a first trackable item and a second trackable items in one or more frames in the camera signal using an image classifier trained to identify trackable items; and disambiguate the first trackable item and the second trackable item based on the first range and bearing data and the second range and bearing data, such that the first tracking data is associated with the first trackable item and the second tracking data is associated with the second trackable item based on the disambiguation.

In embodiments, the responding tracking devices include passive tracking devices. In some of these embodiments, the passive tracking devices include multi-medium tracking devices that are configured with an RFID tag and a BLE transmitter, such that the multi-medium tracking devices may be read via RFID interrogators or BLE scanners. In some of these embodiments, the RFID tag and the BLE transmitter are integrated into a single ASIC.

According to some embodiments of the present disclosure, an intelligent tracking system is disclosed. The intelligent tracking system includes one or more passive tracking devices, an exciter, and a tracker. Each passive tracking device includes one or more transceivers and is energized by an electromagnetic frequency. In response to being energized each passive tracking device transmits a short message. The exciter emits the electromagnetic frequency to power the passive tag. The tracker receives short messages from the one or more passive tracking devices and confirms the presence of the one or more passive tracking devices in a vicinity of the tracker based on the received messages.

In embodiments, the short messages are Bluetooth Low Energy (BLE) beacons. In some of these embodiments, each of the BLE beacons includes a respective device identifier of a respective passive tracking device of the one or more passive tracking devices that transmitted the BLE beacon. In embodiments, each of the short messages includes a respective device identifier of a respective passive tracking device of the one or more passive tracking devices that transmitted the short message. In some of these embodiments, the respective passive tracking device encrypts the respective device identifier in the short message using a low power encryption algorithm. In some of these embodiments, the respective passive tracking device encrypts the respective device identifier in the short message based on a shared secret key and a shared secret pattern. The shared secret pattern may define a pattern at which random bits are inserted into the short message prior to encryption with the shared secret key. Furthermore, in embodiments, the intelligent tracking system includes an authenticating device that authenticates the respective passing device using the shared secret pattern and the shared secret key. In some of these embodiments, the authenticating device is the tracker. In other embodiments, the authenticating device is a backend server system in communication with the tracker.

In embodiments, the exciter is embedded in the tracker. In other embodiments, the exciter is a stand-alone device. In some embodiments, the intelligent tracking system includes a backend server system that maintains locations of the one or more passive tracking devices. In some of these embodiments, the backend server system manages an inventory of items via the locations of the one or more passive tracking devices.

In embodiments, the one or more passive tracking devices each include a temperature sensor that outputs a current temperature upon being energized, wherein each passive tracking device includes the current temperature data in the short message output by the passive tracking device. In some embodiments, the intelligent tracking system includes a backend server system that maintains a temperature log based on the current temperature data in the respective short messages transmitted by the passive tracking devices and time stamps associated with the temperature data. In embodiments, the intelligent tracking system includes a backend server system that receives the motion data and determines a motion profile corresponding to an item associated with a particular passive tracking device based on the motion data. In embodiments, the one or more passive tracking devices each include a light sensor that outputs a value indicating a detection of ambient light in a vicinity of the passive tracking device, wherein the value is included in the short message upon the passive tracking device being energized. In embodiments, the one or more passive tracking devices each include a motion sensor that outputs motion data that indicates a respective motion of the passive tracking device, wherein the motion data is included in the short message upon the passive tracking device being energized. In some embodiments, the intelligent tracking system includes an augmented reality enabled device that is configured to display an indicia of a passive tracking device when the augmented reality enabled device is oriented in a direction of the passive tracking device.

In embodiments, the one or more passive tracking devices include a multi-band antenna such that each passive tracking device receives the electromagnetic frequency at a first frequency and transmits the short messages at a second frequency. In embodiments, the exciter includes a multi-band antenna such that the exciter transmits the electromagnetic frequency at a first frequency and receives short messages at a second frequency.

In embodiments, the tracker is a user device configured to communicate with the one or more passive tracking devices.

In embodiments, the intelligent tracking system includes a backend server system that receives location data corresponding to the one or more passive tracking devices from the tracker and generates a virtual map of an area corresponding to the one or more passive tracking devices based on the location data.

In embodiments, the tracker is configured to determine a characterization of an environment of the tracker; and to determine a form of communication with which the tracker communicates with a backend server based on the characterization, wherein the tracker is configured to select from more than one different forms of communication.

In embodiments, each of the one or more passive tracking devices includes a plurality of antennas and is configured to: transmit an advertising packet to the tracker in response to being energized using one of the plurality of antennas, wherein the advertising packet indicates the antenna being used; receive a response packet from the tracker in response to the advertising packet, the response packet including a received signal strength indication that indicates a strength of a signal containing the advertising packet; and selectively transmit the short message to the tracker using the one of the plurality of antennas based on the received signal strength indication.

In embodiments, each passive tracking device of the one or more passive tracking devices is fabricated with an electrostatic discharge protection mechanism at a connection between an antenna of the passive tracking device and a silicon chip of the passive tracking device. In some of these embodiments, the electrostatic discharge protection is removed after the silicon chip is inlaid into a housing of the passive tracking device.

In embodiments, each passive tracking device of the one or more passive tracking devices includes a MEMS oscillator.

In some embodiments, the passive tracking devices include multi-medium tracking devices that are configured with an RFID tag and a BLE transmitter, such that the multi-medium tracking devices may be read via RFID interrogators or BLE scanners. In some of these embodiments, the RFID tag and the BLE transmitter are integrated into a single ASIC A more complete understanding of the disclosure will be appreciated from the description and accompanying drawings and the claims, which follow.

BRIEF DESCRIPTION OF THE DRAWINGS

The accompanying drawings, which are included to provide a better understanding of the disclosure, illustrate embodiment(s) of the disclosure and together with the description serve to explain the principle of the disclosure. In the drawings.

DETAILED DESCRIPTION

Figure 1:
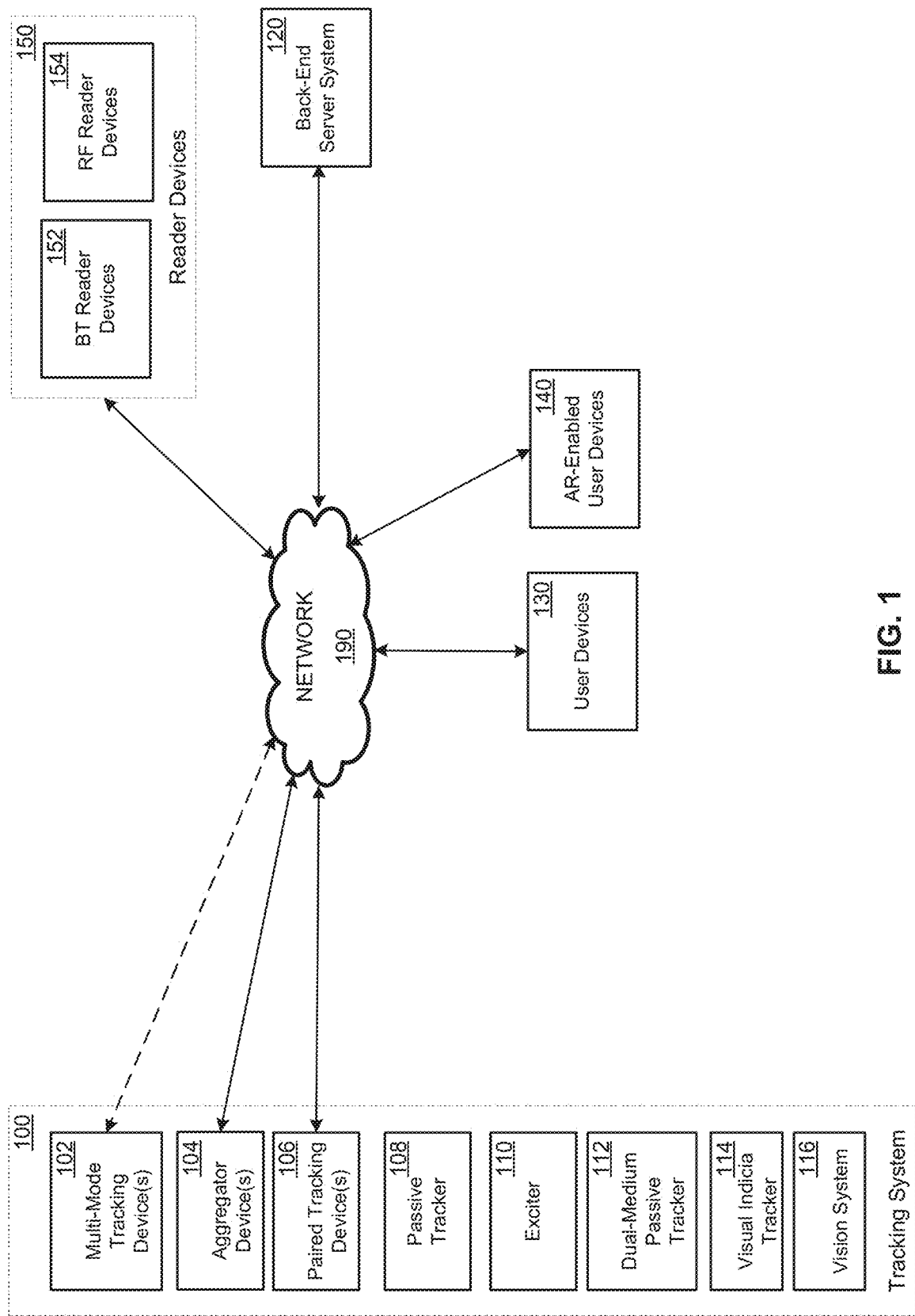
FIG. 1 is a schematic illustrating an example intelligent tracking system, including a tracking system and a backend server system.

FIG. 1 illustrates an intelligent tracking system 10. An intelligent tracking system 10 (or "system 10") may include one or more tracking device systems 100 (or "tracking systems 100") and a backend server system 120. In embodiments, the intelligent tracking system 10 may further include user devices 130 and/or augmented reality (AR)-enabled user devices 140. The system 10 may include additional components not shown.

A tracking system 100 may include one or more tracking devices. In embodiments, the tracking system 100 includes any combination of one or more multi-mode tracking devices 102, one or more aggregator device 104, one or more paired tracking devices 106, one or more passive tracking devices 108, one or more exciters 110, one or more dual-medium tracking devices 112, one or more visual indicia trackers 114, and one or more vision systems 116.

In embodiments, a multi-mode tracking device 102 is an electronic device that is configured to determine its geolocation and to report its geolocation to the backend server system 120 via a communication network. The multi-mode tracking device 102 may be configured to communicate with the server system 120 using long-distance communication (e.g., directly via the communication network (e.g., using a cellular connection)), or using short-distance communication (e.g., through an intermediate device in the tracking system 100 (e.g., the aggregator device 104)). For example, in some scenarios a multi-mode tracking device 102 may be in an environment that prohibits the multi-mode tracking device 102 from connecting to a cellular network or may be set to a mode where the multi-mode tracking device 102 is precluded from communicating via the cellular network. In these scenarios, the multi-mode tracking device 102 may transmit its location data to an aggregator device 104, which may transmit the location data to the backend server system 120. In embodiments, the multi-mode tracking device 102 may be also configured to determine other types of data that may be reported in addition to or in lieu of the location data. The multi-mode tracking device 102 may include one or more environmental sensors that collect data corresponding to the multi-mode tracking device 102 or an environment thereof. For example, the multi-mode tracking device 102 may determine and/or report temperature data indicating an ambient temperature in the environment of the multi-mode tracking device 102, motion data describing motion of the multi-mode tracking device 102, humidity data indicating a humidity of the environment of the multi-mode tracking device 102, light data indicating a degree of ambient light sensed in the environment of the multi-mode tracking device 102, and the like. In embodiments, the multi-mode tracking device 102 may periodically log the collected data, such that the multi-mode tracking device 102 may track the conditions of an item being shipped or stored in a log. For example, a multi-mode tracking device 102 may maintain a temperature log that defines the temperature of an environment proximate to the device over a period of time. These types of logs may be required when transporting items such as pharmaceuticals, chemicals, and food. In some embodiments, a multi-mode tracking device 102 may maintain a temperature log (or other data logs) on behalf of other devices that do not have sufficient processing or storage capabilities to keep such logs.

A multi-mode tracking device 102 may include a rechargeable battery (e.g., a 3.7V 6800 mAh lithium ion battery), such that it may be placed in an environment (e.g., a truck, warehouse, shipping container, and the like) where the multi-mode tracking device 102 may be moved and not connected to power for weeks or months.

An aggregator device 104 is an electronic device that is configured to aggregate location data from one or more devices in the tracking system 100 (e.g., multi-mode tracking devices 102, paired tracking devices 106, and/or passive tracking devices 108) and to report the location data to the backend server system 120. In embodiments, an aggregator device 104 is configured to authenticate various devices in the tracking system 100. In this way, counter-fitting of devices of a tracking system 100 may be averted.

In embodiments, an aggregator device 104 is a mobile aggregator device 104. A mobile aggregator device 104 may be an aggregator device 104 that is configured for portability. A mobile aggregator device 104 may include a rechargeable battery (e.g., a 3.7V 6800 mAh lithium ion battery), such that it may be placed in an environment where the aggregator device 104 may be moved and not connected to power for weeks or months.

In embodiments, an aggregator device 104 may be a fixed aggregator device. A fixed aggregator device may be an aggregator device 104 that is configured to be at a fixed location. A fixed aggregator device may be connected to a power source (e.g., an AC outlet). A fixed aggregator device may further be configured to perform more power intensive operations, such as determining locations of other devices of a tracking system, performing power intensive encryption operations, and the like.

In some embodiments, an aggregator device 104 may maintain data logs (e.g., temperature logs, humidity logs, and the like) on behalf of other devices (e.g., passive tracking devices 108) that do not have sufficient processing or storage capabilities to keep such logs. In this way, the aggregator device 104 may maintain a separate log for each passive tracking device 108. Each respective log may correspond to a respective passive tracking device 108 and may include a device identifier of the respective passive tracking device 108, a time stamp of each respective data item collected from the passive tracking device 108, and the data item corresponding to the time stamp.

In some embodiments, a multi-mode tracking device 102 may be set to function as an aggregator device 104. In embodiments, an aggregator device 104 may be configured to include an exciter device 110 (discussed further below).

A paired tracking device 106 may be an electronic device configured to determine its geolocation and report its geolocation to the backend server system via an aggregator device 104. A paired tracking device 106 may utilize a short-distance communication protocol to communicate with the aggregator device. In embodiments, the paired tracking device 106 may implement the Bluetooth™ or Bluetooth Low Energy™ communication protocol to communicate with an aggregator device 104. The paired tracking device 106 may include one or more environmental sensors that collect data regarding the paired tracking device 106 or an environment thereof, which the paired tracking device 106 may monitor to report the collected sensor data to the aggregator device 104. For example, the paired tracking device 106 may determine and/or report temperature data indicating an ambient temperature in the environment of the paired tracking device 106, motion data describing motion of the paired tracking device 106, humidity data indicating a humidity of the environment of the paired tracking device 106, light data indicating a degree of ambient light sensed in the environment of the paired tracking device 106, and the like. In embodiments, the paired tracking device 106 may periodically log the collected data, such that the paired tracking device 106 may track the conditions of an object being shipped or stored in a log (e.g., a temperature log).

A paired tracking device 106 may include a rechargeable battery (e.g., a 3.0V 6800 mAh lithium ion battery), such that it may be placed in an environment (e.g., a truck, warehouse, shipping container, and the like) where the paired tracking device 106 may be moved and not connected to power for weeks or months.

A passive tracking device 108 is a small low-cost electronic device that communicates with another device in the tracking system 100. Unlike the paired tracking devices 106 or the multi-mode tracking devices 102, the passive tracking device 108 does not include an onboard long-term power storage mechanism (e.g., no battery). Rather, the passive tracking device 108 is configured to be energized by an electromagnetic field (e.g., a radio frequency (RF) signal. This allows the passive tracking device 108 to be a small and relatively low cost tracking solution. It is noted that the passive tracking devices 108 may include short-term power storage mechanisms, such as capacitors to store a charge for a short duration that is obtained via energization. As will be discussed below, the tracking system 100 may include one or more exciters 110 that are configured to emit electromagnetic signals that energize the passive tracking devices 108. The exciters 110 may be stand-alone devices or may be integrated into another device of the tracking system 100 (e.g., in an aggregator 104 or multi-mode tracking device 102). A more detailed discussion on the use of RF-related technology may be found in U.S. Pat. No. 8,774,329 to Kawaguchi, the contents of which are herein incorporated by reference.

Referring back to FIG. 1, in embodiments, the passive tracking device 108 may include a small integrated circuit (e.g., <2 mm×2 mm) that may be integrated into a small form factor. For example, the passive tracking device 108 may be integrated into a label or tile less than 1 cm×1 cm in area. In this way, the passive tracking device 108 may be adhered to a package being shipped, inserted into a box of valuable goods (e.g., medical supplies), embedded in a clothing item (e.g., a shoe), or used in any other suitable scenario.

A passive tracking device 108 may communicate short messages to another device (e.g., aggregator device 104) that includes a device identifier ("device ID") that identifies the passive tracking device 108 from other passive tracking devices 108. By transmitting the short message, a passive tracking device 108 may confirm its presence in the proximity of the aggregator device 104. In embodiments, the passive tracking devices 108 include a Bluetooth™-enabled transceiver configured in accordance with the Bluetooth communication protocol(s). In embodiments, the passive tracking devices 108 may communicate with other devices (e.g., an aggregator device 108) having a Bluetooth-enabled transceiver. In embodiments, the Bluetooth-enabled transceiver utilizes the Bluetooth Low Energy (BLE) protocol (e.g., BLE-enabled transceivers). BLE is short-distance communication protocol developed by Bluetooth SIG that requires less power consumption than other Bluetooth communication protocols. In embodiments, the passive tracking devices 108 are configured to transmit beacons upon being energized. A beacon may be one or more data packets of fixed length that are encoded according to a communication protocol (e.g., Bluetooth™ or BLE). Beacons are non-limiting examples of short messages. In embodiments, the beacon may indicate a device identifier (ID) of the passive tracking device 108 transmitting the short message (e.g., beacon). A passive tracking device 108 may include additional data in the short message (e.g., beacon), including but not limited to, temperature data, motion data, and/or ambient light data. It is noted that an upstream tracker (e.g., an aggregator 104, multi-mode tracking device, or user device 120) or the backend server system 120 may apply a time stamp to the temperature data, motion data, and/or ambient light data received from a passive tracking device 108, as the passive tracking device 108 transmits the short message in close temporal proximity to when the passive tracking device 108 samples this data.

The passive tracking devices 108 may each include one or more antennas that are used to receive and transmit electromagnetic signals. In this way, an antenna may receive an electromagnetic signal to energize the passive tracking device 108 and/or may transmit an electromagnetic signal via a short-distance communication link (e.g., BLE) to another device of the tracking system 100. The passive tracking device 108 may transmit in very short distances (e.g., <2 m). In some embodiments, the passive tracking device 108 may be configured to transmit in longer distances (e.g., ~10 m) if sufficiently energized by another device. As mentioned, the passive tracking device 108 may be energized upon receiving an electromagnetic signal via the antenna. In embodiments, the antenna may be metallic paint or material that is applied to an outer housing of the passive tracking device 108. In these embodiments, the antenna may be painted to cover the entire housing, so as to improve the reception of the passive tracking device 108.

In embodiments, the passive tracking devices 108 may be configured with dual band antennas. For example, a passive tracking device 108 may include a dual band antenna that allows efficient energy harvesting at 900 MHz or 2.4 GHz and that transmits beacons at 2.4 GHz. In embodiments, the passive tracking devices 108 may be configured with multi-band antennas. For example, a passive tracking device 108 may be configured with a multi-band antenna that allows efficient energy harvesting from user device 130 (e.g., smartphones or tablets) signals at 700, 850, 1900 MHz as well as 900 and 2.4 GHz ISM band signals.

One issue that may arise with BLE-enabled transceivers in a passive tracking device 108 is that BLE-enabled transmitters can be implemented with a very simple RF and digital design, but receivers are much more complex to implement. Simple "transmit-only" passive BLE tacking devices can be significantly enhanced by a limited ability to securely receive and write data in a tag. The limitations may include only specialized devices with very close range and consistent high signal levels. The BLE protocol in the Bluetooth 5.0 specification requires data to be sent from master to slave devices using a connection event. This may require the passive tracking devices 108 to implement a more complex state machine and receiver than desired given the power and processing constraints of the passive tracking devices 108.

Thus, in some embodiments, the tracking system 100 may implement a proprietary version of BLE advertising packets to transmit both RF power and data from a powered device (e.g., an exciter 110) to a passive tracking device 108. Traditionally, a BLE advertising packet is a packet that may be transmitted by a BLE peripheral device to another BLE-enabled device (or Bluetooth-enabled device) to announce the peripheral device's presence to the other BLE-enabled device. In embodiments, a command structure can be embedded into the advertising data field. In some of these embodiments, the commands may include, but are not limited to: (i) Write mode (e.g., a very short and unique command to tell the passive tracking device 108 to listen; (ii) Authenticate Sender; (iii) Write Address and Data; (iv) Request Acknowledgement of Write Address and Status; and (v) Send Beacon With Acknowledgement (by passive tracking device 108).

In some embodiments, writing data to the tag can be accomplished with an amplitude-shift keying (ASK) modulation scheme on a constant wave to reduce the complexity of the receiver. In these embodiments, the passive tracking device 108 may include a UHF RFID reader if the passive tracking device 108 implements, for example, a basic C1G2 (Class-1, Generation-2) interface section and has a multi-band antenna. Additionally or alternatively, the passive tracking device 108 may combine a near field communication (NFC) tag and a passive BLE module.

Passive tracking devices 108 may communicate with a number of different types of devices. In embodiments, the passive tracking device 108 may communicate with an aggregator device 104, a multi-mode tracking device 102, an exciter 110, a user device 130, AR-enabled user device 140, and/or a reader device 150. In embodiments, the passive tracking devices 108 are configured to transmit beacons upon being energized. As mentioned, the beacon may indicate a device identifier (ID) of the passive tracking device 108 transmitting the beacon. In this way, the passive tracking device 108 announces its proximity to another device in the tracking system 100 each time the passive tracking device 108 is energized. In response to a beacon, the device receiving the beacon from the passive tracking device 108 may read the device ID of the device and may log the presence of the passive tracking device, as well as any other data transmitted in the beacon.

In embodiments, the passive tracking device 108 may encrypt the device ID, such that counterfeiting of passive tracking devices may be prevented. This may be very important in inventory management systems or tracking applications in general. For example, a malicious actor may try to counterfeit a passive tracking device in order to steal a package having an authentic passive tracking device 108 affixed thereon. In embodiments, the passive tracking devices 108 may implement a low power encryption algorithm to encrypt the device ID (or any other data that needs encryption). In embodiments, the passive tracking device 108 may utilize a shared secret key and a shared secret pattern to encrypt the device ID. The shared secret key may be a numeric value that is used to encrypt the device ID. The shared secret key may be stored on a respective passive tracking device and may be used to encrypt a message (e.g., a string of bits) to be encrypted. The authenticating device (e.g., an aggregator device 104, a backend server system 120, a user device 130, or an exciter 110) also knows the shared secret key and the shared secret pattern. The shared secret pattern defines a pattern in which bits are inserted into the message to be encrypted. For example, in a message containing up to 8 bytes, an example pattern may indicate that a bit is to be inserted between the first bit and a second bit, between the fifth and sixth bit, between the sixteenth and the seventeenth bit, between the $30^{th}$ and $31^{st}$ bit, between the $42^{nd}$ and $43^{rd}$ bit, and between the $50^{th}$ and $51^{st}$ bit. The passive tracking device may generate a random N-bit string (e.g., five bits in the example above), and may insert the respective bits from the N-bit string into the message to be encrypted in accordance with the secret pattern. The passive tracking device may then encrypt the message, having the N-bits inserted therein, using the shared secret key and may transmit the encrypted message. By utilizing a different random N-bit string to insert into the message to be encrypted (e.g., the device ID) at each iterative transmission, the encrypted message is ensured to vary between transmissions despite containing the same device ID and being encrypted by the same secret key. An authenticating device may receive the encrypted message and may decrypt the encrypted message using the shared secret key. The authenticating device may also remove bits from the decrypted message in accordance with the shared secret pattern to obtain the original message (e.g., remove the second bit, the seventh bit, the $18^{th}$ bit, the $34^{th}$ bit, the $47^{th}$ bit, and the $56^{th}$ bit). Upon authenticating a passive tracking device 108, the authenticating device or a device associated therewith, may confirm the presence of the passive tracking device in a general location.

In embodiments, the passive tracking device 108 may include one or more integrated sensors that allow the passive tracking device 108 to collect additional types of data. In embodiments, the passive tracking device 108 may include a temperature sensor. The temperature sensor may be a thermistor included in the integrated circuit that is used for other functions of the integrated circuit. In this way, the passive tracking device 108 may piggy-back a temperature reading from the temperature sensor without adding any additional sensors to the passive tracking device 108. Upon reading the temperature data from the temperature sensor, the passive tracking device 108 may include the temperature data in a beacon to be transmitted, thereby providing the instantaneous or current temperature of the environment of the passive tracking device 108. As the passive tracking devices 108 are not powered and have little or no storage capabilities, the passive tracking devices 108 may only be able to provide current temperature data. Another device (e.g., the aggregator device 104 or the backend server system 120) may receive the temperature data from a collection of passive tracking devices 108, may apply a time stamp to the temperature data, and/or may maintain a temperature log for each respective passive tracking device 108. In this way, items that are being shipped where a temperature log must be maintained can be tracked using the passive tracking devices 108. In these embodiments, a logging device (an aggregator device 104 having an integrated exciter 110) or combination of devices (e.g., an aggregator device 104 and an exciter 110) may periodically energize the passive tracking devices 108 in the vicinity thereof to obtain the temperature data from each respective passive tracking device 108 and may log the temperature data obtained therefrom in a temperature log, as discussed above. It is noted that in some embodiments, certain passive tracking tags may be configured as "passive temperature tracking tags." In these embodiments, passive temperature tracking tags can be included inside packages to measure the temperature of an item (e.g., a food item) inside the package. The passive temperature tracking tags may allow the system to track ambient temperatures inside the package, so that the temperatures inside and outside of the package may be compared.

In embodiments, a passive tracking device 108 may include a light sensor. In some of these embodiments, the light sensor is a photo-detector. A photo detector may output a first signal if the photo-detector has been exposed to a sufficient amount of light and a second signal if the photo-detector has not been exposed to a sufficient amount of light. Upon being energized, the passive tracking device 108 may include light data indicating whether the passive tracking device 108 has been exposed to light in a beacon that is transmitted to an aggregator device 108. In some embodiments, the photo-detector may further be configured to energize the passive tracking device 108 upon being exposed to light. In these embodiments, a passive tracking device 108 may transmit a beacon containing light data indicating the presence of light, upon the passive tracking device 108 being energized. In this way, the aggregator device 104 may determine whether a particular package or item has been opened. In embodiments, a visible or infra-red laser can be pointed at the one of a passive tracking devices 108. A passive tracking device 108 that is being illuminated by the visible or infra-red may be triggered to output a beacon where the light data in the beacon indicates that the passive tracking device 108 was illuminated.

In embodiments, the passive tracking devices 108 may be configured to include one or more motion sensors. For example, a passive tracking device 108 may include an accelerometer (e.g., a MEMS accelerometer). In these embodiments, an accelerometer may be integrated into the passive tracking devices 108 to enable identifying passive tracking devices that are in motion. The accelerometer may output a signal indicating a magnitude of the movement of the passive tracking device in any direction. This information can be used to determine if the passive tracking device 108 is moving at a walking acceleration, a driving acceleration, a plane acceleration, and the like. In embodiments, a passive tracking device 108 may be configured to transmit beacons more often, less often, or not at all when it the passive tracking device is determined to be in motion.

In embodiments, the passive tracking devices 108 may transmit beacons to user devices 120 and/or AR-enabled devices 130. A user device 120 may be any suitable electronic device that has a user interface. For example, a user device 120 may be a smart phone, a tablet computing device, a gaming device, a scanner, and the like. An AR-enabled device 130 may be a device that is configured to display computer generated overlays onto a screen. Examples of AR-enabled devices include smart phones, tablet computing devices, smart-glasses (e.g., Google Glass®), video game devices, and the like.

In embodiments, the passive tracking devices 108 include one or more oscillators to enable transmission of an electromagnetic signal. In certain scenarios, BLE requires accurate carrier frequency to transmit a beacon. Crystals are very accurate, but are typically in very large packages. As such, in some embodiments, the oscillators of the passive tracking devices 108 are MEMS oscillators that use tiny resonators that are bonded to a single silicon chip. This enables lowest cost and size solution for a fully integrated passive tracking device. While MEMS oscillators have limitations (e.g., longer turn on time, high phase noise, die mounting directly on silicon, tuning calibration, etc.), the passive tracking devices 108 may be configured to schedule turn on time for the oscillator at lower energy storage levels than the main circuitry. In some embodiments, the crystal oscillator silicon die are integrated into the same package as the silicon chip of a passive tracking device 108.

An issue that may arise from using available silicon technology in a passive tracking device 108 is that RF-voltage levels of 100 mV or more are desirable at the inputs of voltage rectifying circuits for energy harvesting. These types of circuits begin to follow a square-law behavior at these voltages, which means a harvesting efficiency which scales with input voltage. In order to obtain desired voltages at lower power levels (e.g., <-20 dbM), a higher parallel equivalent input resistance may be required. The Q of the resulting circuit may consist of the impedance of this parallel resistance in relation to the impedance of the parallel input impedance of the circuit. In order to build usable passive tracking devices 108, it is desired that the input Q of the circuit not become too high. Therefore, it is desirable to reduce the input capacitance to as low a value as possible. One of the large contributions to input capacitance is the electrostatic discharge (ESD) structure that is generally used on the antenna inputs to protect devices during manufacture and handling. Thus, to reduce the input capacitance, ESD protection may be applied in a manner that can be removed after the device is mounted into its form factor. For example, ESD protection may be removed after the silicon chip of the passive tracking device 108 is attached to the inlay of the passive tracking device (e.g., a plastic sheet with a metallic coating that acts as the antenna). It is assumed that in the inlay, the antenna terminals may be shorted with a DC path so that ESD protection is no longer necessary. Initially, during fabrication, handling, and testing, the ESD devices are connected to the antenna input by one or more links. In embodiments, the links may be circuit connections that are made inside the silicon chip of the passive tracking device. The links may be metallic traces formed in the silicon substrate during the fabrication process. After the antenna circuit is attached, and a DC path is established between the antenna circuit and the silicon chip, the one or more links can be removed, thereby reducing the effective input capacitance and improving performance of the passive tracking device. The links can be removed in any suitable manner. For example, the links can be removed mechanically (e.g., physically cut), chemically (etched), or optically.

In embodiments, a passive tracking device 108 may be energized by an exciter 110. An exciter 110 may be a stand-alone device or may be integrated into another device of the tracking system 100 (e.g., in a multi-mode tracking device 102 or an aggregator device 104). In embodiments, the exciter 110 may broadcast an electromagnetic signal (e.g., an RF signal) that may energize any passive tracking devices 108 in proximity to the tracking device 108. Furthermore, in some embodiments, an exciter 110 may be configured to receive beacons encoded in an electromagnetic signal from one or more passive tracking devices 108 in proximity to the exciter 110. In embodiments, the exciter 110 may be configured in a multi-band manner, whereby the exciter 110 may transmit at electromagnetic signals at a first frequency (e.g., 900 MHz) and may receive electromagnetic signals at a second frequency (e.g., 2.4 GHz).

One issue that arises is that passive tracking devices 108 are limited in range by the minimum RF-level required to provide power to the device's chip. Once the passive tracking device 108 has sufficient power to transmit a beacon, the range at which the beacon can be heard by other devices (e.g., exciters 110) is much farther. Thus, in some embodiments, supplemental exciters 110 to provide RF energy to passive tracking devices 108 may be placed in strategic locations, thereby enabling other devices (e.g., user devices 120, aggregator devices 104, and/or multi-mode tracking devices 102) to receive beacons from passive tracking devices 108 without having to power the passive tracking devices themselves.

In embodiments, exciters 110 are placed in strategic locations and transmit electromagnetic signals at a predefined duty cycle and up to a predefined power level. For example, in some embodiments, an exciter 110 may be configured to transmit at a duty cycled 2.4 GHz energy sourcing signal with transmit power up to 30 dBm and an antenna gain of up to 6 dBi. In this way, the exciter 110 may be configured to increase the energizing range in specific zones. In embodiments, the exciters 110 may be one Watt, 900 MHz frequency hoppers. This may reduce or eliminate any interference concerns at 2.4 GHz and provide more power at a lower carrier frequency with less path loss. In embodiments, the exciters 110 may form a self-coordinated network via Ethernet, WiFi, and/or Bluetooth. The FCC Part 15.247 which specifies maximum power and spread spectrum requirements in ISM band may be found at: https://www.gpo.gov/fdsys/pkg/CFR-2013-title47-vol1/pdf/CFR-2013-title47-vol1-sec15-247.pdf, the contents of which are herein incorporated by reference in their entirety.

In embodiments, the exciters 110 may also implement 2.4 GHz receivers to listen for BLE beacons from passive tracking devices 108 while transmitting energy at 900 MHz and building up an inventory in the cloud. In embodiments, the 2.4 GHz antennas in an exciter 110 may include multiple antennas and radios for angle of arrival calculation. In these embodiments, the exciter 110 (or an aggregator 104 that may include or be in communication with an exciter 110) may utilize the signal strength at the different multiple antennas and/or radios to determine an approximate location of a respective passive tracking device 108 based on the different signal strengths of the received signal sensed at each antenna or radio and/or the angle of arrival of the received signal, as well as the known location of the exciter 110. In embodiments, the location, pointing orientation, exciter power output, and the like of one or more exciters 110 may be calibrated with a single beacon device and/or an application running on a user device. In embodiments, the passive tracking devices 108 may be configured with dual band antennas. For example, a passive tracking device 108 may include a dual band antenna that allows efficient energy harvesting at 900 MHz or 2.4 GHz and that transmits beacons at 2.4 GHz. In embodiments, the passive tracking devices 108 may be configured with multi-band antennas (e.g., 700, 850, 1900 MHz as well as 900 and 2.4 GHz ISM antennas). For example, the multi-band antennas may provide for efficient energy harvesting from user device (e.g., cell phone signals) at 700, 850, 1900 MHz as well as 900 and 2.4 GHz ISM band signals.

It is noted that in some embodiments, the supplemental transmission and beacon reading functionality described with respect to the exciters 110/aggregators 104 may be embedded in a smart home central device. In these embodiments, a user device application can access this data when it comes in proximity to the supplemental transmitter.

A dual-medium passive tracking device 112 may be a type of passive tracking device 108 that supports two different communication methods. Thus, in embodiments, the dual-medium passive tracking devices 112 may be configured in accordance with the passive tracking devices 108 discussed above, but may include additional configurations to support the transmission of data (e.g., short messages) via an RFID backscatter radio in addition to a BLE radio. In this way, a dual-medium passive tracking device 112 may be energized by an electromagnetic signal and may output a message via one or both radios (BLE and/or RFID). The addition of an RFID backscatter radio to the passive tracking devices 108 may increase the cost of the dual-medium passive tracking device by only, for example, half a cent per unit, but provides a number of advantages as the dual-medium passive tracking device 112 realizes the advantages of both mediums. For example, the dual-medium passive tracking device 112 may maintain the longer read distances of up to 40 meters due to the BLE capabilities, but may also maintain the security measures provided by RFID. Furthermore, the dual-medium passive tracking devices 112 allow a product to be tracked throughout its lifecycle, rather than limited through the supply chain or after the point of sale.

Figure 2:
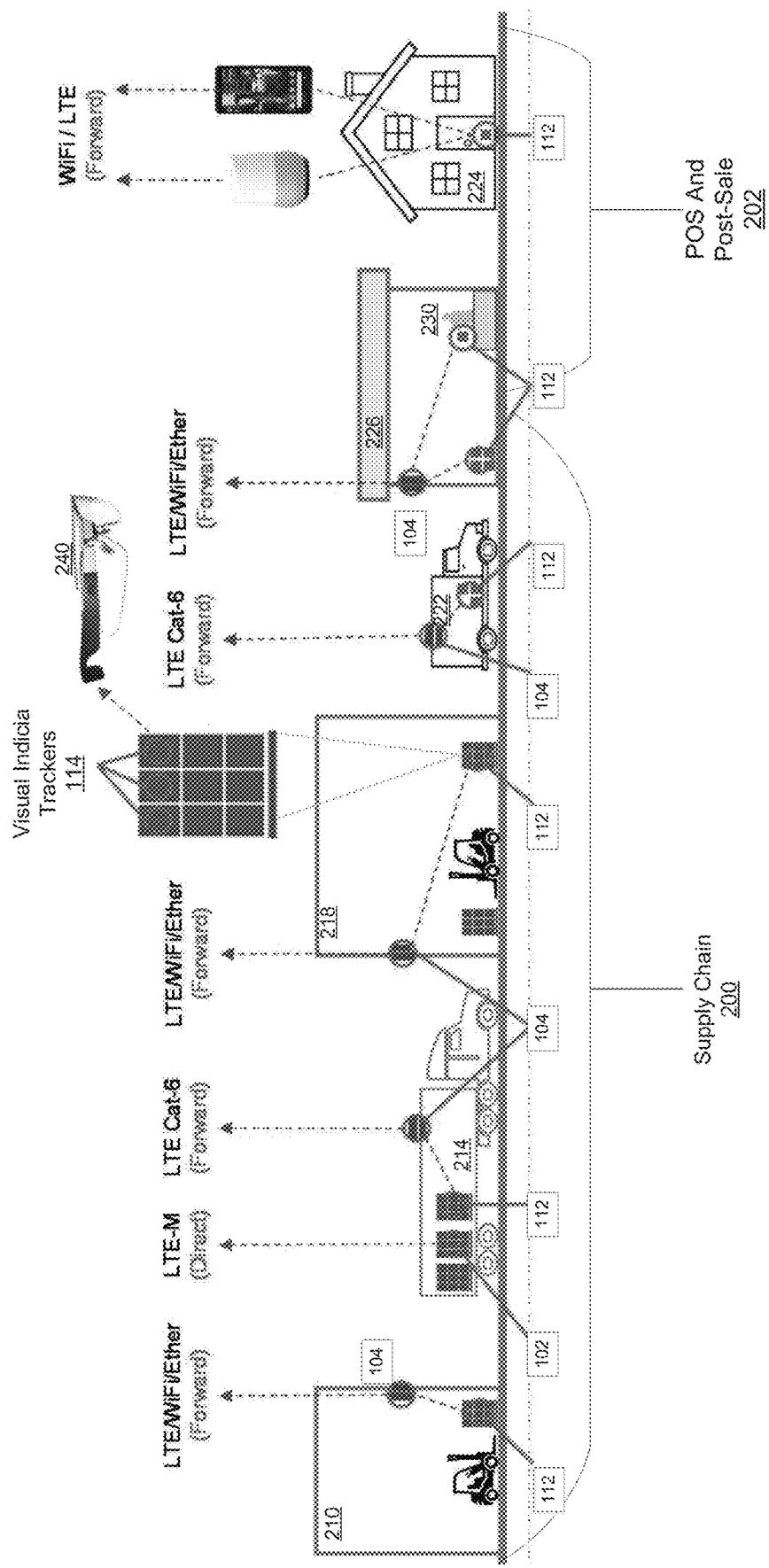
FIG. 2 is a schematic illustrating an example lifecycle of a product according to some embodiments of the present disclosure.

FIG. 2 illustrates an example lifecycle of a product. The exemplary lifecycle is divided into a supply chain side 200 and a post-sale side 202. In an example supply chain side, a product may begin its lifecycle in a manufacturing facility 210, from where the product is transported via a shipping vehicle 214 (e.g., a truck, a train, a plane, and/or a ship). In some scenarios, the product is shipped to a warehouse 218, where the product awaits delivery. In some scenarios, the product may then be loaded onto a delivery vehicle 222 (e.g., a truck or car) and delivered to a retail store 226. It is noted that in other scenarios, a seller of the product may ship the product to a consumer directly, if the purchase is made via, for example, an ecommerce website or by phone. Once the product reaches the retail store 226, it may be placed in the shelves or kept in inventory until it is purchased at a point of sale 230. Once the product is purchased, it can be thought of as in its post-sale segment of the product lifecycle (e.g., at a home 234, business (not shown), or the like).

In the supply chain side 200 of a product life cycle, most legacy systems rely heavily on RFID. Products are routinely scanned throughout the journey in the supply chain and the common form of scanning is done using RFID tags and readers. At the point of sale, and once a product reaches its final destination (e.g., a home or business), Bluetooth-enabled devices are more prevalent, which makes BLE a more convenient form of tracking. In the example above, the RFID functionality allows a product to be tracked using, for example, an aggregator device 104 while in the manufacturing facility 210, in a shipping vehicle 214, at a warehouse 218, in a delivery vehicle 222, and/or at a retail facility 226. During this process, various parties involved in the supply chain may also use legacy RFID devices to scan the dual-medium passive tracking device 112 in the normal course of business. Furthermore, as new technologies emerge (e.g., smart glasses 240), these new devices may begin leveraging the Bluetooth-scanning capabilities of the tracking device 112 and/or may scan visual indicia trackers 114 affixed to an item. Once a product is at the point of sale 230, the dual-medium passive tracking device 112 may be scanned using Bluetooth or RFID, depending on the capabilities of the retailer. Once the product is sold, the owner of the product may rely on the Bluetooth capabilities to track or otherwise inventory the product.

Visual indicia 114 may be any text, marking, pattern, and/or image that is encoded with a value. Examples of visual indicia 114 may include UPC and QR-Codes. In embodiments, visual indicia 114 (e.g., UPC and/or QR-codes) may be used in the tracking system 100 as a means to track an item using scanning technologies and/or machine-vision. In embodiments, the visual indicia 114 may be used as a redundancy with the other tracking devices described above. For example, a visual indicia may be tracked using a vision system 116 in environments such as a shipping facility or production line. The value embedded in each visual indicia 114 may be a unique value that identifies the item to which it is affixed from other items. In some embodiments, a central system (e.g., the backend system) may assign the value to embed in a visual indicia 114 before it is printed. In other embodiments, a scheme may be implemented where each entity having the ability to generate visual indicia. For example, any company that prints visual indicia 114 to be used in the tracking system 100 may be assigned a unique value that makes up a portion of the value, which may then be combined with another value that is generated by the company and that is unique with respect to the company, whereby the unique value is associated with the item to be tracked. It is noted that these techniques for printing values may be used to embed values in other tracking devices of the tracking system. Once printed and assigned to an item, the value may be associated with the certain item.

A vision system 116 may include one or more cameras that monitor an area and any devices needed to route the video streams/depth streams to an aggregator device 104 and/or a backend system 120. In some embodiments, the cameras include 3D cameras that capture video and depth information. Alternatively or alternatively, any combination of video cameras, infrared cameras, depth cameras, and the like, may be included in a camera system. A vision system 116 may include a network device (e.g., WIFI, LTE, etc.) and/or a short-distance communication device (e.g., Bluetooth enabled chip) that streams the captured stream(s) to an aggregator device 104 and/or a backend system 120.

Figure 3:
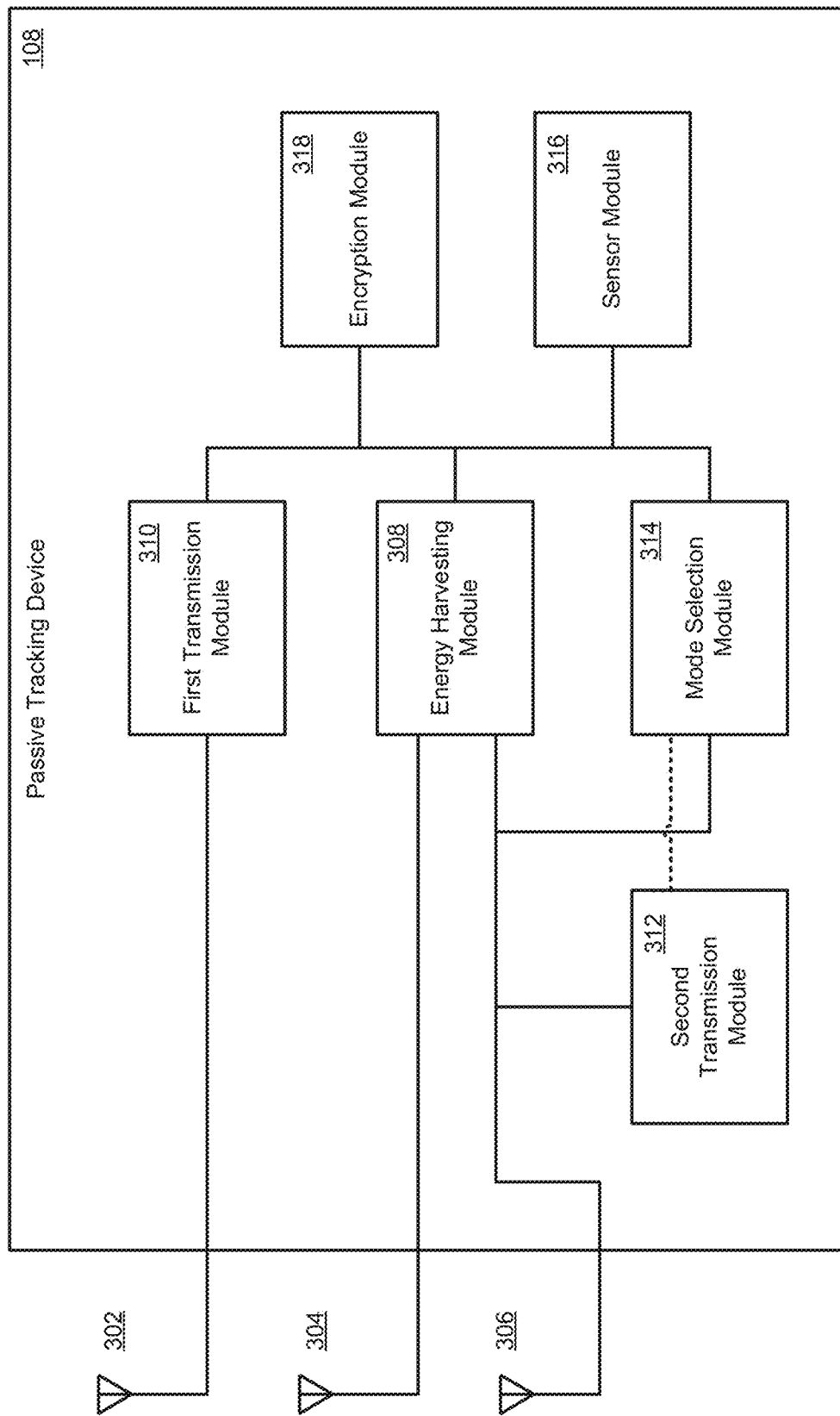
FIG. 3 is a schematic illustrating an example configuration of a passive tracking device according to some embodiments of the present disclosure.

FIG. 3 illustrates an example passive tracking device 108 (such as a dual medium tracking device 112) according to some embodiments of the present disclosure. In some embodiments, the passive tracking device 108 allows for multi-band operation by simultaneously harvesting energy on a first frequency band and transmitting on the same frequency band or a different frequency band. According to some embodiments, the passive tracking device 108 is configured for multi-mode multi-band operation by communicating as a passive BLE or Wi-Fi (e.g., 2.4 GHz) or EPC RF ID (e.g., 900 MHz) tag, depending on the signals it receives.

In embodiments, the passive tracking device 108 includes a first antenna 302, a second antenna 304, a third antenna 306, an energy harvesting module 308, a first transmission module 310, a second transmission module 312, and a mode selection module 314. In some embodiments, the passive tracking device 108 may further include a sensor module 316 that includes one or more different types of sensors and/or an encryption module that encrypts packets that are transmitted by the passive tracking device 108.

In embodiments, the passive tracking device 108 receives energizing signals and transmits response signals on one or more of a plurality of frequency bands via the first, second, and third antennas 302, 304, 306. As used herein, a response signal may refer to any type of signal that is transmitted by a passive tracking device 108 in response to being energized. Response signals may include RFID signals, beacon signals that are transmitted according to the Bluetooth, BLE, or WiFi protocol signals, or signals transmitted according to any other suitable protocol. The first antenna 302 is configured to transmit response signals on a first frequency band. The second antenna 304 is configured to receive energizing signals on a second frequency band. The third antenna 306 is configured to both receive energizing signals and transmit response signals on a third frequency band. The first, second and third frequency bands may be frequency bands commonly used for Wi-Fi, Bluetooth, Bluetooth Low Energy (BTE), RFID, or any other suitable form of signal transmission and/or reception. Example frequency bands that an antenna may receive or transmit at may include 2.4 GHz, 5 GHz, 900 MHz, 700 MHz, and/or combinations thereof. In some embodiments, the first and second frequency bands are the same. For example, in some embodiments, the first and second frequency bands may be 2.4 GHz, while the third frequency band is 900 MHz. The first, second, and third antennas 302, 304, 306 allow a passive tracking device 108 to receive energizing signals from and transmit response signals to several different types of devices over several different frequency bands. Each of the first, second, and third antennas 302, 304, 306 may be a dipole antenna, a monopole antenna, an array antenna, a loop antenna, or any other suitable type of antenna. It is further noted, that in embodiments the passive tracking device 108 may include less (e.g., two or less) or more (four or more) antennas.

The energy harvesting module 308 is configured to at least partially convert RF electrical energy, in the form of alternating current electrical energy, from energizing signals received via the first, second, and third antennas 302, 304, 306 to DC electrical energy and to provide the DC electrical energy to one or more of the mode selection module 314, the first and second transmission modules 310, 312, the encryption module 318, and the sensor module 316. In embodiments, the energy harvesting module 308 receives an energizing signal at least partially made up of RF electrical energy from the second and/or third antennas 304, 306. In some embodiments, the energy harvesting module 308 receives RF electrical energy (also referred to as an "energizing signal") from either or both of the second antenna 304 and the third antenna 306. In some embodiments, the energy harvesting module 308 is configured to transform energizing signals received from the second antenna 304 from low-impedance signals to high-impedance signals, thereby increasing an amount of energy to be harvested from the transformed signals via impedance matching. By converting RF electrical energy from energizing signals received from the second and/or third antennas 304, 306, to DC electrical energy and providing DC electrical energy to other components of the passive tracking device 108, the passive tracking device 108 is able to substantially operate independently of a discrete power source, such as a battery or an AC-DC adapter connected to a power grid.

In some embodiments, the energy harvesting module 308 includes an energy storage device, such as a storage capacitor, that stores energy for transmission to other components of the passive tracking device 108. In some embodiments, the energy harvesting module 308 indicates to the mode selection module 314 when a sufficient amount of energy has been harvested to supply components of the passive tracking device 108. When a sufficient amount of energy has been harvested by the energy harvesting module 308, the mode selection module 314 may determine whether to operate the passive tracking device in a first mode (e.g., BLE or WiFi) or a second mode (e.g., RFID). The mode selection module 314 may then determine whether to operate the passive tracking device 109 in the first mode or the second mode based on the frequency band of the energy harvesting signal and/or the contents thereof (e.g., whether the energizing signal was received at 2.5 GHz or 900 MHz and/or whether the energizing signal contains RFID commands).

In embodiments, the first transmission module 310 is configured to modulate response signals for transmission on the first frequency band. For example, the first transmission module 310 may modulate response signals (e.g., beacon signals modulated according to the BLE protocol at, for example, 2.4 GHz) when the energy harvested by the energy harvesting module 314 sufficiently energizes the passive tracking device 108 and the mode selection module 314 determines that the passive tracking device 102 is to operate in a first mode (e.g., based on the contents of the energizing signal harvested by the energy harvesting module 314). The first transmission module 310 outputs modulated response signals having a carrier frequency substantially equal to the first frequency band, such that devices capable of receiving signals on the first frequency band may receive the response signals.

In embodiments, the response signals may each include one or more data packets or other suitable data structures. For example, in embodiments, a response signal may include a device ID of the passive tracking device 108, which may or may not be encrypted/obscured by the encryption module 318. Furthermore, in some embodiments, the first transmission module 310 may include additional data in a response signal. For example, the first transmission module 310 may obtain sensor data from one or more sensors of the sensor module 316, which the first transmission module 310 encodes into the response signal. In some of these embodiments, the first transmission module 310 may be configured with logic (e.g., one or more rules and/or conditions) that governs the inclusion of additional data (e.g., sensor data) in the response signal. For example, the first transmission module 310 may be configured to only include sensor data in a response signal if one or more values included in the sensor data is above or below a threshold. In a specific example, the first transmission module 310 may be configured to only include thermal sensor data in the response signal if a measured temperature value exceeds an upper temperature threshold (e.g., >60° C.) or is less than a lower temperature threshold (e.g., <5° C.). In another specific example, the first transmission module 310 may be configured to only include shock sensor data in the response signal if a measured shock value exceeds an acceleration threshold (e.g., >2 G). The foregoing specific examples of rules and conditions are provided for example only and not intended to limit the disclosure.

In embodiments, the second transmission module 312 is configured to prepare response signals for transmission on the third frequency band (e.g., 900 MHz). In these embodiments, the second transmission module 312 may be configured to output prepared response signals to the third antenna 306 for transmission when the passive tracking device 108 operates in a second mode. In some embodiments, the second transmission module 312 prepares the response signals by modulating the response signals. The passive tracking device 108 operating in the second mode may be advantageous for several reasons, such as to communicate with devices that can receive signals over the third frequency band, to communicate with devices that can understand communication protocols implemented by the second transmission module 312 in transmitting over the third frequency band, to transmit within a suitable range, etc. In embodiments, the passive tracking device 108 may operate in the second mode when the response signal is being read by a device that receives signals via the third frequency band. For example, the reading device may energize the passive tracking device 108 with an energizing signal modulated at 900 MHz and the energizing signal may contain EPC RFID commands, thereby indicating that the reading device receives and reads signals provided in accordance with the EPC RFID protocol.

In embodiments, the second transmission module 312 outputs prepared response signals having a carrier frequency substantially equal to the third frequency band, such that devices capable of receiving signals on the third frequency band may receive the signals. For example, in embodiments, the second transmission module 312 sends and receives signals within an RFID frequency band (e.g., 900 MHz). In these embodiments, the second transmission module 312 may adhere to an RFID communication protocol. For example, the second transmission module 312 may output signals in accordance with an EPC communication protocol, an ISO RFID standard, an ISO/IEC RFID standard, an ASTM RFID standard, or any other suitable standard or protocol. In some embodiments, the second transmission module 312 includes a backscatter switch. In these embodiments, the second transmission module 312 is configured to actuate the backscatter switch to prepare a signal having a carrier frequency substantially equal to the third frequency band for transmission on the third antenna 306. In some embodiments, the second transmission module 312 may prepare and transmit response signals by actuating the backscatter switch, thereby toggling impedance of the third antenna. In some embodiments, for example, the second transmission module 312 may allow the passive tracking device 108 to transmit via the third frequency band using substantially zero energy or a very small amount of energy by transmitting on the third frequency band via backscattering an incoming RFID signal. In some embodiments, the second transmission module 312 may also be configured to transmit limited types of data in accordance with, for example, the EPC communication protocol. In these embodiments, the response signal output by the second transmission module 312 may be limited to information such as a device identifier of the tracking device, and may exclude, for example, sensor data collected by the sensor module 316. Refraining from including one or more types of information in response signals may allow the passive tracking device 108 to further save energy while operating in the second mode and transmitting via the second transmission module 312 rather than expending more energy by operating in the first mode and transmitting via the first transmission module 310.

In embodiments, the mode selection module 314 is configured to determine whether the passive tracking device 108 is to transmit in the first mode or second mode. For example, in embodiments the mode selection module 314 may determine whether to transmit a response signal using BLE (first mode) via the first transmission module 310 or RFID (second mode) via the second transmission module 312. In embodiments, the mode selection module 314 may receive an energizing signal and may determine the operation mode based on the frequency of the energizing signal and/or the contents of the signal (e.g., whether there is an RFID header in the signal followed by a complete RFID message). In some embodiments, the passive tracking device 108 may operate in the first mode as a default, unless the mode selection module 314 determines that the passive tracking device is to operate in the second mode. In embodiments, the passive tracking device 108 may operate in the first mode unless one or more conditions are met, in which case the passive tracking device 108 operates in the second mode. In some of these embodiments, the mode selection module 314 may receive signals from the third antenna 306. Upon receiving an energizing signal from the third antenna 306, the mode selection module 314 is configured to determine whether the passive tracking device 108 operates in a first mode or a second mode based on the contents of the energizing signal.

In example embodiments where first mode corresponds to a BLE communication mode and the second mode corresponds to an RFID communication mode, the third antenna may be an RFID antenna that receives and transmits according to an RFID protocol, the passive tracking device 108 may be configured to operate in the first mode as a default, and the mode selection module 314 may select the second mode based on a received energizing signal. For example, when a signal is received via the third antenna 306, the mode selection module 314 may determine whether the signal contains an EPC header and a corresponding EPC command. In this scenario, the mode selection module 314 may instruct the second transmission module 312 to respond in the second mode. If the energizing signal is received via the second antenna 304 and/or the received signal does not contain an EPC header and/or contains a command to operate in the first mode, the mode selection module 314 operates in the first mode. When the mode selection module 314 determines that the passive tracking device 108 operates in the second mode, the passive tracking device 108 transmits a signal via the third antenna 306 on the third frequency band, such that devices capable of receiving signals on the third frequency band may receive the signal. In some embodiments, the mode selection module 314 determines that the passive tracking device 108 operates in the first mode if no signal has been received on the third antenna 306 and only determines that the passive tracking device 108 operates in the second mode if both a signal has been received on the third antenna 306 (e.g., on the third frequency band) and the signal received on the third antenna 306 contains a message of a specified type, e.g., a message containing an RFID message header. If the message is not of the specified type, e.g., the message does not contain an RFID header or is otherwise invalid, the mode selection module 314 determines that the passive tracking device 108 operates in the first mode.

In embodiments, the passive tracking device includes a sensor module 316. In these embodiments, the sensor module 316 may include one or more sensors that generate sensor data. Examples of sensors may include, but are not limited to, temperature sensors (e.g., thermistors, heat flux sensors, or bulk acoustic wave temperature sensors), light sensors (e.g., photon detectors), sound sensors (capacitive-based sound sensor), humidity sensors (capacitive-based humidity sensors, resistive-based humidity elements, thermal-based humidity sensors), motion sensors (e.g., accelerometers, gyroscopes), shock sensors (e.g., sensors that are triggered when a threshold amount of shock is detected), acceleration sensors (e.g., accelerometers, gyroscopes), or any other suitable sensors. In some embodiments, the sensors are configured to provide real-time (e.g., substantially instantaneous) readings that are indicative of one or more conditions of the environment of the passive tracking device 108 at the time that the passive tracking device 108 is powered. For example, values such as temperature and humidity may be measured upon the passive tracking device 108 being energized. In some embodiments, the sensors are configured to indicate whether one or more conditions had been met at some point before the passive tracking device 108 is energized. For example, a sensor may record whether a certain condition has been reached (e.g., light was detected by the sensor, a minimum amount of force was detected, a temperature or humidity exceeded a lower limit or went below a lower limit, etc.). In these embodiments, the state of the sensor may be indicative of an occurrence of a specific condition, such that sensor data read before the occurrence of the specific condition is different than sensor data read after the occurrence of the specific condition. In this way, an approximation of when the specific condition occurred may be determined from a series of responses from the passive tracking device 108. In some embodiments, one or more of the sensors may record that a condition has been met without the one or more sensors being powered. For example, a light sensor may include a photosensitive film that undergoes a measurable change when exposed to light, or a shock sensor may include a component that changes physical position only upon the shock sensor receiving an amount of force receiving a threshold, thereby indicating that the condition has been met. Upon receiving an energizing signal or otherwise preparing a signal for transmission, the sensor module 316 may indicate to one or more of the first and second transmission modules 310, 312 that the condition has been met such that the passive tracking device 108 can include information related to the condition having been met in one or more signal transmissions, such as time stamps indicating when the condition was met. In some embodiments, one or more of the sensors may be a bulk acoustic wave sensor (e.g., a bulk acoustic wave temperature sensor).

In embodiments, the sensor module 316 is configured to output sensor data generated by the one or more sensors to the first transmission module 310 only when the passive tracking device 108 communicates in the first mode. In some embodiments, the sensor data is not transmitted when operating in the second mode. Alternatively, in some embodiments, the sensor module 316 is configured to transmit sensor data generated by the one or more sensors to the second transmission module 312 when the passive tracking device 108 communicates in the second mode or the first mode. In these embodiments, upon receiving sensor data from the sensor module 316, the first transmission module 310, and the second transmission module 312 are each configured to include the sensor data in modulated signals transmitted by the first antenna 304 and the third antenna 306, respectively.

In some embodiments, the passive tracking device 108 includes a storage device, e.g., non-volatile random-access memory (NVRAM). In some of these embodiments, the sensor module 316 may be configured to store sensor data in the storage device.

It should be appreciated that while the sensor module 316 is described in context of multi-mode embodiments of the passive tracking device 108, the sensor module 316 may be similarly or substantially identically implemented in single-mode embodiments of the passive tracking device 108, multi-mode tracking devices 102, paired tracking devices 104, and the like.

In some embodiments, the encryption module 318 is configured to encrypt messages transmitted by the passive tracking device 108. In some of these embodiments, the encryption module 318 only encrypts messages transmitted using the first mode (e.g., BLE or Wi-Fi) when the protocol used in the second mode (e.g., EPC RFID) does not support a similar encryption algorithm. In some embodiments, the encryption module 318 is configured to output encrypted messages (e.g., to the first transmission module 310) upon being energized by the energy harvesting module 308. In some embodiments, the encryption module 318 utilizes a secret key and a secret pattern to encrypt a response message, as discussed throughout this disclosure, to obtain an encrypted message (e.g., an encrypted data packet). The encryption module 318 may output the encrypted message to, for example, the first transmission module 310, which in turn transmits the encrypted message via the first antenna 302.

In some embodiments, the encryption module 318 may be further configured to output the encrypted message to, for example, the second transmission module 312, which in turn transmits the encrypted module via the third antenna 364. Upon receiving an encrypted message from the encryption module 318, the first transmission module 310 and the second transmission module 312 are each configured to include the encrypted message in modulated and/or prepared signals transmitted by the second antenna 304 and the third antenna 306, respectively. Encrypted messages encrypted by the encryption module 318 may include an identifier of the passive tracking device 108, such as an RFID identifier or a BLE identifier. In some embodiments, EPC identifiers are encrypted for transmission over BLE. It should be appreciated that while the encryption module 318 is described in context of multi-mode embodiments of the passive tracking device 108, the encryption module 318 may be similarly or substantially identically implemented in single-mode embodiments of the passive tracking device 108 (e.g., passive tracking devices 108 that transmit using BLE only), the multi-mode tracking devices 102, the paired tracking devices 104, and other suitable tracking devices.

It is noted that in some embodiments, the passive tracking device of FIG. 3 may be a single mode passive tracking device. For example, in some embodiments, the passive tracking device 108 may be implemented as a BLE tracking device without the third antenna 308, the second transmission module 312, and the mode selection module 314. In some of these embodiments, the passive tracking device 108 may be energized using the second antenna at a first frequency band (e.g., 2.5 GHz) and may transmit response signals using the first antenna using the same frequency band (e.g., 2.5 GHz). In other embodiments, the passive tracking device 108 may be implemented as a BLE tracking device without the second transmission module 312 and the mode selection module 314. In these embodiments, the passive tracking device 108 may harvest energy using the second antenna 304 at a first frequency band (e.g., 2.5 GHz) or the third antenna 306 at a second frequency band (e.g., 900 MHz), but will only transmit at the first frequency band (e.g., 2.5 GHz). The passive tracking device 108 may be configured in a similar manner to only support RFID transmissions, whereby the device may not include the first transmission module 310 and the mode selection module 314.

Figure 4:
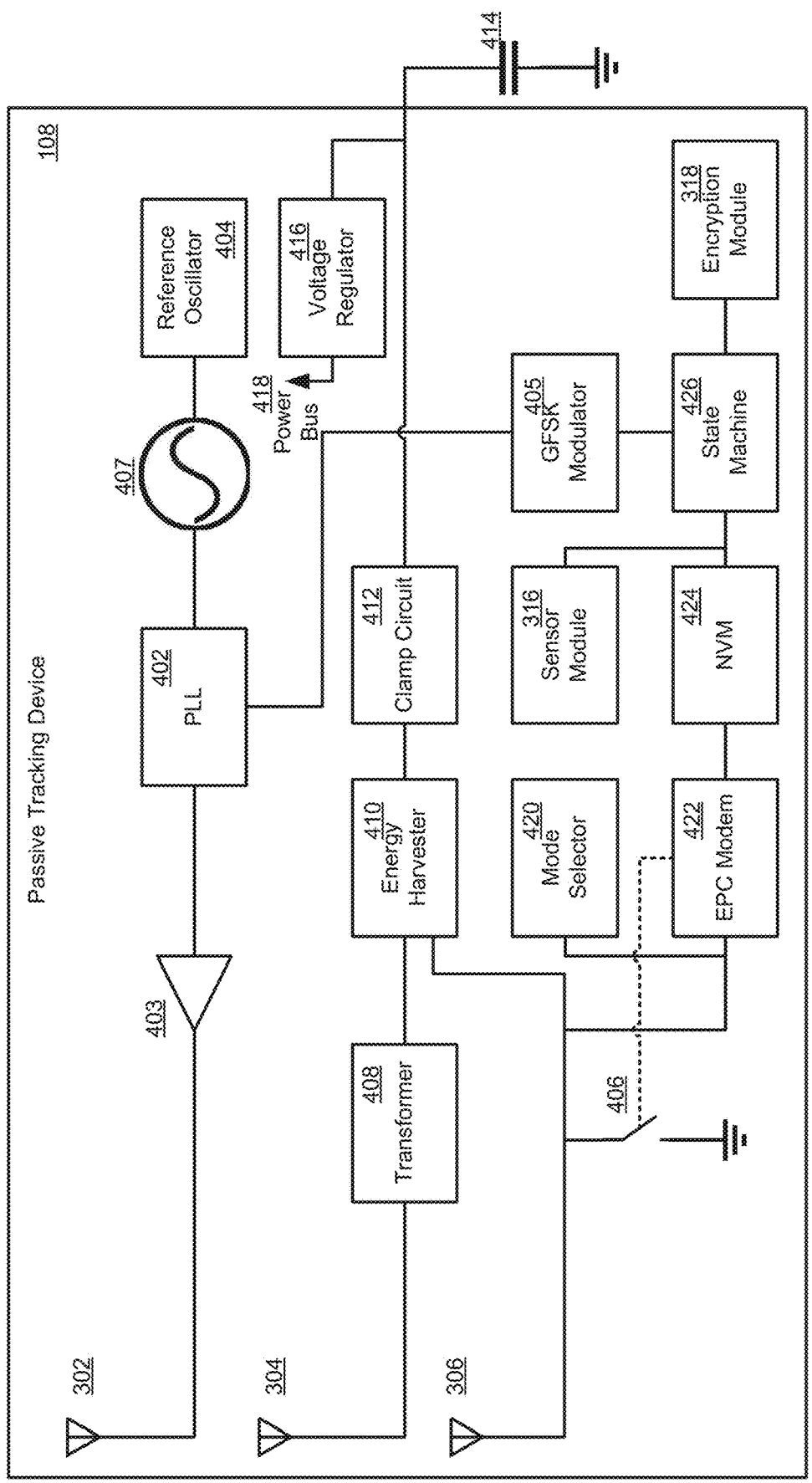
FIG. 4 is a schematic illustrating an example configuration of a passive tracking device according to some embodiments of the present disclosure.

FIG. 4 illustrates example components of a passive tracking device 108 (e.g., the passive tracking device 108 of FIG. 3) according to some embodiments of the present disclosure. In some embodiments, a first antenna 302 is configured to transmit Bluetooth Low Energy (BLE) on a 2.4 GHz frequency band. In embodiments, a second antenna 304 is configured to receive BLE on the 2.4 GHz frequency band, which may energize the passive tracking device 108. It is noted that the first antenna 302 and the second antenna 304 may transmit and receive, respectively, according to other suitable protocols, such as Bluetooth, WiFi, and other suitable short range communication protocols. In embodiments, a third antenna 306 is configured to transmit and receive RFID signals on a 900 MHz frequency bands, for example, according to the Electronic Product Code (EPC) C1G2 standard, such that the passive tracking device 108 may be energized and may transmit responses via the third antenna 306.

In embodiments, the passive tracking device 108 includes a transformer 408, an energy harvester 410, a clamp circuit 412, a storage capacitor 414, and a voltage regulator 416, which may be configured to harvest energy to energize the passive tracking device 108. In embodiments, the transformer 408 receives low-impedance RF electrical energy, in the form of low-impedance alternating current electrical energy, from BLE and/or Wi-Fi signals received via the second antenna 304 and converts the low-impedance RF electrical energy into high-impedance RF electrical energy. The transformer 408 outputs the high-impedance RF electrical energy to the energy harvester 410. Due to impedance matching, the energy harvester 410 can harvest more energy from the high-impedance RF electrical energy than it would be able to harvest from the low-impedance RF electrical energy that is received by the transformer 408 from the second antenna 304. The transformer 408 may be a bulk acoustic wave RF voltage transformer, an air-core transformer, a ferrite-core transformer, a transmission-line transformer, or any other suitable type of transformer. In some embodiments, the energy harvester 410 receives RF energy from the second antenna 304 and the third antenna 306 and performs smoothing on the RF energy. The RF energy may pass through one or more diodes (not shown) before reaching the energy harvester 410, thereby removing a negative portion of the RF energy. In some embodiments, the energy harvester 410 outputs a smoothed energy wave, such as a sine wave with peaks approximately equal to 6V-10V, to the clamp circuit 412. The clamp circuit 412 is configured to shift a DC value of the smoothed energy wave and limit peaks of the smoothed energy wave such that the smoothed energy wave is suitable to be stored in the storage capacitor 414 and power other components of the passive tracking device 108. The clamp circuit 412 then transmits the smoothed energy wave to the storage capacitor 414 and to the voltage regulator 416. The storage capacitor 414 is configured to store energy and output energy to the voltage regulator 416 as the energy is needed to power the passive tracking device 108. The voltage regulator 416 is configured to provide energy from the clamp circuit 412 and the storage capacitor 414 to other components of the passive tracking device 108 via the power bus 418 and ensure that other components of the passive tracking device 108 receive a relatively constant amount of voltage, e.g., 2V. In embodiments, the voltage regulator 416 may be a low-dropout regulator.

In embodiments, the passive tracking device 108 is configured to modulate BLE for transmission on a 2.4 GHz frequency band when the passive tracking device 108 operates in the first mode. In embodiments, the passive tracking device 108 includes a reference oscillator 404, an AC power source 407, a phase-locked loop (PLL) 402, an amplifier 403, the GFSK modulator 405, and a state machine 426. Prior to transmission via the first antenna 302, the state machine 426 transmits to the GFSK modulator 405 one or more of identifying information, e.g., an EPC ID, and sensor data in a format that conforms to BLE standards. In some embodiments, the passive tracking device 108 includes non-volatile memory (NVM) 424, and the GFSK modulator 405 reads the identifying information and/or sensor data from the NVM 424. The GFSK modulator 405, the PLL 402, the AC power source 407, and the reference oscillator 404 work in conjunction to modulate a signal having a carrier frequency of 2.4 GHz and containing the information supplied by the state machine 426 to the GFSK modulator 405. The amplifier 403 then amplifies the signal and transmits the signal to the first antenna 302 for transmission. In some embodiments, to facilitate needs of small size, low cost, thermal resistance, contamination resistance, vibration resistance, humidity resistance, or a combination thereof, the reference oscillator 404 may be a bulk acoustic wave oscillator, such as is disclosed in US Patent Application Publication No. 2019/0074818 to Lal et al., the entirety of which is hereby incorporated by reference. In other embodiments, the reference oscillator 404 may be any other suitable type of oscillators, such as a MEMS oscillator or a crystal.

In embodiments, the passive tracking device 108 is configured to prepare RFID signals (e.g., RFID C1G2) for transmission on a 900 MHz frequency band when the passive tracking device 108 operates in the second mode. In embodiments, the passive tracking device includes an EPC modem 422, such as an EPC C1G2 modem, and a backscatter switch 406. When the passive tracking device 108 operates in the second mode in response to receiving an RFID signal having a carrier frequency of 900 MHz via the third antenna 306, the EPC modem 422 generates an RFID message according to the C1G2 RFID standard format. The EPC modem 422 then actuates the backscatter switch 406 to prepare the same 900 MHz signal previously received via the third antenna 306, such that the same 900 MHz signal contains the RFID message generated by the EPC modem 422. The message is then transmitted via the third antenna 306. In some embodiments, the RFID message includes one or more of a device identifier of the passive tracking device and sensor data. The EPC modem 422 may read the identifier from the NVM 424 before generating the RFID message. In embodiments, the EPC modem 422 may obtain the sensor data from the sensor module 316.

In embodiments, the passive tracking device 108 includes a mode selector 420 configured to receive RFID signals via the third antenna 306 on the 900 MHz frequency band. Upon receiving an RFID signal from the third antenna 306, the mode selector 420 is configured to determine whether the passive tracking device 108 operates in the first mode or the second mode. When the mode selector 420 determines that the passive tracking device 108 operates in the first mode, the passive tracking device 108 transmits a response signal (e.g., a BLE beacon signal) via the first antenna 302 on the 2.4 GHz frequency band, such that devices capable of receiving the response signal (e.g., BLE beacon signal) on the 2.4 GHz frequency band may receive the signal. When the mode selector 420 determines that the passive tracking device 108 in the second mode, the passive tracking device 108 transmits an RFID signal via the third antenna 306 on the 900 MHz frequency band, such that devices capable of receiving RFID signals on the 900 MHz frequency band may receive the response signal. In some embodiments, the mode selector 420 includes a low power timer (e.g., a low power 32 kHz timer) (not shown).

In some embodiments, the mode selection module 314 is configured to determine when to transmit a response signal when operating in the first mode based on the amount of energy harvested by the energy harvester 410 and/or stored by the storage capacitor. For example, if the passive tracking device 108 receives at least 0 dBm of RF power, the passive tracking device 108 may transmit a BLE beacon signal as quickly and as often as possible. If the passive tracking device 108 receives between −20 dBm and 0 dBm of RF power, the passive tracking device 108 may transmit a BLE beacon signal only at an interval according to an interval timer in order to save energy. If the passive tracking device 108 receives less than −20 dBm of RF power, the passive tracking device 108 may transmit a BLE beacon signal only upon the amount of energy stored exceeding approximately 1 μJoule. The threshold power values provided above (0 dBm and −20 dBm) are provided for example and not intended to limit the scope of the disclosure.

In some embodiments, when the passive tracking device 108 operates in the first mode (e.g., BLE), the state machine 426 may be configured to determine whether to include sensor data in the response signal based on whether the value(s) of the sensor data meet a requisite condition (e.g., if one or more values included in the sensor data is above or below a threshold). For example, the state machine 426 may be configured to include sensor data in a response signal (e.g., a BLE beacon signal) if one or more temperature values included in thermal sensor data exceeds a temperature threshold (e.g., 50° C.) or is less than a lower temperature threshold (e.g., <0° C.). In another example, the state machine 426 may be configured to include sensor data in a response signal (e.g., a BLE and/or Wi-Fi signal) if an acceleration value included in shock sensor data exceeds a shock threshold (e.g., 3 G).

It is noted that in some embodiments, the passive tracking device of FIG. 4 may be a single mode passive tracking device (e.g., BLE only, WiFi only, or RFID only). For example, in some embodiments, the passive tracking device 108 may be implemented as a BLE tracking device without the third antenna 306, the backscatter switch 406, the EPC modem 422, or the mode selector 4230. In some of these embodiments, the passive tracking device 108 may be energized using the second antenna 304 at a first frequency band (e.g., 2.5 GHz) and may transmit response signals using the first antenna 302 using the same frequency band (e.g., 2.5 GHz). In other embodiments, the passive tracking device 108 may be implemented as a BLE tracking device without the backscatter switch 406, the EPC modem 422, or the mode selector 4230. In these embodiments, the passive tracking device 108 may harvest energy using the second antenna 304 at a first frequency band (e.g., 2.5 GHz) or the third antenna 306 at a second frequency band (e.g., 900 MHz), but will only transmit at the first frequency band (e.g., 2.5 GHz). The passive tracking device 108 may be configured in a similar manner to only support RFID transmissions, whereby the device may not include the components used to transmit in the first mode.

Figure 5:
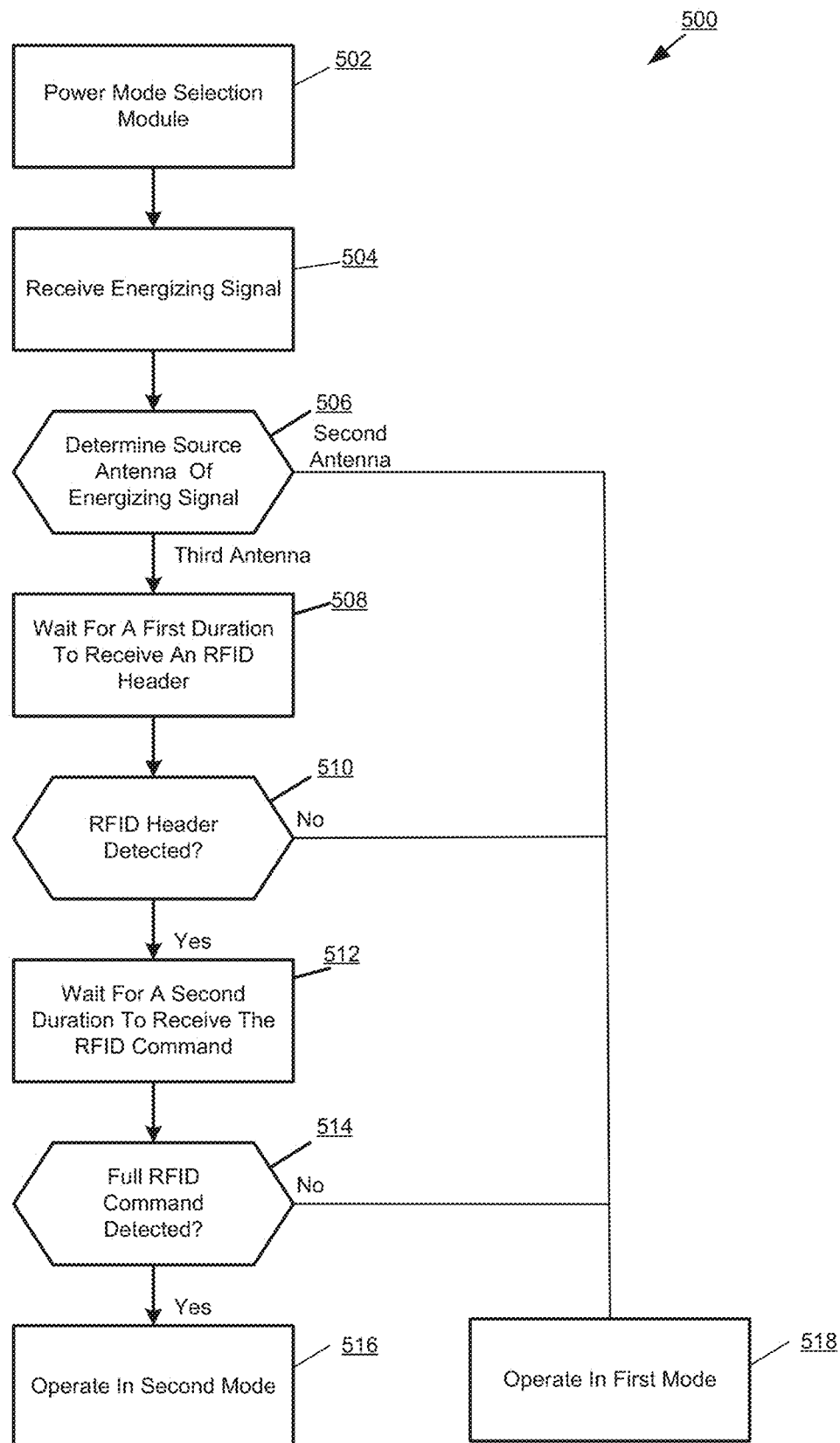
FIG. 5 is a flowchart depicting an example set of operations of a method for determining whether the passive tracking device is to operate in the first mode or the second mode according to some embodiments of the present disclosure.

FIG. 5 is a flowchart depicting an example set of operations of a method 500 for determining whether the passive tracking device 108 is to operate in the first mode or the second mode, according to some embodiments of the present disclosure. The method 500 may be performed by any suitable component of a multi-mode passive tracking device 108 (e.g., mode selection module 314 or mode selector 420).

For purposes of explanation, the method 500 is described with respect to the passive tracking device 108 of FIG. 3 and the components thereof. It should be appreciated that the method 500 may be performed substantially similarly by any other suitable devices without departing from the scope of the disclosure.

At 502, the passive tracking device 108 powers the mode selection module 314. As the mode selection module 314 generally requires little energy to function, the mode selection module 314 may stay powered after performance of the method 500 and may remain powered from a previous performance of the method 500 prior to a subsequent performance of the method 500. In some embodiments, the mode selection module 314 is powered before any other component of the passive tracking device 108 when energizing signals are received, thereby allowing the mode selection module 314 to perform the method 500 while one or more other components of the passive tracking device 108 remain unpowered.

At 504, the passive tracking device 108 receives an energizing signal via the second antenna 304 or the third antenna 306.

At 506, the mode selection module determines whether the energizing signal was received via the second antenna 304 or the third antenna 306. If the energizing signal was received via the second antenna 304, the passive tracking device 108 operates in the first mode (518). If the energizing signal was received via the third antenna 306, the passive tracking device 108 performs operation 508. In embodiments where the first mode is the default mode of operation, the passive tracking device 108 proceeds to operation 518, unless the energizing signal is received via the third antenna 306.

At 508, the mode selection module waits for a first duration (e.g., 2.5 ms) to determine whether the energizing signal contains an RFID header, such as a start of an EPC ultra-high frequency (UHF) RFID-formatted command.

At 510, the passive tracking device 108 determines whether the RFID header was detected during the first duration. If the energizing signal contains the RFID header, the passive tracking device 108 performs operation 510. If the energizing signal does not contain the RFID header, the passive tracking device 108 operates in the first mode, as shown at operation 518.

At 512, the mode selection module 314 waits for a second duration, e.g., up to 10 ms, such that the second transmission module has enough time to receive and parse an RFID-formatted command, e.g., an EPC UHF RFID-formatted command, received via the energizing signal.

At 514, the passive tracking device 108 determines whether the RFID-formatted command was detected received and parsed during the second duration. If the RFID-formatted command was received and parsed, the passive tracking device 108 operates in the second mode, as shown at operation 516. If the RFID-formatted command was received and parsed, the passive tracking device 108 operates in the first mode, as shown at operation 518.

At 516, the passive tracking device 108 operates in the second mode (e.g., RFID). In some embodiments, the passive tracking device 108 operates in the second mode for a period of time, e.g., 40 ms, or until a certain condition has been met, e.g., no RFID-formatted command has been received for 40 ms. At 518, the passive tracking device 108 operates in the first mode (e.g., BLE).

Figure 6:
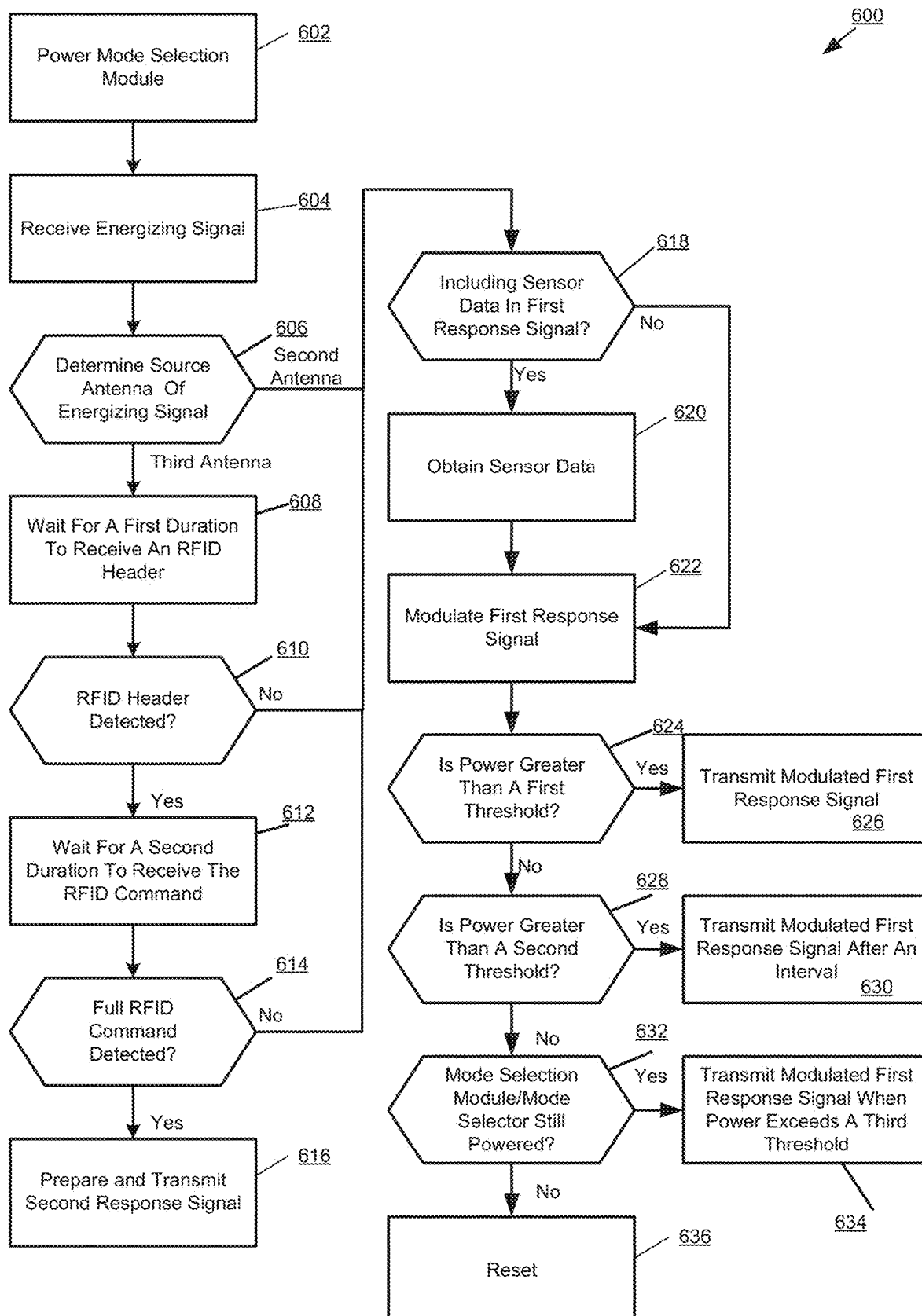
FIG. 6 is a flowchart depicting examples operations of a method 600 for operating a passive tracking device 108 according to some embodiments of the present disclosure.

FIG. 6 is a flowchart depicting examples operations of a method 600 for operating a passive tracking device 108 according to some embodiments of the present disclosure. In some embodiments, the mode selection module 314, the first transmission device 310, the second transmission device 312, the sensor module 316, and the encryption module 318 perform parts of the method 600. In some embodiments, the mode selection 420, the EPC modem 422, the energy harvester 410, the state machine 426, and other components shown in FIG. 4 perform parts of the method 600. For simplicity of explanation, the method 600 is described with respect to the passive tracking device 108 of FIG. 3. It should be appreciated that the method 600 may be performed substantially similarly by embodiments of the passive tracking device 108 including components shown in FIG. 4 and described in relevant descriptions of embodiments.

At 602, the passive tracking device 108 powers the mode selection module 314. As the mode selection module 314 generally requires little energy to function, the mode selection module 314 may stay powered after performance of the method 600 and may remain powered from a previous performance of the method 600 prior to a subsequent performance of the method 600. In some embodiments, the mode selection module 314 is powered before any other component of the passive tracking device 108 when energizing signals are received, thereby allowing the mode selection module 314 to perform the method 600 while one or more other components of the passive tracking device 108 remain unpowered.

At 604, the passive tracking device 108 receives an energizing signal via the second antenna 304 or the third antenna 306.

At 606, the mode selection module 314 determines whether the energizing signal was received via the second antenna 304 or the third antenna 306. If the energizing signal was received via the second antenna 304, the passive tracking device 108 proceeds to operation 618. If the energizing signal was received via the third antenna 306, the passive tracking device 108 performs operation 608. In embodiments where the first mode is the default mode of operation, the passive tracking device 108 proceeds to operation 618 unless the energizing signal is received via the third antenna 306.

At 608, the mode selection module waits for a first duration (e.g., 2.5 ms) to determine whether the energizing signal contains an RFID header, such as a start of an EPC UHF RFID-formatted command.

At 610, the passive tracking device 108 determines whether the RFID header was detected during the first duration. If the energizing signal contains the RFID header, the passive tracking device 108 performs operation 612. If the energizing signal does not contain the RFID header, the passive tracking device 108 proceeds to operation 618.

At 612, the mode selection module 314 waits for a second duration (e.g., up to 10 ms), such that the second transmission module has enough time to receive and parse an RFID-formatted command (e.g., an EPC UHF RFID-formatted command) received via the energizing signal.

At 614, the passive tracking device 108 determines whether an RFID-formatted command was detected (e.g., received and parsed) during the second duration. If an RFID-formatted command was detected, the passive tracking device 108 performs operation 616. If the RFID-formatted command was received and parsed device 108 proceeds to operation 618.

At 616, the second transmission module 312 prepares and transmits a second response signal in the second mode. In embodiments, the passive tracking device 108 transmits the second response signal using an RFID protocol in an EPC UHF RFID message.

At 618, the first transmission module 310 determines whether the passive tracking device 108 is to include sensor data in the first response signal. If the passive tracking device 108 is to include sensor data in the first response signal, the passive tracking device 108 performs operation 620. If the passive tracking device 108 does not need to include sensor data in the first response signal (e.g., the device does not include a sensor module 316 or there is no sensor data to report), the passive tracking device 108 moves on to operation 622.

At 620, the first transmission module 310 obtains sensor data collected by the sensor module 316. In some embodiments, the first transmission module 310 receives the sensor data from the sensor module 316 in response to the sensor module 316 being energized. The sensor data may be substantially instantaneous (e.g., captured when the device 108 is energized) or may be previously determined (e.g., a state of the device tripped a sensor prior to the device 108 being energized). Additionally or alternatively, the first transmission module 310 may obtain sensor data from a memory device of the passive tracking device 108. In embodiments, the first transmission module 310 encodes the sensor data in a data packet or other suitable data structure, which is modulated in the first response signal discussed below.

At 622, the first transmission module 310 begins modulating the first response signal on a first frequency band (e.g., 2.5 GHz). If the passive tracking device 108 is configured to include sensor data in the first response signal, the first transmission module 310 modulates the first response signal such that the modulated first response signal includes the sensor data. In embodiments, the contents of the first response signal are encoded in accordance with a BLE protocol, or any other suitable protocol (e.g., WiFi).

At 624, the first transmission module 310 determines whether the power available to the passive tracking device 108 for transmission is greater than a first threshold (e.g., 0 dBm). If the power available for transmission is greater than the first threshold, the first transmission module 310 outputs the first modulated response signal for transmission via the first antenna 302, and the first antenna 302 transmits the first modulated response signal, as shown at 9126. If the power available for transmission is not greater than the first threshold, the passive tracking device 108 determines whether the power available to the passive tracking device 108 for transmission is greater than a second threshold (e.g., −20 dBm), as shown at 628. If the available power for transmission is greater than the second threshold, the passive tracking device 108 outputs the first modulated response signal for transmission via the first antenna 302 after an interval of time (e.g., 5 s), and the first antenna 302 transmits the first modulated response signal after receiving the first modulated response signal, as shown at 630. The interval of time allows for the passive tracking device 108 to receive more energy for transmitting the modulated first response signal than may have been available upon performance of operation 628. If the power available to the passive tracking device 108 for transmission is not greater than the second threshold, the passive tracking device 108 determines whether the mode selection module 314 is still powered. If the mode selection module 314 is still powered, the passive tracking device 108 outputs the first modulated response signal for transmission via the first antenna 302 when the energy stored by the passive tracking device 108 is sufficient to power the device 108 (e.g., the amount of energy required to transmit the first modulated response signal), and the first antenna 302 transmits the first modulated response signal after receiving the first modulated response signal, as shown at 634. Otherwise, the passive tracking device 108 resets itself, as shown at 636, and thereafter returns to operation 602.

Figure 7:
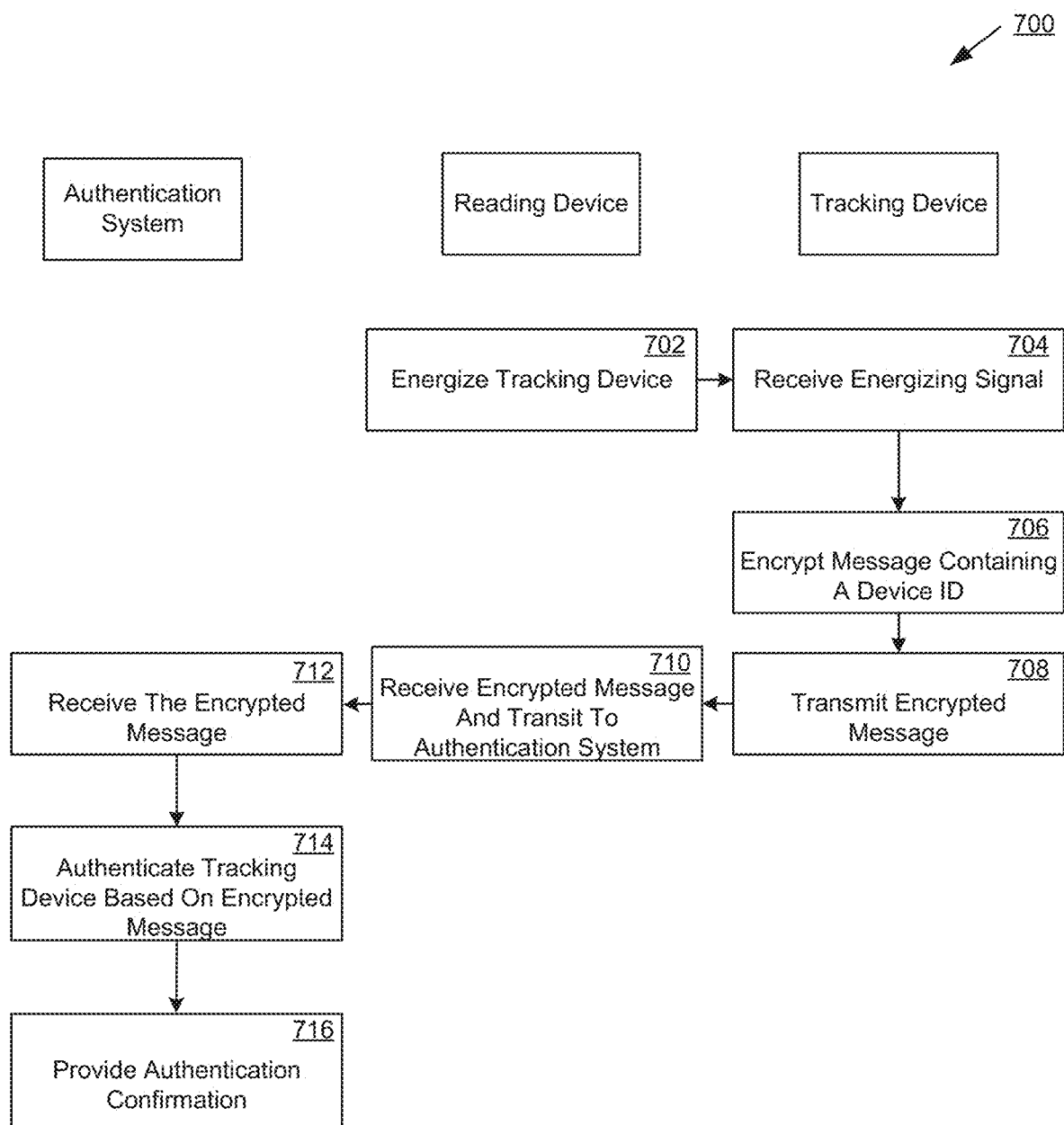
FIG. 7 is a flowchart depicting examples operations of a method for authenticating a tracking device according to some embodiments of the present disclosure.

FIG. 7 is a flowchart depicting a method 700 for authenticating a tracking device according to some embodiments of the present disclosure. The method 700 is disclosed with respect to a tracking device, a reading device, and an authenticating device. The tracking device may be any suitable tracking device, including a passive tracking device 108, 112, or a powered tracking device 102, 106. In embodiments, the authentication device may be a back end server that includes an authentication server (e.g., the backend server 120 of FIG. 1). Alternatively, in some embodiments, the authentication device may be a stand-alone authentication server that performs authentication services for tracking devices. In some embodiments, the authentication device may be an aggregator device 104 that authenticates tracking devices 102, 106, 108, and/or 112 in the vicinity of the aggregator device 104. The reading device is optional. In these embodiments, the reading device may be, for example, an aggregator device 104, a user device 130, or an AR-enabled user device 140. Furthermore, while the reading device is described below as energizing the tracking device, it is understood that a passive tracking device 108 may be energized by a different device than the reading device. For example, an exciter 110 may energize the devices, while an aggregator device 104, a user device 130, or an AR-enabled user device 140, receives the response signals.

At 702, the reading device energizes the tracking device. In embodiments, the reading device broadcasts the energizing signal on a frequency band (e.g., 2.5 GHz or 900 MHz).

At 704, the tracking device receives the energizing signal. In embodiments where the tracking device is a passive tracking device, the energizing signal may energize the passive tracking device, which causes the tracking device to begin operation.

At 706, the tracking device generates an encrypted message indicating a device identifier of the tracking device. In some embodiments, the tracking device generates a message that contains a device identifier of the tracking device, such that the device identifier uniquely identifies the tracking device. In these embodiments, the tracking device may encrypt the message to obtain the encrypted message, for example, using a secret key that is known by the tracking device and the authenticating device. In other embodiments, the tracking device may encrypt the message to obtain the encrypted message, for example, using a secret key of the tracking device and a public key of the authentication device.

In some embodiments, the tracking device may first obscure the device identifier prior to encrypting the message containing the device identifier. In some of these embodiments, the tracking device obscures the device identifier using a random N-bit string that is generated upon the device being energized, and a secret pattern that is known by the tracking device and the authenticating device. An example method for generating the encrypted message is described with respect to FIG. 8. It is appreciated that other methods of encrypting the message may be implemented by the tracking device without departing from the scope of the disclosure.

At 708, the tracking device transmits the encrypted message to the receiving device. The tracking device may transmit the encrypted message in any suitable manner, including the various manners described in the disclosure. For example, the tracking device may modulate a response signal at the frequency band used to receive the energizing signal, such that the modulated response signal includes the encrypted message.

At 710, the reading device receives the encrypted message and transmits the encrypted message to the authentication device. In some embodiments, the reading device receives the modulated response signal and reads the encrypted message from the modulated response signal. The reading device may extract the encrypted message from the modulated response signal and may route the encrypted message to the authentication device, for example, via a communication network (e.g., the Internet or a cellular network).

At 712, the authentication device receives the encrypted message.

At 714, the authentication device authenticates the tracking device based on the encrypted message. In some embodiments, the authentication may decrypt the message using, for example, the secret key of the tracking device. In some of these embodiments, an unencrypted header portion of the encrypted message may include a secret key identifier of the secret key used to encrypt the message. The authentication device may retrieve the secret key from a set of secret keys based on the secret key identifier and may decrypt the encrypted message using the retrieved secret key. In embodiments where the encrypted message was encrypted using a secret key/public key pair, the unencrypted header portion of the encrypted message may include a public key of the tracking device. In these embodiments, the authentication device may decrypt the encrypted message using the public key of the tracking device and a private key of the authentication device. Once decrypted, the authentication device may determine the device identifier contained in the decrypted message. In embodiments where the device identifier was obscured by the tracking device using a secret pattern, the tracking device may determine the device identifier from the obscured device identifier based on the secret pattern (as discussed with respect to FIG. 9). The authentication device may then determine whether the device identifier is a valid device identifier. In some embodiments, the authentication device maintains a list of known device identifiers that indicates the device identifiers of all the tracking devices that are able to be authenticated by the authenticating device. In these embodiments, the authentication device may cross reference the device identifier obtained from the decrypted message with the list of known device identifiers to determine whether the device identifier appears in the list. If so, the authentication device determines that the tracking device is authenticated. Otherwise, the authentication device determines that it cannot authenticate the device. Once a determination is made regarding the tracking device's authenticity, the authentication device may provide a notification to a relevant device or system. For example, the authentication device may notify the reader device and/or the backend system that the device has been authenticated.

In embodiments, the foregoing method 700 may be implemented as an authentication service that authenticates tracking devices, so as to deter counterfeiting of tracking devices. The authentication service may be offered by a manufacturer of the tracking devices or by a third party provider.

Figure 8:
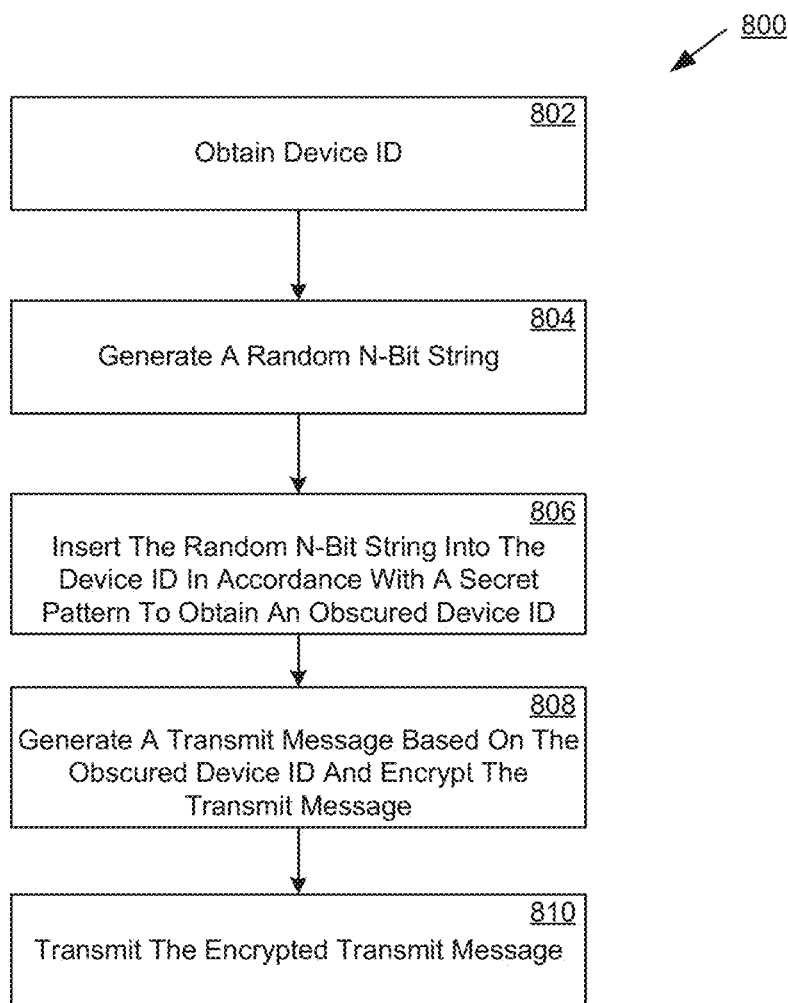
FIG. 8 is a flowchart depicting examples operations of a method for generating an encrypted message used to authenticate a tracking device according to some embodiments of the present disclosure.

FIG. 8 is a flowchart depicting a method 800 for generating an encrypted message used to authenticate a tracking device according to some embodiments of the present disclosure. The method 800 may be performed by any suitable type of tracking device. In some embodiments, the method is performed by an encryption module of a passive tracking device (e.g., FIG. 3 or FIG. 4). In some of these embodiments, the method is performed upon the passive tracking device 108 being energized and for inclusion in a response signal.

At 802, the tracking device obtains a device identifier of the tracking device. The device identifier may uniquely identify the tracking device from other tracking devices. In embodiments, the tracking device may obtain the device identifier from the nonvolatile memory of the tracking device.

At 804, the tracking device generates a random N-bit string. In embodiments, the tracking device may generate a different N-bit string each time the method is executed, so as to ensure that the N-bit string is not repeated. The tracking device may include a random number generator that generates the random N-bit string or may generate the random N-bit string in any other suitable manner.

At 806, the tracking device inserts the N-bit string into the device identifier according to a shared secret pattern known by the tracking device to obtain an obscured device identifier. The shared secret pattern (or "secret pattern) may be known by the tracking device and one or more authentication devices that can authenticate the tracking device. In some embodiments, the secret pattern defines N different insertion slots, such that each insertion slot respectively defines a bit position of the device identifier where a respective bit of the random N-bit string is inserted. For example, in a message containing up to 8 bytes and where the N-bit string is a 6-bit string, an example secret pattern may define six bit positions (e.g., 1, 5, 16, 30, 42, 50) for inserting the bits of a random 6-bit string into the device identifier of the tracking device. In this example, the passive tracking device may insert the first bit of the 6-bit string bit between the first bit and a second bit of the device identifier, the second bit of the 6-bit string bit between the fifth and sixth bit, the third bit of the 6-bit string bit between the sixteenth and the seventeenth bit, the fourth bit of the 6-bit string bit between the $30^{th}$ and $31^{st}$ bit, the fifth bit of the 6-bit string bit between the $42^{nd}$ and $43^{rd}$ bit, and the sixth bit of the 6-bit string bit between the $50^{th}$ and $51^{st}$ bit. In this example, the resultant string is the obscured device identifier. In some embodiments, the transmit device may further store a secret pattern identifier that identifies the shared secret pattern from secret patterns used by other devices. As discussed with respect to operation 808, the secret pattern identifier may be included in the encrypted portion of an encrypted transmit message or in the unencrypted header of the encrypted transit message.

By utilizing a different random N-bit string to insert into the message to be encrypted (e.g., the device ID) at each iterative transmission, the encrypted message is ensured to vary between transmissions despite containing the same device ID and being encrypted by the same secret key. In this way, interlopers wishing to replicate a tracking device may be prevented from replicating an encrypted transmit message sent by the tracking device and intercepted by the interloper.

At 808, the tracking device generates a transmit message based on the obscured device identifier and encrypts the transmit message. In some embodiments, the body of the transmit message contains only the obscured device identifier. In other embodiments, the body of the transmit message contains additional data as well. For example, in some embodiments, the body of the transmit message may include the secret pattern identifier of the secret pattern. The tracking device may then encrypt the body of the transmit message. The tracking device may encrypt the body of the transmit message in any suitable manner.

In some embodiments, the tracking device may encrypt the body of the transmit message using a shared secret key that is known by the tracking device and the authentication device. The shared secret key may be a numeric value that is used to encrypt the device ID. The shared secret key (and the secret key identifier) may be stored in the nonvolatile memory of the tracking device and may be used by the passive tracking device to encrypt the body of the transmit message (e.g., a string of bits). In these embodiments, the tracking device may include the secret key identifier of the shared secret key in the unencrypted header of the encrypted message. In some embodiments, the unencrypted header of the encrypted transmit message may further include the secret pattern identifier of the shared secret pattern used to generate the obscured device identifier.

In some embodiments, the tracking device may encrypt the body of the transmit message using a secret key/public key pair. In these embodiments, the tracking device may encrypt the body of the transmit message using a secret key of the tracking device that is only known by the tracking device and a public key of the authentication device, which may also be known by the tracking device and/or received in the energizing signal. In some of these embodiments, the tracking device may include public key of the tracking device in the unencrypted header of the encrypted message. In some embodiments, the unencrypted header of the encrypted transmit message may further include the secret pattern identifier of the shared secret pattern used to generate the obscured device identifier.

At 810, the tracking device transmits the encrypted transmit message. The tracking device may transmit the encrypted transmit message in any suitable manner, including the various manners described in the disclosure. For example, the tracking device may modulate a response signal at the frequency band used to receive the energizing signal (e.g., 2.5 GHz), such that the modulated response signal includes the encrypted transmit message.

Figure 9:
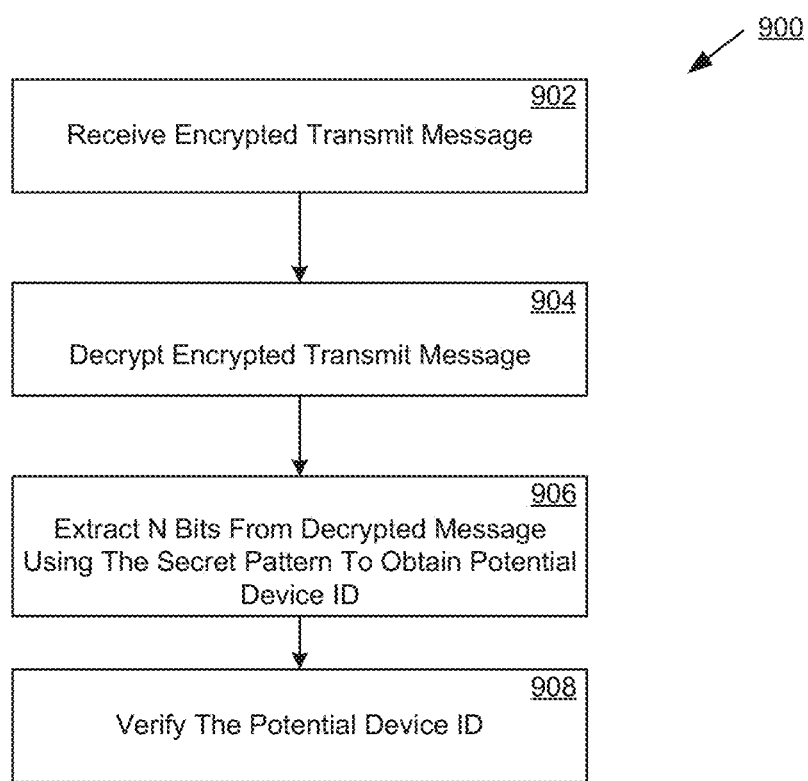
FIG. 9 is a flowchart depicting examples operations of a method for authenticating a tracking device based on a received encrypted transmit message according to some embodiments of the present disclosure.

FIG. 9 is a flowchart depicting a method 900 for authenticating a tracking device based on a received encrypted transmit message according to some embodiments of the present disclosure. The method 900 may be performed by any suitable type of authentication device. In embodiments, the authentication device may be a back end server that includes an authentication server (e.g., the backend server 120 of FIG. 1). Alternatively, in some embodiments, the authentication device may be a stand-alone authentication server that performs authentication services for tracking devices. In some embodiments, the authentication device may be an aggregator device 104 that authenticates tracking devices 102, 106, 108, and/or 112 in the vicinity of the aggregator device 104.

At 902, the authentication device receives the encrypted transmit message. The authentication device may receive the encrypted transmit message directly from the tracking device or may receive the encrypted transmit message from an intermediate device (e.g., a reading device).

At 904, the authentication device decrypts the encrypted transmit message. The authentication device may decrypt the encrypted transmit message in any suitable manner.

In embodiments where the message was encrypted using a shared secret key, the authentication device may read the secret key identifier from the unencrypted header portion of the encrypted transmit message. In these embodiments, the authentication device may decrypt the encrypted portion of the encrypted message using the shared secret key to obtain the body of the transmit message, including the obstructed device identifier.

In embodiments where the message was encrypted using a secret key/public key pair, the authentication device may read the public key of the tracking device from the unencrypted header portion of the encrypted transmit message. In these embodiments, the authentication device may decrypt the encrypted portion of the encrypted message using the public key of the tracking device and the private key of the authentication device to obtain the body of the transmit message, including the obstructed device identifier.

At 906, the authentication device extracts N bits from the obstructed device identifier to obtain a device identifier. In some embodiments, the authentication device may obtain a secret pattern identifier from the transmit message. As discussed, the secret pattern identifier may appear in the unencrypted portion of the transmit message or in the encrypted body of the transmit message. Once the authentication device determines the secret pattern identifier, the authentication device may retrieve the shared secret pattern of the tracking device from memory. The authentication device may then extract N bits from the obstructed device identifier to obtain the secret pattern identifier. For example, borrowing from the example of FIG. 8, the authenticating device may remove the second bit, the seventh bit, the $18^{th}$ bit, the $34^{th}$ bit, the $47^{th}$ bit, and the $56^{th}$ bit from the obscured device identifier, resulting in the 8 byte device identifier.

At 908, the authentication device authenticates the tracking device based on the unobscured device identifier. In embodiments, the authentication device may determine whether the unobscured device identifier is a valid device identifier. As discussed, in some embodiments the authentication device maintains a list of known device identifiers that indicates the device identifiers of all the tracking devices that are able to be authenticated by the authenticating device. In these embodiments, the authentication device may cross reference the unobscured device identifier obtained from the decrypted transmit message with the list of known device identifiers to determine whether the device identifier appears in the list. If so, the authentication device determines that the tracking device is authenticated. Otherwise, the authentication device determines that it cannot authenticate the device. Once a determination is made regarding the tracking device's authenticity, the authentication device may provide a notification to a relevant device or system.

In some embodiments, the authentication device may further ensure that the encrypted message or obscured device identifier has not been previously received, prior to authenticating the device. In these embodiments, the authentication device may maintain a list of previously received encrypted messages and/or obscure device identifiers. When a repeated encrypted message and/or obscured device identifier is received, the authentication device may determine that the encrypted message was previously intercepted by a malicious party and used to spoof a tracking device. In these scenarios, the authentication device may request that the tracking device resend a new encrypted message, such that the new message should change between transmissions due to the new random N-bit string that was used to obscure the device identifier in the subsequent new encrypted message. In other embodiments, the tracking devices may send more than one (i.e., two or more) encrypted response messages, where each encrypted message is generated using a different random N-bit string. In these embodiments, the authentication device may decrypt the multiple encrypted messages and may remove the N-bits using the same secret pattern from each obscured device identifier to obtain the device identifier from each obscured device identifier. If the obscured device identifiers vary while the obtained device identifiers match, then the authentication device may then determine if the obtained device identifier is a known tracking device identifier.

Figure 10:
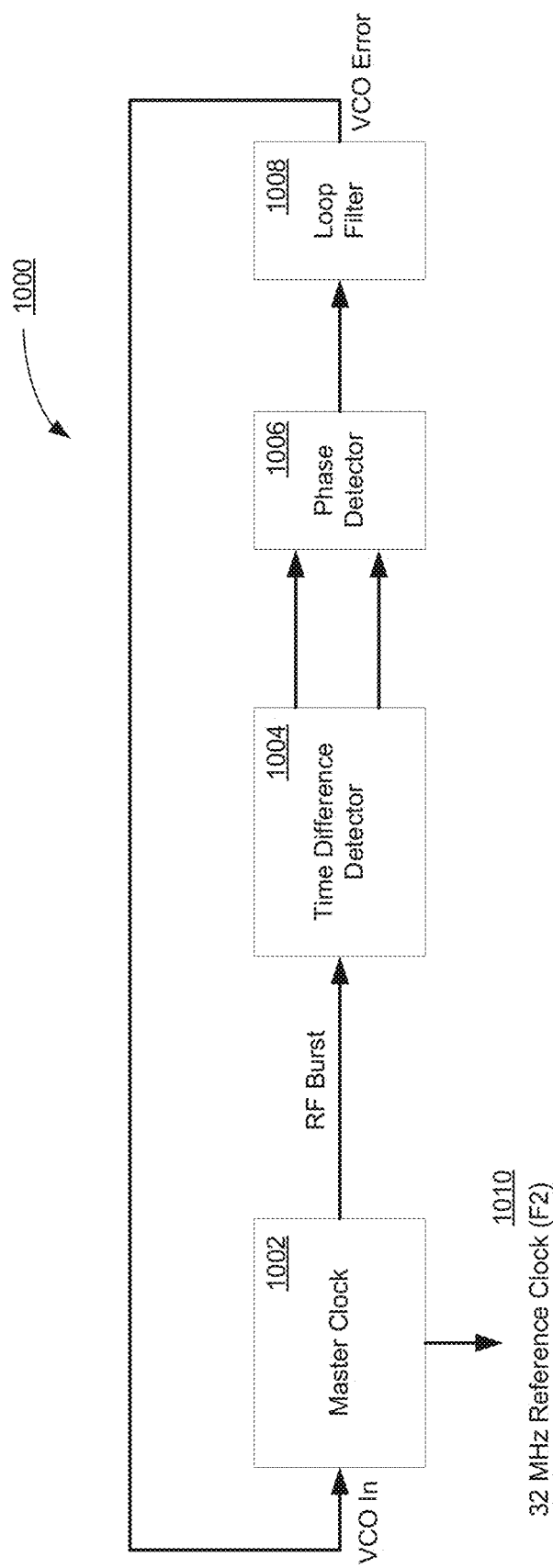
FIG. 10 is a schematic illustrating an example bulk acoustic wave oscillator according to some embodiments of the present disclosure.

FIG. 10 illustrates an example bulk acoustic wave (BAW) oscillator 1000 according to some embodiments of the present disclosure. In some embodiments, the BAW oscillator 1000 may be the oscillator of the first transmission module 310 of FIG. 3. In some embodiments of the passive tracking device 108, the BAW oscillator 1000 may be the oscillator of FIG. 4. The BAW oscillator 1000 may be used as an oscillator in other suitable tracking devices without departing from the scope of the present disclosure.

In some embodiments, the BAW oscillator 1000 is a monolithic CMOS-based high-accuracy reference oscillator that is inexpensive to install in tracking devices (e.g., multi-mode tracking devices 102, paired tracking devices 106, passive tracking devices 108, and/or dual medium tracking devices 112). These tracking devices may use a carrier signal having a frequency based on outputs of the BAW oscillator 1000 to achieve a desired accuracy of carrier frequency for transmission of signals. In embodiments, the BAW oscillator 1000 includes a master clock 1002, a time difference detector 1004, a phase frequency detector 1006, and a loop filter 1008, which are described in greater detail below.

In embodiments, the master clock 1002 is a voltage-controlled oscillator which is locked to delay time between the successive echoes. In embodiments, the master clock 1002 may be a continuously running oscillator of a frequency (F1) suitable for a clock burst function (e.g., a low GHz frequency). A clock burst may refer to a predefined number of consecutive clock bursts. The number of clock bursts can be selected so as the clock burst provides enough energy to pass through a substrate of the tracking device with sufficient signal-to-noise ratio. In embodiments, the number of clock cycles is between 20 and 40. In embodiments, the frequency F1 is an RF oscillator frequency that is a low GHz frequency (e.g., 1024 MHz). In embodiments, a counter driven by this clock counts a set of master clock pulses and outputs a signal having peaks at a frequency corresponding to a rate of completed counts of the master clock pulses, which form the clock burst.

In embodiments, the time difference detector 1004 includes one or more envelope detectors (also referred to as echo detectors) driven by an aluminum-nitrate (AlN) receive transducer. In some of these embodiments, an envelope detector is used to recover an envelope, i.e., a measurement of time between pulses, of first and second echoes of the clock burst. The first echo enables a counter that counts a fixed number N4 of the master clock's cycles and then generates an end pulse. In embodiments, a temperature compensation signal is used to adjust the envelope detector thresholds for the first and second echoes, as well as to control a fractional N divider using, for example, dithering between multiple N4 values.

In embodiments, the phase frequency detector 1006 compares the time of the second echo with the end pulse. If the end pulse arrives before the second echo, then the phase frequency detector 1006 generates a 'pump down' pulse, because the master clock is too fast. If the second echo arrives before the end pulse, the master clock is too slow, and a 'pump up' pulse is produced. The pump-up and pump-down pulses drive complementary current sources, i.e., charge pumps, which in turn drive a loop filter 1008 that is connected to the control port of the master clock VCO, thereby forming a frequency locked loop. The frequency locked loop forces the frequency of the master clock to be a multiplicative product of a count N1 and a reciprocal of the echo time, where N1 is a multiplicative product of F1 and a repetition rate of the ultrasonic pulse. This entire cycle is repeated regularly after several echo times have elapsed, for an overall recycle time in the hundreds of nanoseconds. Finally, the locked master clock signal is divided by another counter, e.g., N1, to result in the oscillator's output, a stable reference clock frequency F2.

Figure 11:
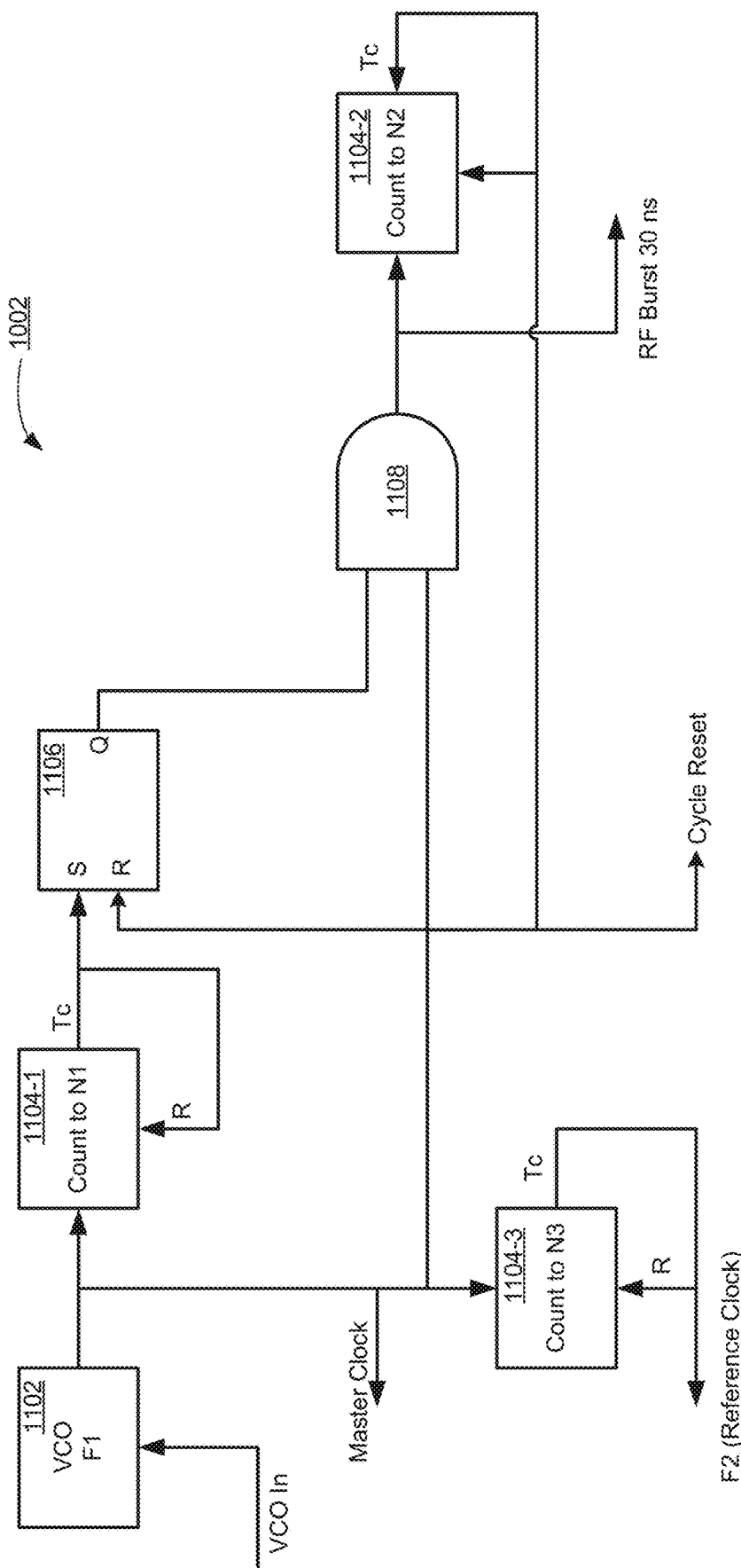
FIG. 11 is a schematic illustrating an example configuration of a master clock of a bulk acoustic wave oscillator according to some embodiments of the present disclosure.

FIG. 11 illustrates example embodiments of the master clock 1002 according to some embodiments of the present disclosure. In embodiments, the master clock 1002 is a precision clock that provides timing signals (i.e., a reference frequency) to synchronize a reference clock 1010, such as a clock included in the AC power source 407 of FIG. 4. In embodiments, the master clock 1002 includes a voltage-controlled oscillator (VCO) 1102, a plurality of master clock counters 1104-1, 1104-2, 1104-3 (generically referenced by 1104), one or more master clock latches 1106, and one or more gates 1108. In embodiments, the master clock 1002 is locked to a delay time. The delay time is a time between successive echoes of a bulk acoustic wave (BAW) resonator. In some embodiments, the master clock 1002 receives input from the free-running VCO 1102. In embodiments, the VCO 1102 is a ring oscillator. The master clock 1002 is tuned to the RF oscillator frequency, F1, by the VCO 1102. The frequency F1 may be a low-GHz frequency suitable for a clock burst function. In some embodiments, the VCO 1102 is configured such that F1 that is substantially equal to 1024 MHz.

In embodiments, the master clock counters 1104 are digital counters that are each configured to store respective counts (e.g., counts N1-N3) that indicate a number of times that a particular event or process has occurred. In some embodiments, one or more of the master clock counters 1104 count oscillations of the VCO 1102. In some of these embodiments, the master clock counters 1104 are digital counters that may include latches and/or flip-flops. In embodiments, the one or more master clock gates 1108 are digital logic gates that perform logical operations on the counts received from the master clock counters 1104 to form a clock burst. In embodiments the one or more master clock gates 1108 include an AND gate. The AND gate receives a count signal, e.g., a signal frequency of a factor of N1, and a frequency signal, e.g., a signal having frequency F1, and performs an AND operation on the count signal and the frequency signal, thereby generating and outputting the clock burst. In embodiments, the clock burst is a signal having a frequency equal to a logical AND value of a signal having peaks corresponding to a fractional count of a signal having the frequency F1, and a signal having the frequency F1. In embodiments, the one or more master clock gates 1108 output the clock burst to the time difference detector 1004. In some embodiments, the VCO 1102, and the one or more master clock counters 1104 may be configured to output pulses, signals, and/or counts to the one or more master clock latches 1106, e.g., flip-flops, and the one or more master clock latches 1106 may be configured to output signals or refrain from outputting signals based on a cycle reset input.

Figure 12:
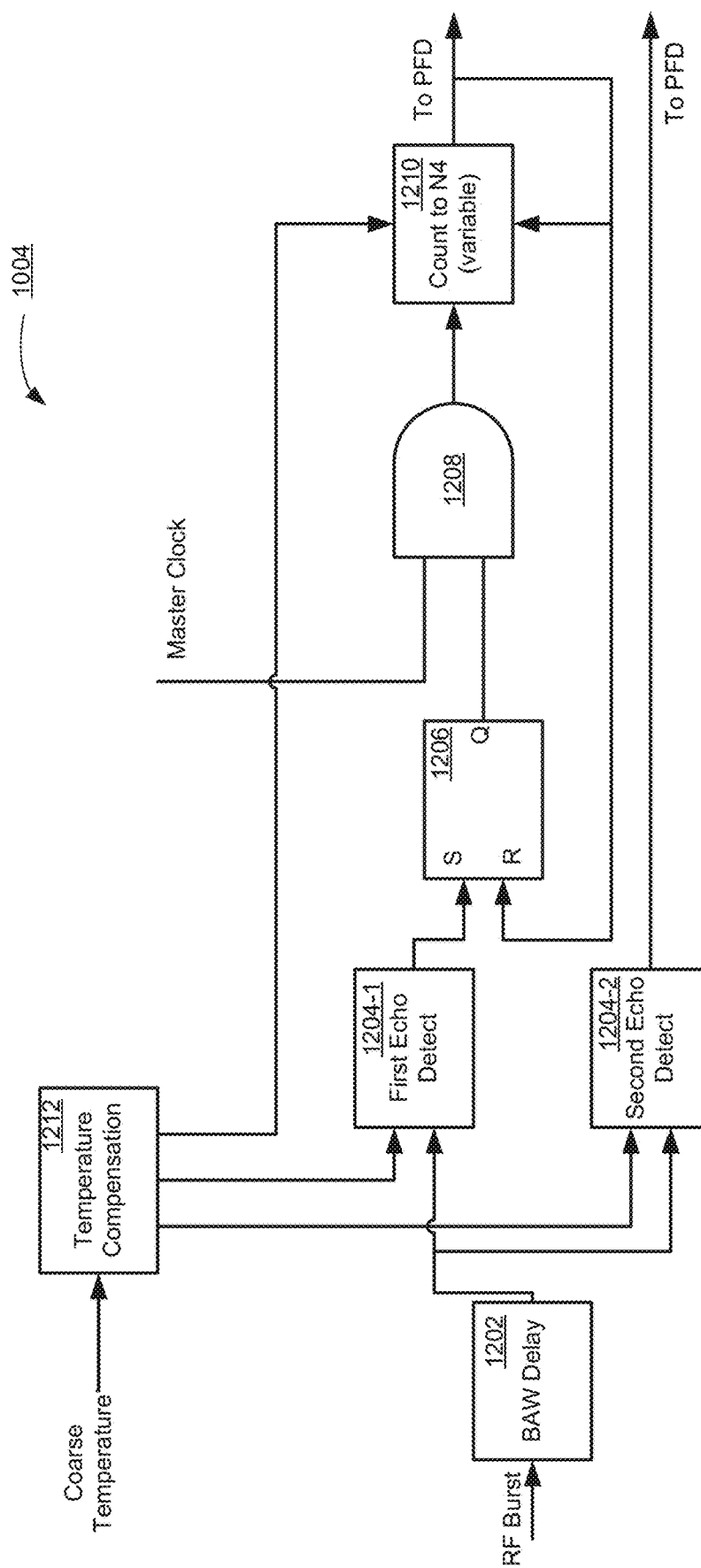
FIG. 12 is a schematic illustrating an example configuration of a time difference detector of a bulk acoustic wave oscillator according to some embodiments of the present disclosure.

FIG. 12 illustrates an example time difference detector 1004 according to some embodiments of the present disclosure. In embodiments, the time difference detector 1004 is configured to receive clock bursts from the master clock 1002, detect echoes of the BAW delay, and output echo signals, an end pulse, or a combination thereof to the phase difference detector 1004. In embodiments, the time difference detector 1004 includes a BAW delay reference 1202 (e.g., BAW delay 1202), a plurality of echo detectors 1204-1, 1204-2 (also referred to as "envelope detectors"), one or more time difference detector latches 1206, one or more time difference detector gates 1208, one or more time difference detector counters 1210, and a temperature compensation module 1212.

In embodiments, the BAW delay 1202 is configured to receive the clock burst from the master clock 1002 and output a BAW signal to the echo detectors 1204. Upon receiving the Clock burst, energy from the clock burst passes through a body of a silicon substrate of the BAW delay 1202, thereby bouncing off of one or more edges of the silicon substrate and creating one or more echoes. The echoes are measurable in the BAW signal, e.g., by measuring time between rising edges of the pulses of the BAW signal, and may differ according to temperature of the BAW delay 1202.

In embodiments, the echo detectors 1204 are configured to receive the BAW signal and measure the time between the echoes (e.g., via envelope detection). FIG. 12 illustrates an embodiment of the time difference detector 1004 including two echo detectors 1204, wherein each echo detector 1204 measures a different echo of a plurality of echoes of the BAW delay 1202. In some embodiments, after measuring the time between the echoes, each respective echo detector 1204 outputs a respective echo signals indicating a respective echo measurement to one or more time difference detector latches 1206, one or more time difference detector gates 1208, and/or one or more time difference detector counters 1210.

In embodiments, the time difference detector counter 1210 is a digital counter that is configured to store a count (e.g., a variable count N4) indicating a number of master clock cycles following the rising edge of the first echo. In some embodiments, the time difference detector counter 1210 issues an end pulse when the count reaches N4. In embodiments, the count value N4 may be varied from one cycle to the next, thereby affecting a fractional count value in the average across multiple cycles. In embodiments, the time difference detector counters 1210 are digital counters that may include latches or flip-flops. In some embodiments, the time difference detector counter 1210 outputs the echo counts to the phase frequency detector 1006.

In some embodiments, a first echo detector 1204-1 of the plurality of echo detectors 1204 detects a first echo of the BAW delay 1202 and transmits a first echo signal to a time difference detector counter 1210, wherein the first echo signal contains a metric of the first echo. A second echo detector 1204-2 of the plurality of echo detectors 1204 may detect a second echo of the BAW delay 1202 and may generate a second echo signal, wherein the second echo signal contains a metric of the second echo. The time difference detector counter 1210 is configured to work with the time difference detector latch 1206 and/or the time difference detector gate 1208 to perform a logical AND operation on the first echo signal and pulses from the master clock 1002 to generate an end pulse, wherein the end pulse is a signal indicating that a predefined count N4 of master clock cycles has elapsed after the first echo detect signal. The time difference detector 1004 outputs the end pulse and the second echo detect signal to the phase frequency detector 1006.

In embodiments, a temperature compensation module 1212 is configured to receive a temperature reading from a temperature sensor, e.g., a coarse temperature reading from a bulk acoustic wave temperature sensor, and output temperature adjustment signals to the plurality of echo detectors 1204 and/or the time difference detector counter 1210, wherein the temperature adjustment signals are based on the temperature reading. In embodiments, upon receiving the temperature adjustment signals from the temperature compensation module 1212, the plurality of echo detectors 1204 adjusts the echo detection based on the temperature adjustment signal and/or the time difference detector counter 1210 adjusts counts such as the count N4 based on the temperature adjustment signal, thereby allowing the time difference detector 1004 to precisely and accurately detect and count echoes despite fluctuations in temperature of the BAW oscillator 1000. In some embodiments, the echo detectors 1204 are configured to adjust an echo detection threshold based on the respective temperature adjustment signals received from the temperature compensation module 1212. In some embodiments, the time difference detector counters 1210 are configured to adjust a count, such as adjusting a fractional N divider using, for example, dithering between multiple count values, based on the respective temperature adjustment signals received from the temperature compensation module 1212. It should be appreciated that while FIG. 12 illustrates a time difference detector 1004 including two echo detectors 1204 wherein each echo detector 1204 measures a different echo of a plurality of echoes of the BAW delay 1202, some embodiments of the time difference detector 1004 include a single echo detector 1204 wherein the single echo detector 1204 measures a single echo of the BAW delay 1202.

Figure 13:
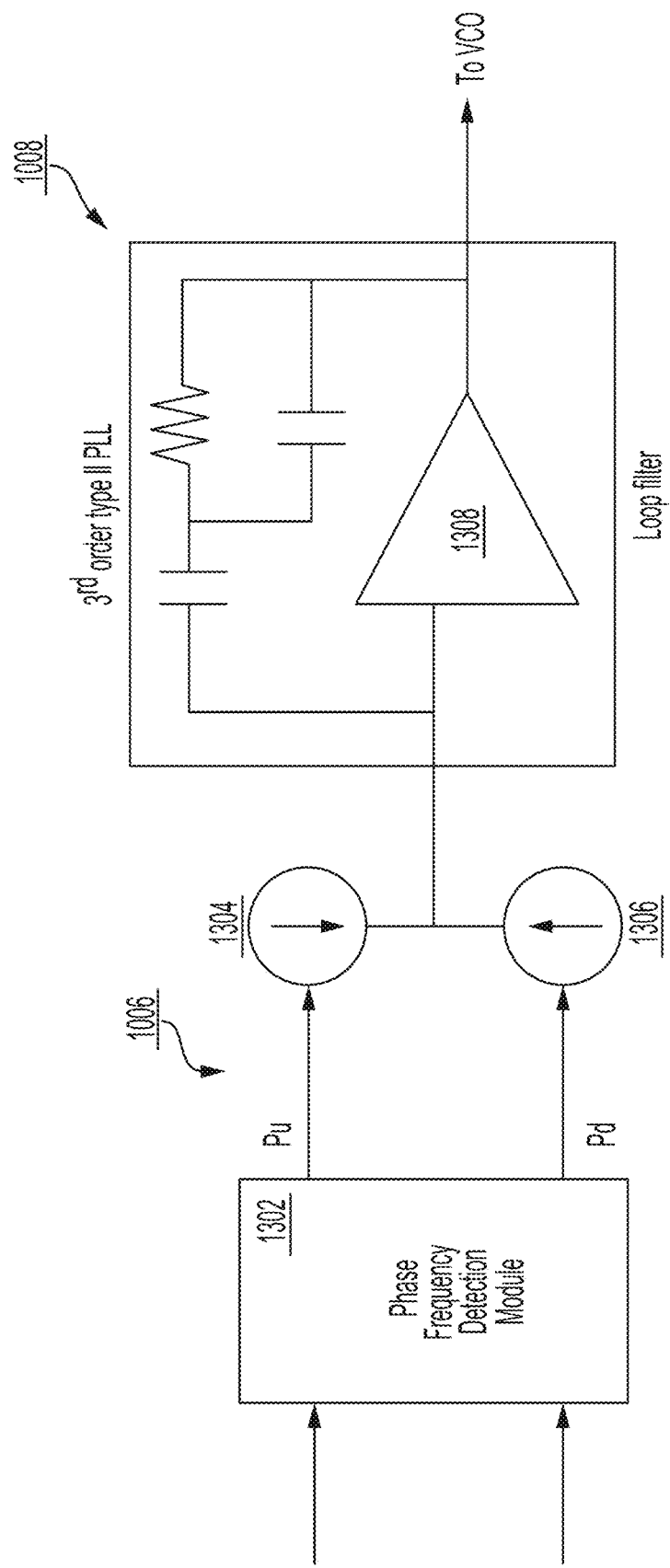
FIG. 13 is a schematic illustrating example configurations of a phase frequency detector and loop filter of a bulk acoustic wave oscillator according to some embodiments of the present disclosure.

FIG. 13 illustrates an exemplary embodiment of the phase frequency detector 1006 and the loop filter 1008. In embodiments, the phase frequency detector 1006 includes a phase frequency detection module 1302 configured to receive the second echo signal and the end pulse from the time difference detector 1004 and to generate a pump pulse based thereon. The pump pulse may be either a "pump-down" pulse or a "pump-up" pulse, based upon a difference in time between the first and second echoes. If the phase of the end pulse is earlier than the phase of the second echo signal, the master clock 1002 may be too fast, and the phase frequency detection module 1302 generates a pump-down pulse. If the phase of the end pulse is later than the phase of the second echo signal, the master clock 1002 may be too slow, and the phase frequency detection module 1302 generates a pump-up pulse.

In embodiments, the phase frequency detector 1006 includes complementary current sources 1304, 1306 (e.g., charge pumps). The phase frequency detection module 1302 outputs the pump-down pulse or the pump-up pulse to the complementary current sources 1304, 1306. The complementary current sources 1304, 1306 selectively output a current to the loop filter 1008 based on whether a pump-down pulse or a pump-up pulse was received from the phase frequency detection module 1302. If a pump-down pulse was received from the phase frequency detection module 1302 a negative current source 1304 of the complementary current sources 1304, 1306 transmits a negative current to the loop filter 1008. If a pump-up pulse was received from the phase frequency detection module 1302, a positive current source 1306 of the complementary current sources 1304, 1306 transmits a positive current to the loop filter 1008.

In embodiments, the loop filter 1008 includes a loop amplifier 1308. The loop amplifier 1308 is configured to amplify the current received from the negative current source 1304 or the positive current source 1306, and output the amplified current to an input of the VCO 1102 of the master clock, thereby forming a feedback loop and decreasing or increasing the output frequency of the BAW oscillator 1000 based upon the pump-down pulse or the pump-up pulse. In some embodiments, the loop amplifier 1308 is a third-order type 2 phase-locked loop.

FIGS. 14-17 illustrate example variations of the bulk acoustic wave oscillator 1000 according to different embodiments of the present disclosure.

Figure 14:
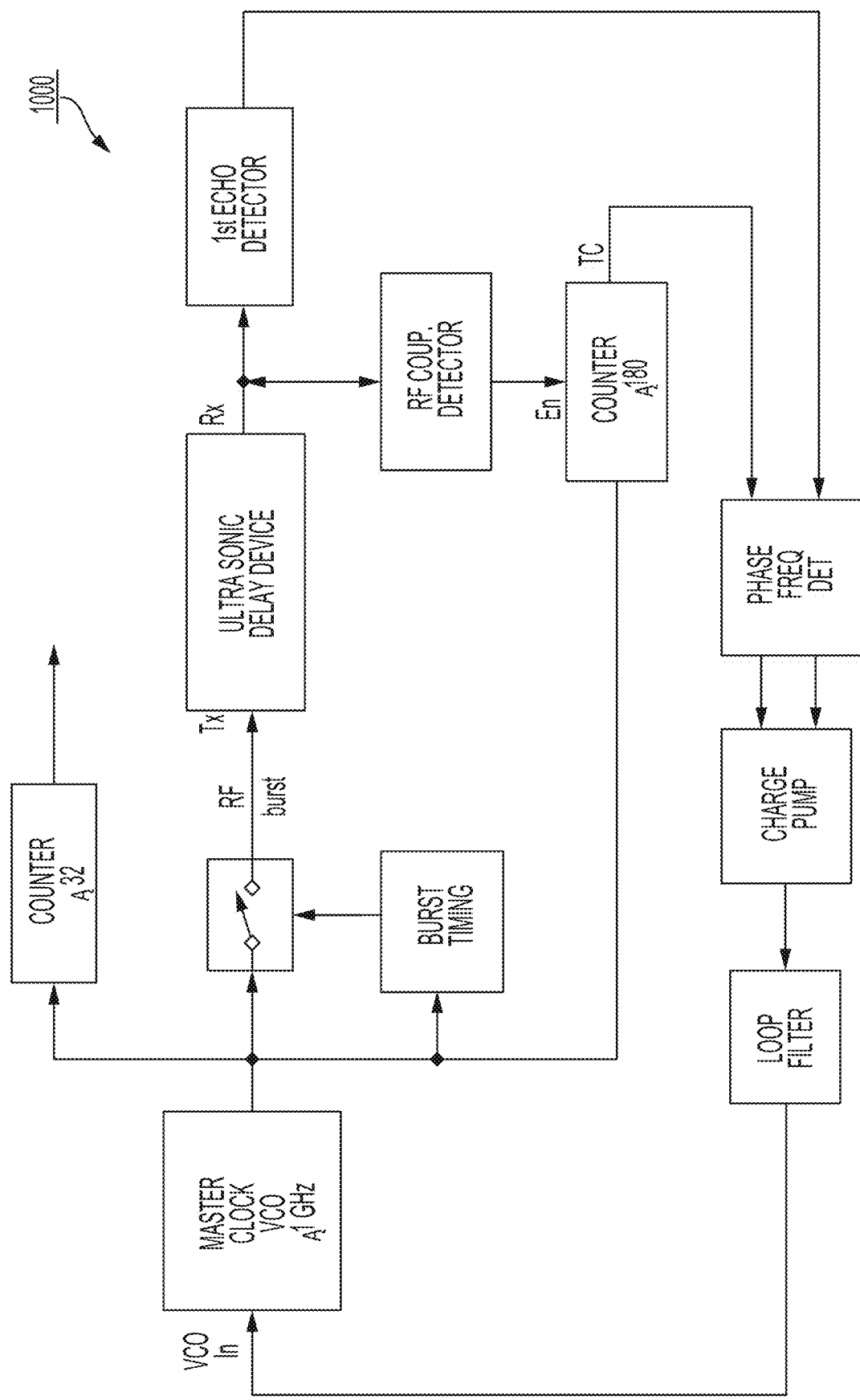
FIG. 14 is a schematic illustrating an example configuration of a bulk acoustic wave oscillator according to some embodiments of the present disclosure.

In the example of FIG. 14, the master clock of the BAW oscillator 1000 operates as a burst clock at burst frequency. In this example, a counter counts the clock cycles from the start of the clock burst transmission to the start of the first received echo of the clock burst. In this example, the BAW oscillator 1000 compares the terminal count with the timing of the first echo, without considering a second echo.

Figure 15:
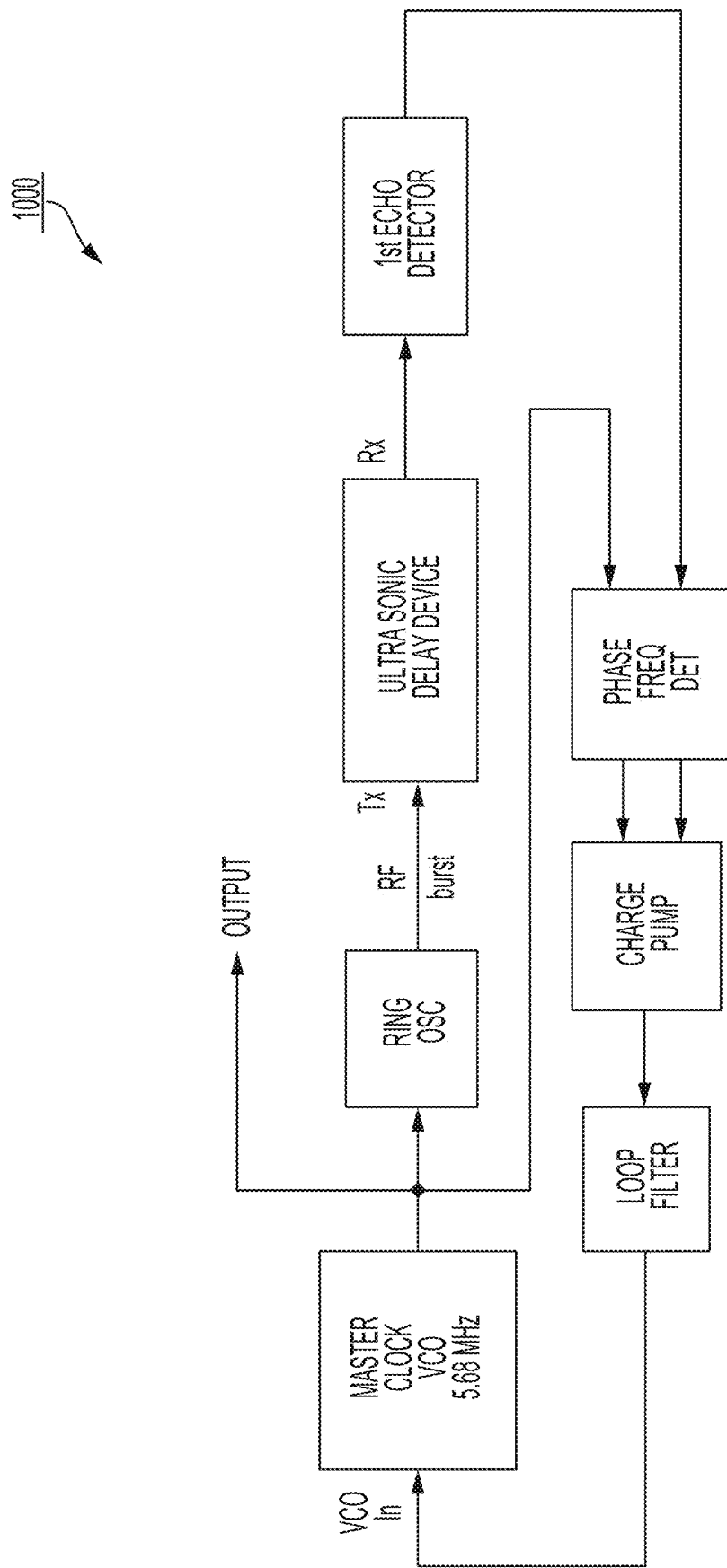
FIG. 15 is a schematic illustrating an example configuration of a bulk acoustic wave oscillator according to some embodiments of the present disclosure.

In the example of FIG. 15, a separate ring oscillator is bursted on for a duration (e.g., 30 ns) by the master clock, which operates at, for example, $1/176$ ns, or 5.68 MHz. The leading edge of the next master clock cycle is compared with the first echo pulse, without considering a second echo.

Figure 16:
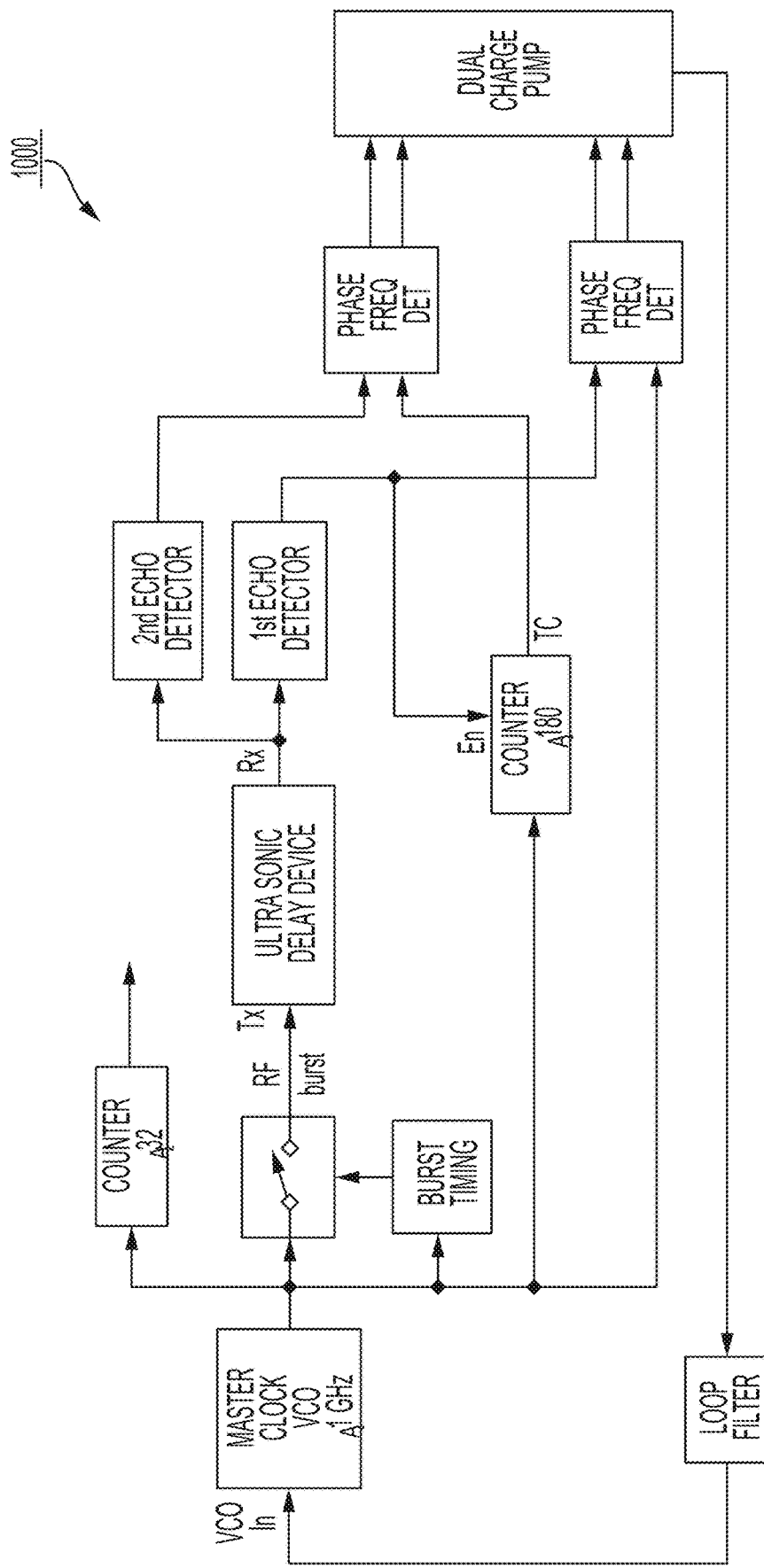
FIG. 16 is a schematic illustrating an example configuration of a bulk acoustic wave oscillator according to some embodiments of the present disclosure.

In the example of FIG. 16, the master clock operates as a burst clock at burst frequency. In this example, the first echo enables the counter to count the clock cycles until a number, i.e., a count, of clocks have passed (e.g., 180 clocks have passed). In this example, the BAW oscillator 1000 compares the terminal count with the edge of the second echo. A second phase-frequency detector is used to track a phase ambiguity when the counter is enabled (e.g., +/−half of a master clock cycle).

Figure 17:
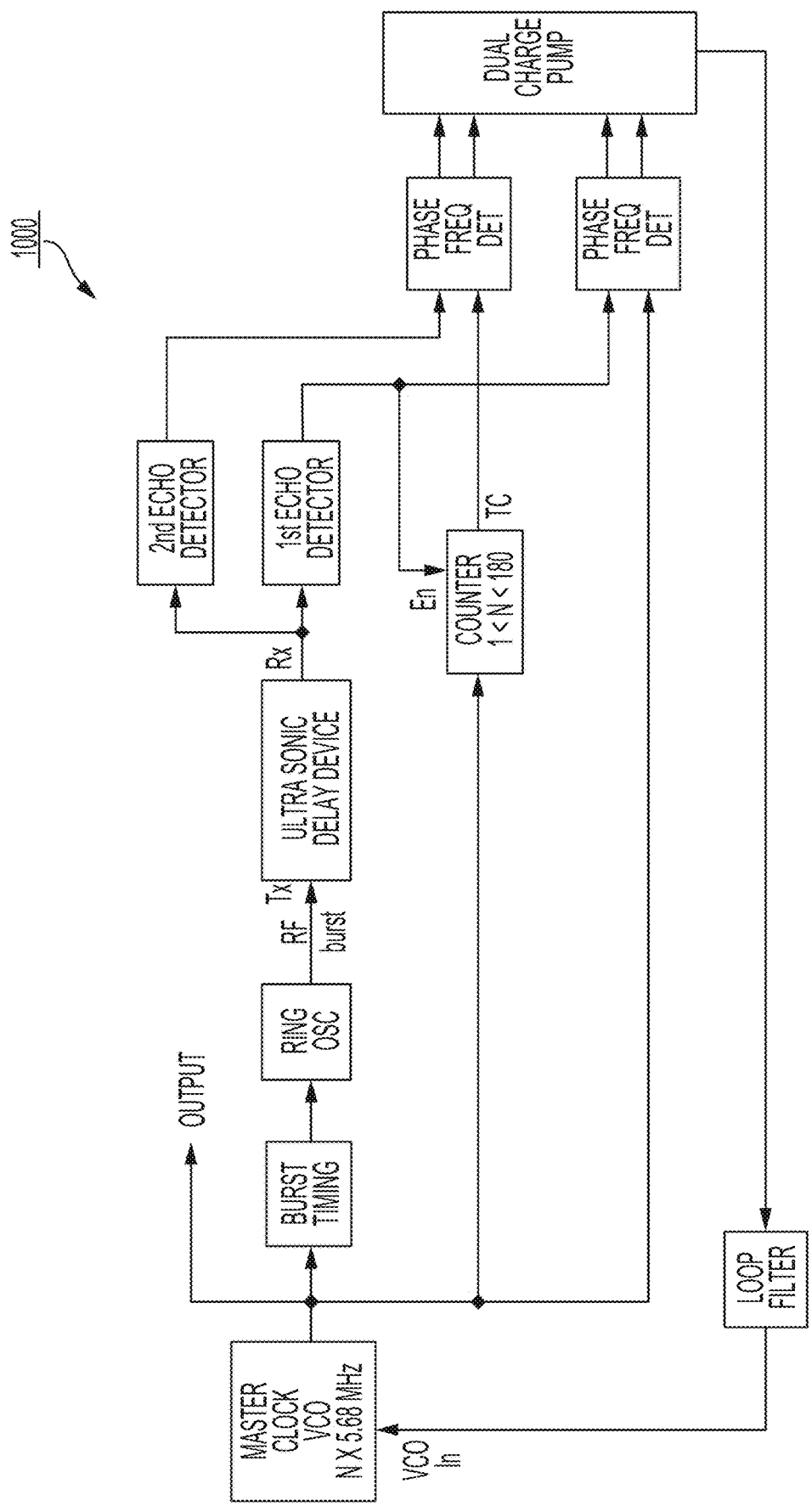
FIG. 17 is a schematic illustrating an example configuration of a bulk acoustic wave oscillator according to some embodiments of the present disclosure.

In the example of FIG. 17, a separate ring oscillator is bursted by the master clock, as in FIG. 15. In this example, the master clock frequency can now be a relatively lower multiple of the 5.68 MHz, even as low as 1 MHz. In this case, the counter can be removed entirely. Alternatively, a 'moderately' low master clock frequency of 2, 3, 4, 5, or more times 5.68 MHz can be used, and then a counter of this size may be required.

Figure 18:
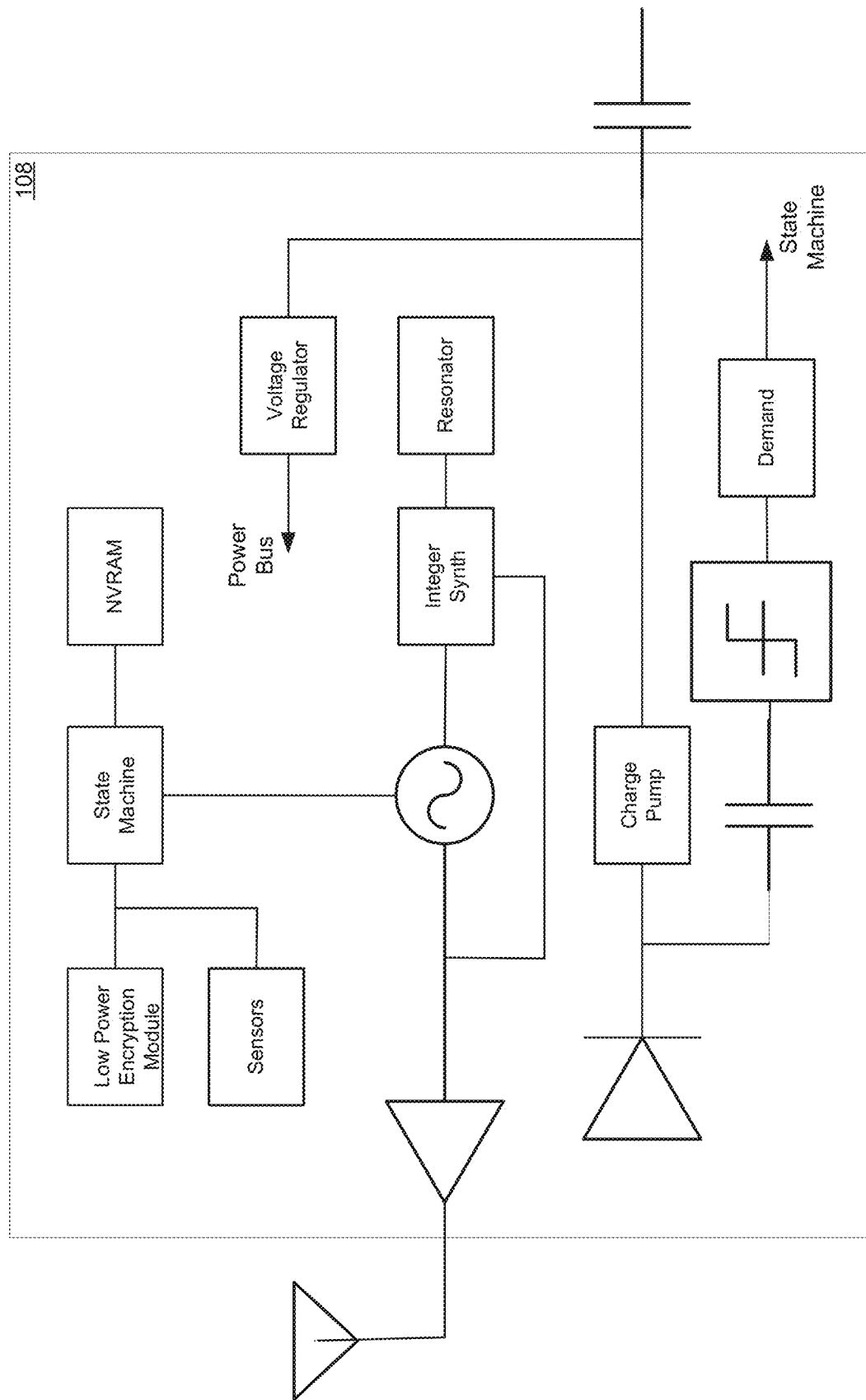
FIG. 18 is a schematic illustrating an example configuration of a passive tracking device according to some embodiments of the present disclosure.

FIG. 18 illustrates an example configuration of a passive tracking device 108 according to some embodiments of the present disclosure. The passive tracking device may include a low-power encryption module, one or more sensors, a state machine, non-volatile memory (NVRAM), a voltage regulator, resonator, an integer synthesizer, an oscillator (e.g., a BAW oscillator), a charge pump, and a demand module. The passive tracking device 108 may further include capacitors, one or more antennas, one or more inverters, and other suitable components.

Figure 19:
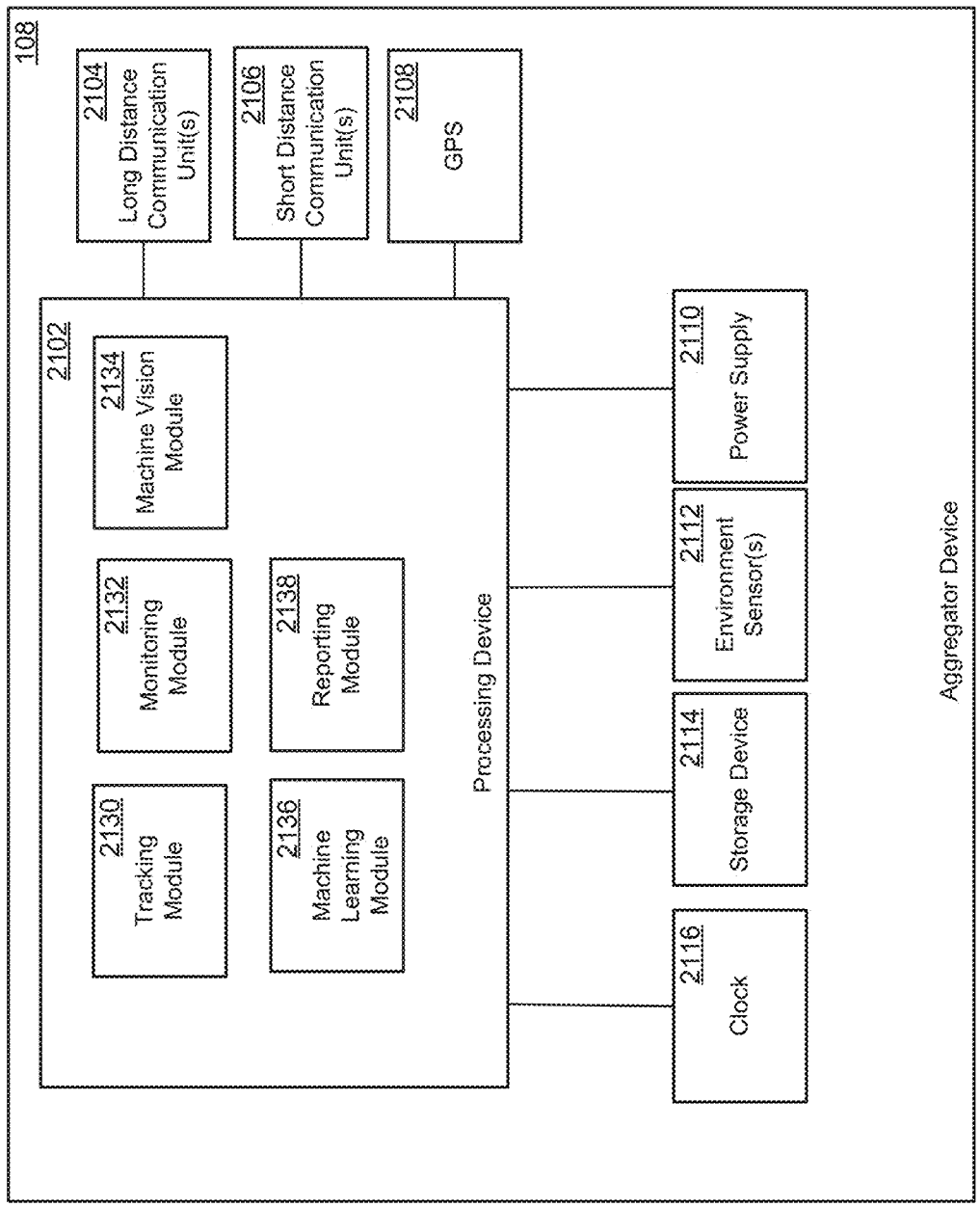
FIG. 19 is a schematic illustrating an example set of components of an aggregator device according to some embodiments of the present disclosure.

FIG. 19 illustrates an example aggregator device 104 according to some embodiments of the present disclosure. In embodiments, an aggregator device 104 may include a processing device 2102, one or more long distance communication units 2104 (WIFI chip, an LTE chip, an Ethernet Card, and the like), one or more short distance communication units 2106 (RFID chipset, Bluetooth Chipset, and the like), a GPS device 2108, a power supply 2110 (e.g., continuous power supply, a rechargeable battery, an inductive power supply, and/or the like), one or more environmental sensors 2112 (e.g., thermistors, thermometers, pressure sensors, ambient light sensors, accelerometers, gyroscopes, video cameras, IR cameras, and the like), one or more storage devices 2114 (e.g., RAM, ROM, Flash memory, and the like), and an internal clock 2116.

In embodiments, the long distance communication units 2104 effectuate communication with a communication network (e.g., the Internet, a cellular network, and the like). The processing device 2102 can transmit messages to external devices, such as the backend server 120 via the long distance communication units. In embodiments, the long distance communication units 2104 may be configured to receive messages containing tracking information and any other suitable information from tracking devices having requisite communication capabilities (e.g., via WIFI).

A short distance communication unit 2106 may effectuate short distance communication with tracking devices (e.g., multi-purpose tracking devices 102, paired tracking devices 106, passive tracking devices 108, dual-mode tracking devices 112, and exciters 102). In embodiments, a short distance communication unit 2106 may broadcast signals to energize proximate devices or otherwise trigger reporting by a proximate device. The short distance communication unit 2106 may receive return signals (or "response signals") from devices that contain short messages that may include tracking information and/or any other suitable data (e.g., sensor readings).

Figure 20:
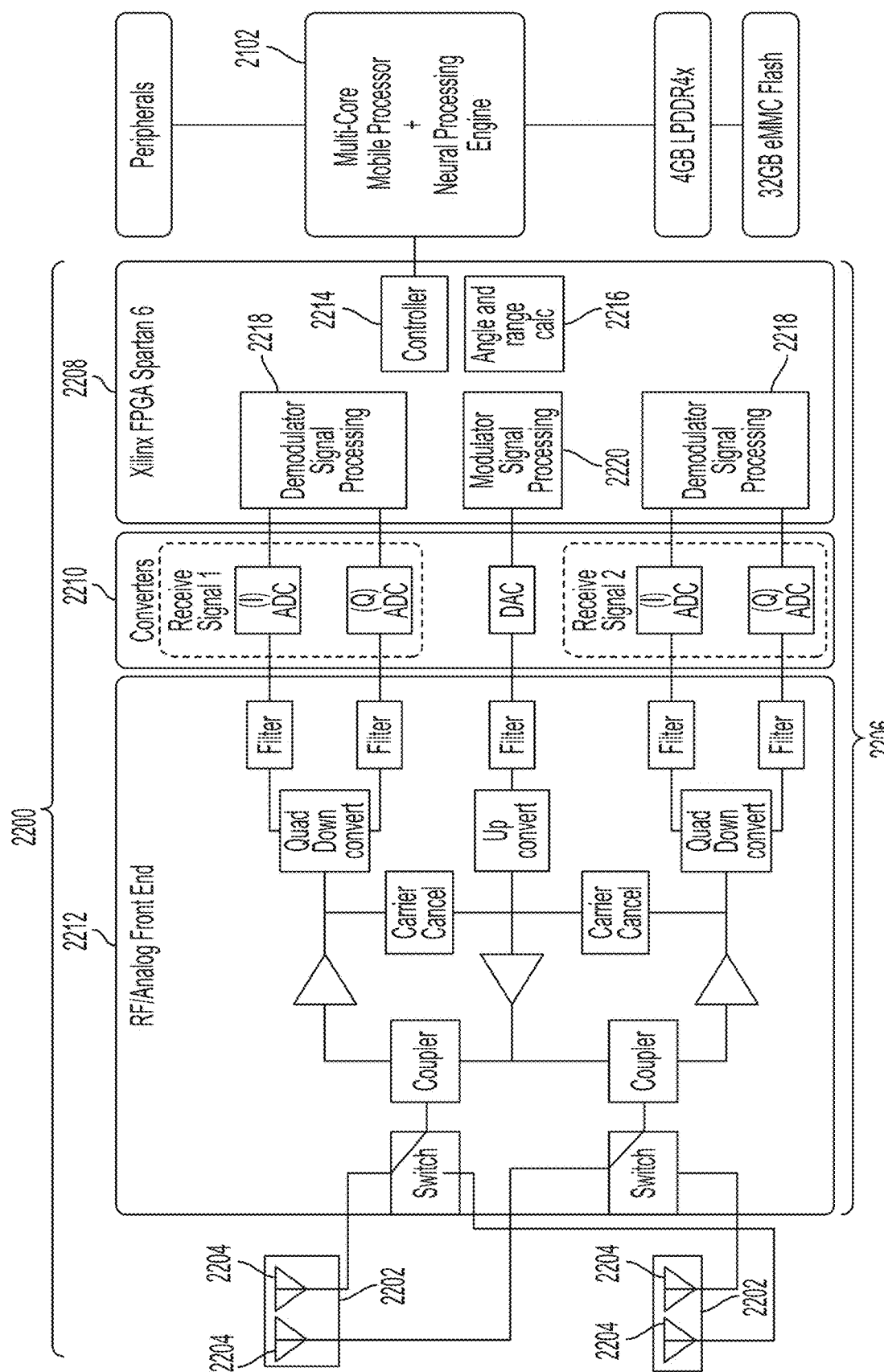
FIG. 20 is a schematic illustrating an example multiple-output-multiple-input device according to some embodiments of the present disclosure.

In some embodiments, the short distance communication units 2102 include one or more multiple-out-multiple-in (MOMI) devices. FIG. 20 illustrates an example MOMI device 2200. In embodiments, a MOMI device 2200 includes one or more MOMI transceivers 2202 that each includes two or more antennas 2204 spaced in relative proximity to one another (e.g., <20 cm) that are set at an angle from one another (e.g., between 60 degrees and 120 degrees). A MOMI device 2200 may further include signal processing circuitry 2206 (e.g., an R/F analog front end 2212, ADC and DAC converters 2210, FGPAs 2208, and the like) that controls, modulates, converts, and/or filters analog signals and digital signals (as shown in FIG. 20). In embodiments, a MOMI device 2200 may modulate RF signals from the MOMI transceiver 2202 that energize any proximate tracking devices, which in turn provide a response RF signal (or response signal), which may be a weaker signal. The response signals may contain messages that include tracking information (e.g., a tracking device ID) of the energized tracking device. The MOMI device 2200 routes the response RF signal to the processing device 2102, which may use the tracking information encoded therein to identify messages received from different tracking devices.

In embodiments, the MOMI device 2200 can determine a range and bearing of the energized tracking device with respect to the MOMI device 2200 using response signals received from an energized tracking device (e.g., passive tracking devices 108,112), which is described in greater detail below. A range may be a value that indicates a distance between the MOMI device 2200 and the energized tracking device. A bearing may be a value that indicates an orientation of the energized tracking device and the MOMI device 2200 (e.g., an angle between a reference vector and a direction vector from the MOMI device 2200 to the energized tracking device). The MOMI device 2200 may output determined range and bearing values to the processing device 2102.

An example method of operating the MOMI device 2200 according to some embodiments of the present disclosure is now described in greater detail. In embodiments, a controller sends a command to the modulator signal processing block, where the command is to initiate an energizing transmission. The modulator block creates a digitized baseband signal to send to the digital to analog converter. The digitized signal is converted to an analog signal, filtered, and up-converted from baseband to the RF frequency which will be used to transmit over the air. In embodiments, the RF signal may be amplified in the power amplifier (e.g., to 33 dBm or 2 Watts). The amplified signal may be split into two or more equal power signals and sent to two or more respective couplers. Each coupler routes a transmit signal from the transmitter path to a respective antenna 2204 of the MOMI transceiver 2202, and also routes the receive signal (also referred to as a "response signal") from the respective antenna 2204 to the receiver path. In some embodiments, each coupler is connected to a switch that connects to a respective antenna 2204. In embodiments, each of the split signals are transmitted from a pair of equal gain antennas, which are collocated but pointing in slightly different direction, for example between 60 and 120 degrees apart. In embodiments, the MOMI device 2200 may have multiple MOMI transceivers 2202 to create multiple non-simultaneous read zones using the switches.

In response to RF signals from a MOMI transceiver 2202, tracking devices in the read zone of the MOMI transceiver 2202 respond to RF commands from the MOMI device 2200 by, for example, backscattering its identification number (e.g., tracking device ID) on a subcarrier, for example 160 KHz from the main carrier. In most cases, the response level of energized tracking device is closer to the boresight of one antenna 2204 and will be much stronger on that antenna. If the energized tracking device is halfway between the boresights of the two antennas, the response level will be effectively equal. Thus, the MOMI device 2200 may estimate an angle that a tag lies between the boresights of the two antennas 2204 based on the response level measured from each antenna 2204. The variation in signal level will be a function of the antenna gain vs angle. In embodiments, the angle estimation can be calibrated for a given antenna pair either a priori or real time using camera inputs.

The response backscatter signals transmitted by the energized tracking device are received by each antenna 2204 of the MOMI transceiver 2202 and routed back through the respective switches and couplers. The receive signal from each antenna 2204 of the MOMI transceiver 2202 may be amplified by a low noise amplifier and down-converted to complex in-phase (I) and quadrature (Q) rails. The I and Q analog signals may be low pass filtered and converted to digital samples by an analog to digital converter. In embodiments, each I and Q signal pair is processed separately in a demodulator signal processing block. In embodiments, processed output from one demodulator may be used to improve the processing in the other demodulator. Each demodulator extracts the tracking information from the response signal if there is sufficient signal to noise ratio to do so. Each demodulator also extracts receive signal strength information (RSSI) and the phase difference of arrival (PDOA) of the return signal relative to the transmit signal carrier phase. The RSSI and PDOA from each demodulator block is used to calculate the bearing and range estimates. Before every transmit, the MOMI device 2200 may perform a carrier cancellation procedure to minimize the leakage of the strong transmit signal, e.g., 30 dBm, back to the receiver to improve receiver sensitivity to low level, e.g., −80 dBm tag response signals. In embodiments, the MOMI device 2200 may implement a link budget equation.

The foregoing is an example implementation of a MOMI device 2200 and other implementations of a MOMI device 2200 are contemplated and within the scope of the disclosure.

Referring back to FIG. 19, in embodiments the processing device 2102 may include one or more processors that execute executable instructions. In embodiments, the processing device is a multi-core mobile processor having a neural processing engine. In embodiments, the processing device 2102 may execute and/or include a tracking system 2130, a monitoring system 2132, a machine vision module 2134, a machine learning module 2136, and a reporting module 2138. These modules may be implemented as executable instructions, circuits, and/or hardware components. The processing device may execute or include additional or alternative modules without departing from the scope of the disclosure.

In embodiments, the tracking module 2130 tracks items in the proximity of the aggregator device 104. In embodiments, the tracking module 2130 may initiate the broadcasting of an output signal that may energize passive tracking devices 108, 112, or otherwise trigger reporting by other tracking devices 102, 106 in the vicinity of the aggregator device 104. In some embodiments, the energizing signal may include a command to report tracking data (and any other suitable data). The tracking module 2130 may track items based on short messages that are transmitted from respective tracking devices 102, 106, 108, and/or 112 that received the output signal. In response to receiving a short message from a tracking device, the tracking module 2130 may read the tracking information of the transmitting device (e.g., the tracking device ID), and any other relevant data that was provided in the short message (e.g., temperature data, ambient light data, humidity data, time stamps, and the like). In some embodiments, the tracking module 2130 may decrypt a short message received from a respective tracking device. For example, the tracking module 2130 in accordance with the method described above. The tracking module 2130 may dedupe short messages if multiple instances of a short message are received by the tracking module 2130.

In embodiments, the tracking module 2130 may receive tracking information from the machine vision module 2134. In these embodiments, the machine vision module 2134 may read a visual indicia captured by a camera of the aggregator device or a camera that streams video to the aggregator device 104. In some of these embodiments, the value in the visual indicia may be the same value as the tracking device ID that is assigned to a tracking device, such that the visual indicia and the tracking device may track the same item. In these embodiments, the tracking module 2130 may dedupe two separate tracking events (i.e., one from a tracking device and the other from a visual indicia), so as not to double report an item.

In embodiments, the tracking module 2130 may, for each unique tracking event, generate a tracking event record that records the tracking event. Examples of tracking events may include the receipt of a message from a tracking device and/or reading tracking information from a visual indicia by the machine vision module 2134. In these embodiments, a tracking event record may be any suitable data structure that includes data relating to a tracking event. A respective tracking event record may include, but is not limited to, a device identifier of the tracking device that provided the message or that was read from a visual indicia, a geolocation corresponding to the tracking device (or item), and a time stamp. The geolocation may be reported by the tracking device (e.g., tracking devices 102 or 106) or may be obtained by the tracking module 2130 from the GPS device 2108 of the aggregator device when the reporting tracking device does not have GPS or other location-based functionality. In some embodiments, the geolocation may be determined based on the GPS reading from the GPS device 2108 and refined based on the range and bearing values determined by a MOMI device 2200. In these embodiments, the geolocation of an individual item may be better estimated than merely using the geolocation of the aggregator device 104. The time-stamp may be reported by the tracking device or may be obtained from the clock 2116. In embodiments, the tracking module 2130 may include other data in a tracking event record, such as sensor measurements obtained in a message and/or read from the environment sensors 2112. The tracking module 2130 may output a tracking event record to the reporting module 2138 and/or may write the tracking event record to the storage device 2114. Additionally or alternatively, the tracking module 2130 may maintain data logs, such as tracking logs, temperature logs, light logs, ambient pressure logs, and the like. The tracking module 2130 may write these data logs to the storage device 2114, where the data logs are reported to a backend server 120 (or another suitable device) by the reporting module 2138.

In embodiments, the monitoring system 2132 monitors one or more conditions to determine the existence of an incident. An incident may be any condition that is deemed to be notable (e.g., by an expert and/or learned from training data sets that includes training data sets relating to incidents and training data sets relating to non-incidents). In some embodiments, the monitoring system 2132 may apply rules-based logic to determine if one or more conditions are met that trigger an environmental incident. In embodiments, the monitoring system 2132 may monitor the environment of the aggregator device 104 to determine if there are any environmental incidents (e.g., the temperature is too high or too cold, the humidity is too high, etc.). In these embodiments, the monitoring system 2132 may leverage the machine learning module 2136 to obtain classifications or predictions regarding the environment, such as trends in the sensor data that may indicate that an environmental incident has been triggered (classification) or likely to be triggered (prediction). In these embodiments, the monitoring system 2132 may provide sensor data to the machine learning module 2136, which leverages one or more classification models trained to classify environmental incidents and/or one or more prediction models trained to predict whether an environmental incident is likely based on the sensor data. In the event the monitoring system 2132 determines that there is an environmental incident or one is likely, the monitoring system 2132 may generate an incident record. In these embodiments, the incident report may include the type of incident (e.g., the type of environmental incident) that was determined, classified, or predicted, the data that was read to determine, classify, or predict the incident, and a timestamp.

In embodiments, the monitoring system 2132 may monitor one or more items to determine if a label having visual indicia or a tracking device has been missing, damaged, or otherwise not readable or not reporting. In these embodiments, the monitoring system 2132 may receive input from the machine vision module 2134 and/or the tracking module 2130 to determine if a visual indicia or tracking device has been missing, damaged, or otherwise unreadable or not reporting. In some embodiments, the monitoring system 2132 may receive tracking data from the tracking module 2130 and a value read from a visual indicia from the machine vision module 2134. If the monitoring system 2132 receives a value but does not receive corresponding tracking data, the monitoring system 2132 may determine that the item associated with a value does not have a tracking device or the tracking device is not responding. Similarly, if the monitoring system 2132 does not receive tracking data from the tracking module 2130, but does receive a value from the machine vision module 2134, the monitoring system 2132 may determine that the item associated with a value does not have a tracking device or the tracking device is not responding. In some embodiments, the monitoring system 2132 may receive reports from the machine vision module 2134 that indicate when a trackable item (e.g., an item that should have a tracking device or visual indicia affixed thereto) is in the field of view of a camera in communication with the machine vision module 2134. In some of these embodiments, the machine vision module 2134 may further provide an estimated distance of the item from the aggregator device (e.g., based on 3D video that includes depth data and a calibration between the camera and the aggregator device). When the monitoring system 2132 does not receive tracking information and the estimated distance is less than the read range of the aggregator device 104, the monitoring system 2132 may determine that the tracking device corresponding to the item is missing, damaged, or otherwise not reporting. Furthermore, if the machine vision module 2134 detects a tracking device affixed to the detected item (e.g., using an image classifier), the machine vision module 2134 can determine that the tracking device is damaged or otherwise malfunctioning. In response to determining that a tracking device is missing, damaged, malfunctioning, or otherwise not readable, the monitoring system 2132 may generate an incident record that is reported to the reporting module 2138 and/or stored in the storage device 2114.

In embodiments, the monitoring system 2132 receives reports of damaged items from the machine vision module 2134. In these scenarios, the monitoring system 2132 may obtain tracking data from the tracking module 2130 and/or from the machine vision module 2134 (i.e., a scanned value). The monitoring system 2132 may generate an incident record that indicates a damaged item event and the tracking data (e.g., a tracking device ID) associated with the damaged item. In embodiments, the monitoring system 2132 may include additional data in the incident record, such as an image of the damaged item. The monitoring system 2132 may report the incident record the reporting module 2138 and/or store the incident record in the storage device 2114.

In embodiments, a machine vision module 2134 receives camera signals from one or more cameras of the aggregator device 104 and/or from one or more external cameras of a vision system 116 that stream camera signals thereto. In these embodiments, the cameras may include, but are not limited to, hi-res video cameras, depth cameras, IR cameras, and/or 3D cameras, and the camera signals may include but are not limited to video signals, depth signals, IR signals, and/or 3D video signals (which may include video data and depth data), and the like.

In some embodiments, the machine vision module 2134 may include one or more image classifiers that are trained to detect one or more conditions based on one or more frames of a camera signal. The image classifiers may be trained to identify trackable items (e.g., trained to identify boxes, specific products, bags, pallets, and the like), items that may have been damaged, visual indicia that are affixed to on an exterior surface of an item, and/or tracking devices that are affixed to on an exterior surface of an item. For example, image classifiers may be trained on images containing items that should be tracked (and images that do not depict any items that should be tracked), images depicting items that have been labeled damaged (and images depicting items that have been labeled as "not damaged"), images depicting items having a tracking device/visual indicia affixed to an outer surface thereof (and images depicting items that do not have a tracking device/visual indicia affixed to a nonoccluded outer surface thereof). Image classifiers may implement any suitable techniques, such as performing feature extraction on images, clustering (e.g., k-means clustering, KNN clustering, and the like) the features of an image with features of labeled images, leveraging image classification models (e.g., one or more of various types of neural networks, regression models, etc.), and the like.

In some embodiments, when a classifier classifies an image as depicting a trackable item (e.g., an item that should have a tracking device and/or a visual indicia affixed thereto), the machine vision module 2134 may report the detection of the item to the monitoring system 2132, regardless of whether or not a tracking device or visual indicia is affixed thereto. Such reporting may serve as notice that an item that should be tracked is in the vicinity of the aggregator device 104.

In some embodiments, when a classifier classifies an image as depicting a visual indicia, the machine vision module 2134 may scan and decode the visual indicia to obtain the value encoded in the visual indicia. In some of these embodiments, the machine vision module 2134 may be implemented with or may communicate with a decoder that decodes the scanned visual indicia (e.g., a bar code decoder or a QR-code decoder). The machine vision module 2134 may output a report of the detection of the visual indicia to the monitoring system 2132 and/or may report the value encoded therein to the tracking module 2130.

In some embodiments, when an image classifier classifies an image as depicting an item that has a tracking device affixed thereto, the machine vision module 2134 may report the detection of the tracking device to the monitoring system 2132. In this way, the monitoring system 2132 may determine whether the tracking device is operating properly, as it should receive tracking data from the detected tracking device.

In some embodiments, when an image classifier classifies an image as depicting a damaged item, the machine vision module 2134 may report the detection of the damaged item to the monitoring system 2132. In some of these embodiments, the image classifier may be trained with labeled sets of training data that include images of items and labels indicating whether the items depicted in the images were damaged or undamaged. During training, the features of these respective images may be extracted and combined with the label (damaged or undamaged) ascribed to the respective image. In some of these embodiments, the labels may indicate the type of damage (e.g., broken seal, ripped packaging, opened packaging, etc.), such that the image classifier may classify the type of damage that is detected. In embodiments, the report may indicate the tracking information corresponding to the tracking device that is associated with the damaged, and in some of these embodiments, the type of damage.

In some embodiments, the machine vision module 2134 may perform video processing/analysis on the received camera signals. In some of these embodiments, the machine vision module 2134 may be configured to determine a distance between a detected item and the aggregator device 104. In some of these embodiments, the vision module 2134 may be configured to receive 3D video streams that include video and depth data. In these embodiments, the 3D video may be analyzed to determine an estimated distance between the camera and a detected item. The machine vision module 2134 may use this value to determine a distance between the item and the aggregator device 104 based on a calibration between the video camera and the aggregator device 104. In some embodiments, the video may be analyzed to determine a size of a detected item, based on for example the location of the detected item in a frame of the video and an intrinsic calibration of the camera that captured the video.

In some embodiments, the machine vision module 2134 may receive range and bearing values determined by a short range communication unit 2106 (e.g., MOMI device of FIG. 20), such that each set of range and bearing values is associated with the tracking information of the tracking device to which the range and bearing values pertain. The range and bearing values may indicate a distance of a tracking device from the aggregator device 104 (and therefore a distance of the item being tracked), and the range may indicate an orientation with respect to the aggregator device 104 (e.g., an angle with respect to a reference line corresponding to the aggregator device 104). In some embodiments, the machine vision module 2134 (or the monitoring system 2132 or the tracking module 2130) may use the range and bearing values along with image classifications to disambiguate two or more items when tracking information is received for two or more items and two or more items are observed in a video frame. In these embodiments, the aggregator device 104 may be calibrated with each camera, which provides the machine vision module 2134 with an orientation of the aggregator device 104 with respect to the field of view of the camera. Thus, the aggregator device 104 may determine which item corresponds to a particular tracking device based on the range and bearing pertaining to the particular tracking device and a video frame that depicts two or more items. In these embodiments, the ability to disambiguate multiple items that are transmitting tracking information provides the aggregator device 104 with improved reliability and cross-validation of tracking data. For example, if a particular item is classified as damaged, the machine vision module 2134 may identify the tracking information of the damaged item when there are multiple items to choose from.

In embodiments, a machine learning module 2136 performs machine learning and artificial tasks on behalf of the aggregator device 104. In some embodiments, the machine learning module 2136 may implement the TensorFlow library. In embodiments, the machine learning module 2136 may train models that are used by the aggregator device 104. Additionally or alternatively, the machine learning module 2136 may obtain trained models from a backend server 120 that trains models based on expert generated training data sets and/or training data sets that are received from one or more aggregator devices 104. In these embodiments, the backend server 120 may maintain a library of models that can be used for various artificial intelligence-based tasks. In embodiments, machine learned models may include neural networks (e.g., recurrent neural networks, convolutional neural networks, deep neural networks), regression based models, Hidden Markov models, Bayesian models, decision trees, and the like. In embodiments, these machine learned models may include models of deployment configurations that may be used to configure the aggregator device 104. The models may additionally or alternatively include image classification models, environment prediction models, environment classification models, and the like.

In embodiments, the machine learning module 2136 may use inputs from the tracking devices, such as the tracking information and range and bearing values, and/or input from a camera (e.g., 3D camera) to train and/or leverage models that are used to configure the aggregator to accurately read and disambiguate items that are being tracked. In embodiments, the machine learning module 2136 may further use GPS, cellular data, and/or WIFI data to auto-configure the aggregator device 104.

In some embodiments, the machine learning module 2136 may leverage classification or prediction models that are trained to classify or predict changes in the environment of the aggregator device 104 and/or changes in the sensors of the aggregator device 104. In these embodiments, the machine learning module 2136 may obtain sensor data from the environmental sensors 2112 and/or from tracking devices and may input the sensors data to classification models and/or prediction models to determine changes in the environment or the sensors 2112 of the aggregator device 104. Furthermore in embodiments, the machine learning module 2136 may use outcomes associated with those predictions or classifications (e.g., user provided outcomes) to reinforce/retrain the models.

In embodiments, the machine learning module 2136 may leverage models and/or a set of rules to improve accuracy of error handling. Exceptions are conditions that have been previously classified as being normal. Examples of exceptions include misreading of tracking data and/or visual indicia, ambiguity regarding an identification (e.g., two packages are touching one another), and/or a package is only slightly damaged. In embodiments, the machine learning module 2136 may execute a classification algorithm that feeds into a rules-based exception handler. These rules may be hard coded by a developer and/or may be learned based on analytics. For example, the machine learning module 2136 may record how one or more humans handle certain exceptions, such that the machine learning module 2136 (or a backend system 120) may learn the rules for handling exceptions based on the human activity.

In embodiments, the machine learning module 2136 may be configured to detect changes in the RF environment of the aggregator device and to compare the changes against a knowledge base of known changes. In these embodiments, the machine learning module 2136 may sample frequencies and signal strengths in the environment of the aggregator device and may analyze the sampled frequencies to determine if there is a change in the RF environment (e.g., signals that were always detected in the signal noise are no longer being detected). In some of these embodiments, the machine learning module 2136 may compare these changes against a knowledge base of signal samples and signal sample trends to diagnose the cause of the change.

The machine learning module 2136 may be used to perform additional or alternative machine learning tasks in connection with an environment being tracked. These tasks may be domain-specific, as certain tracking features (e.g., monitoring consumer engagement in a retail segment) require different types of models and algorithms than others (e.g., monitoring packages in a shipping facility).

In some embodiments, the machine learning module 2136 may operate with the backend server to optimize communications with the backend server 120. In these embodiments, the machine learning module 2136 may use prediction models to predict the optimal time to transmit individual or batches of tracking records and/or data logs, such that the prediction model is trained to determine when the backend server will consume said data.

In embodiments, the reporting module 2138 reports data to an external device (e.g., a backend server 120 and/or a computing infrastructure of a business entity). In embodiments, the reporting module 2138 may receive tracking event records from the tracking module 2130 and may forward the tracking event records to an external device via the long range communication unit 2104. In embodiments, the reporting module 2138 may report tracking records in batches. In some of these embodiments, the reporting module 2138 may maintain a cache that stores the tracking event records, such that the reporting module 2138 may periodically batch report the tracking event records in the cache to an external device. In some embodiments, the tracking event records are stored in the storage device 2112, such that the reporting module 2138 periodically retrieves a batch of tracking event records, and reports the batch of tracking event records to an external device. The reporting module 2138 may report a batch of tracking event records at the request of the external device (e.g., in response to receiving a request to report unreported tracking event records), at predetermined times (e.g., every ten minutes), or in response to a triggering condition (e.g., the cache is full).

In embodiments, the reporting module 2138 may report other data as well. For example, the reporting module 2138 may report data logs to an external device (e.g., backend server 120 or a computing infrastructure of a business entity). In other embodiments, the reporting module 2138 may report incident records. In these embodiments, the reporting module 2138 may receive the incident record from the monitoring system 2132 and may transmit the incident record to an external device and/or may be reported as a notification to a specific person or set of people.

In embodiments, the reporting module 2138 may report data to a robotics system that is in communication with the aggregator device. For example, in automated shipping facilities the reporting module 2138 may receive sensor measurements from the environmental sensors 2112 and/or from reporting tracking devices and may transmit environmental sensor data to the robotics system, which may then take appropriate action based on the sensor data (e.g., shut down the line in response or adjust an environment condition in response to sensor data that is indicative of an adverse condition). In these embodiments, the reporting module 2138 may report additional or alternative data to a robotics system. For example the reporting module 2138 may report incident records, data logs, and/or tracking event records to the robotics system.

The aggregator device 104 may include additional or alternative components not discussed herein. For example in some embodiments the aggregator device 104 may be configured to detect the presence of display devices (e.g., smart monitors, smart televisions, wearable devices, or mobile devices) and to connect to the local display devices. In these embodiments, the aggregator device 104 may be configured to load balance and assign work orders to the local display devices.

Referring back to FIG. 1, the aggregator devices 104 may be placed in different types of settings. These settings include manufacturing facilities, shipping vehicles, shipping facilities, warehouses, delivery vehicles, and retails settings. Depending on the setting, the aggregator device 104 may perform different functions. For example, in a shipping facility setting, an aggregator device may ingest video (e.g., 3D video) from one or more cameras that monitor a conveyer belt that routes packages. The aggregator device 104 may read tracking devices and/or visual indicia of packages, and may determine range and bearing of package. The aggregator device 104 may use this information to route packages, track packages, and/or identify damaged packages or tracking devices.

In embodiments, an aggregator device 104 may be placed in a retail setting, whereby the aggregator 104 may track the location of items in the retail setting. In these embodiments, as consumers shop in the store, they may be carrying user devices that report their respective locations and/or are trackable by the aggregator device 104 (by for example a module in the operating system of the user device). In this way, the aggregator device 104 or the backend server system 120 may be able to determine which items are looked at the most, which areas in the store receive the most traffic, and the like.

In embodiments, the tracking system 100 may communicate with the backend server system 120 via a communication network 190 (e.g., the Internet and/or a cellular network). The tracking system 100 may communicate location data to the backend server system 120 that indicates a geolocation and/or approximate locations of the one or more devices of the tracking system 100. For example, the tracking system 100 may communicate location data to the backend server system 120 that is obtained by a multi-mode tracking device 102 or a paired tracking device 106 based on the GPS signal received by the device or a triangulation calculation based on signal strengths of received electromagnetic signals (e.g., WIFI signals and/or cellular signals). In another example, the tracking system 100 may communicate beacons collected from passive tracking devices 108 to the backend server system 120. In this example, the backend server system 120 or another tracking device (e.g., aggregator device 104 or multi-mode tracking device 102) can estimate a location of a respective passive tracking device 108 based on the receipt of a beacon (e.g., a device ID of the passive tracking device 108) from a tracking device and a known location of the tracking device (e.g., obtained from a GPS signal or triangulation techniques). The tracking system 100 may communicate additional types of data, as was described above. For example, the tracking system 100 may one or more of communicate time stamps corresponding to when a particular data item was sampled, temperature data, ambient light data, humidity data, motion data and the like.

The backend server system 120 may receive the location data temperature data, time stamps, ambient light data, humidity data, motion data and/or other suitable types of data and may perform any variety of operations based thereon. In embodiments, the backend server system 120 is configured to support inventory tracking. For example, the backend server system 120 can verify that no inventory is currently missing from a shipment of goods. Additionally or alternatively, the backend server system 120 may be configured to manage the movement of items, checking-out of items, checking-in of items, or other similar actions performed with respect to items from a group of items (e.g., stored medical supplies). In embodiments, the backend server system 120 is configured to maintain logs and/or databases corresponding to data collected from tracking systems that track groups of items. For example, the backend server system 120 may maintain an index or log of location data, temperature data, ambient light data, humidity data, motion data, and/or other suitable types of data. In embodiments, the backend server system 120 is configured to support applications executing on a user device 130 and/or an AR-enabled user device 140, as is described below. In embodiments, the backend server system 120 may manage individual devices in a tracking system 100. For example, the backend server system 120 is configured to command an exciter 110 or an aggregator 104 to sample data from the other devices in the tracking system 100. In embodiments, the backend server system 120 is configured to authenticate devices in the tracking system 100, as was discussed above.

In combination, the tracking system 100 and the backend server system 120 may support a number of different applications. The combination may be configured to track inventory or items at facilities, to track shipments of goods (e.g., food, medical supplies, and electronic goods), to support user device and/or AR-enabled user devices, and the like. Different applications of the combination of the tracking system 100 and the backend server system 120 are discussed in greater detail below.

Medical supplies are expensive and keeping inventory may be difficult during times of emergency. The same holds true for other industries, such as high tech test equipment and tools, jewelry, and the like. In some applications, the tracking system 100 may be used to track inventories of medical supplies (e.g., medical devices and/or pharmaceuticals) and other high value items. For example, in some embodiments, the passive tracking devices 108 (and/or the multi-mode tracking device 102 and/or the paired tracking devices 106) are configured such that they can be read by commercially available user devices (e.g., smartphones, tablets, scanners, and the like). The tracking system 100 may be used to make supply room location, checkout, and inventory processes more efficient and reliable.

In embodiments, passive tracking devices 108 be applied to all supply items and in badges of employees. The user device 120 may run an application (native or web-application) that is configured to search for specific items. In these embodiments, the application may adjust the transmit power output by the user device 120 to reduce the search area for localization. For example, the application may adjust the transmit power such that the range of the user device 120 is less than five meters. The application and/or backend server system 120 may utilize a list of device IDs that correspond to specific passive tracking devices 108 (and/or the multi-mode tracking device 102 and/or the paired tracking devices 106), where each device ID may be correlated to a particular item or employee. In this way, the application can read the device IDs of devices in the vicinity of the user device 130 to identify items that are in the vicinity. The application may also be provided an identifier of a particular item, whereby the application can determine whether the particular item is in the vicinity of the user device 130. Once the particular item is confirmed as in the vicinity, the application and/or a gateway device can check out the item and note the employee badge ID.

In some embodiments, the application can control the user device 130 to change a transmitter power of the user device 130 and/or the interrogation rate depending on the proximity to a passive tracking device.

In some embodiments, each passive tracking device 108 may have a two ID's associated therewith: (i) an unencrypted model number or SKU ID; and (ii) an encrypted serialized device ID. The unencrypted ID may be used for searching for a particular item, while the encrypted ID may be used for item inventory management.

In some embodiments, all personnel user devices 130 may be configured with a custom application that reports the location (or approximate location) of any item beacons that the application detects while the user device 130 and/or the item is in motion. The application may send the data to a backend server system 120, which can maintain a location database of all items whether stationary or moving.

In some embodiments, a tracker (e.g., an aggregator 104 or multi-mode device 102 having an exciter 110) may be placed at each entry/exit gateway or hallway. The tracker may be configured to report the device IDs of each passive tracking device 108 it detects. It is noted that a tracker may be said to have detected a passive tracking device 108 upon receiving a beacon that contains a device ID of a particular passive tracking device 108 (which may be associated with an item or an employee). The tracker may report the device ID, a time stamp corresponding to a time at which the device was detected, and/or a location of the tracker when it detected the passive tracking device 108. The tracker may send this data to a backend server system 120, which may maintain a location database of all items that are moving throughout an area (e.g., hospital).

In some embodiments, a tracking system 100 may be used to track items in a personal space of a user (e.g., in a home). Most items in a person's space are not wirelessly visible because it is too expensive to put RF tags on most things. Low cost passive tracking devices 108 can increase the number of tagged items such that they are much more prevalent. However, reading these tags may require some changes to how a user device 130 operates. Also, new applications and cloud-based services may be required.

In some embodiments, a user device (e.g., smartphone or tablet) may be configured to emit RF power in order to power the passive tracking devices 108 before listening for BLE beacons sent from the passive tracking devices 108. The user device 130 can be optimized for powering the passive tracking devices 108.

In some embodiments, the user device 130 may execute an application that is configured to identify (e.g., "sniff") all the passive tracking devices 108 in the vicinity of the user device and to send a list of the device IDs of the identified passive tracking devices 108 to a backend server system 120. Other information such as a location of the user device 130, detected WiFi networks, and the like can help locate the tagged items. The application/backend server system 120 may utilize a list of device IDs that correspond to specific passive tracking devices 108 (and/or the multi-mode tracking device 102 and/or the paired tracking devices 106), where each device ID may be correlated to a particular item or employee. In this way, the application can read the device IDs of devices in the vicinity of the user device 130 to identify items that are in the vicinity of the user device 130. Given the large amounts of data that may be collected when there are lots of passive tracking devices 108 in the vicinity, edge processing may be performed to reduce the amount of data that is required. In some embodiments, machine learning can be used to identify items that don't move much within a space, such that these items may only be reported if they are not found during a particular scan of a particular location.

In some embodiments, the backend server system 130 may maintain an inventory of the items of a user and may maintain a profile of the user. In these embodiments, the backend server system 130 may send targeted advertising emails and text messages to the person based on the inventor and/or profile. For example, upon learning the types of items kept at the user's home or office, the backend server system 130 may determine advertisements of similar products to send to the user.

In some embodiments, the tracking system 100 may be configured to operate in conjunction with AR-enabled devices 140. In embodiments, the passive tracking devices 108 can be read by any BT-enabled and UR-enabled user devices 140 having Bluetooth capabilities, including AR-enabled smart glasses or voice-picking audio headsets. This allows direct reading of passive tracking devices 108 on products from the AR-enabled devices 140, which can then be factored into the process. Supplemental transmitters (e.g., exciters 110) can extend the range of the reading, but this may cause many more passive tracking devices 108 in the vicinity to transmit beacons. In this scenario, an AR-enabled device 140 may be unable to determine which passive tracking devices 108 are in the near vicinity.

In some scenarios, AR-enabled devices 140 may not transmit sufficient power to continually energize passive tags. WiFi access points, Bluetooth base stations, or other RF transmitters, however, may be configured to energize the passive tracking devices 108, while an AR-enabled device can receive the beacons from the passive tracking devices 108. In some embodiments, these AR-enabled devices 140 may contain a Bluetooth receiver configured with angle of arrival detection to triangulate locations of passive tracking devices 108. In some embodiments, the location of each tagged item (e.g., items having passive tracking devices 140 affixed thereto) may be relayed to the AR-enabled device via an AR-enabled device cloud data manager (e.g., a backend server system. The AR-enabled device 140 may compare the tagged item's location with its own location and direction and may display an indicia on a screen of the AR-enabled device to indicate where the item is, when the item is determined to be in the field of view of the AR-enabled device 140.

In embodiments, an AR-enabled device cloud data manager may match up the device ID's of detected passive tracking devices 108 with the associated item's visual identifiers such as shape, size, color, markings, etc. (which may be stored in memory and associated with the device ID). The AR-enabled device 140 may highlight or outline the device in the display of the AR-enabled display 140, and may match any data such as model number, dates, expiration, correct/incorrect item in process, etc.

In embodiments, an AR-enabled device 140 may contain an infra-red or visible light laser that may point to the item being looked at. The AR-enabled device 140 may display a cross hair, outline, or other indicia to indicate the location at which the laser is pointing of where the laser is pointed at. As discussed, a passive tracking device 108 may contain a photo-detector that can detect light levels incident upon the passive tracking device 108. Additionally or alternatively, the passive tracking device 108 may contain a temperature sensor that can detect a rise in temperature when the laser light shines on the device 108 for a period of time. In such configurations, a BLE beacon may contain a field for the photodetector light intensity state/value and/or the temperature value. The reported Lux values can be self-normalizing for different light conditions when reading the BLE beacon before pointing the laser and while pointing. Modulating the light and implementing a low power modulation detector (e.g., max min values over a short time frame (e.g., 100 msec)) may further identify the specific item being illuminated. The infrared light can penetrate through some packaging materials, such that even embedded passive tracking devices 108 may be identified.

In embodiments, a low power accelerometer (e.g., MEMS accelerometer) may be embedded in the passive tracking device 108. When the tagged item is detected by an AR-enabled device 140, the passive tracking device 108 may report its motion in the beacon. The AR-enabled device cloud data manager may relay such detection to the AR-enabled device 140 as an identification input.

In some embodiments, an AR-enabled device 140 may be configured to track a user's eye gaze. In tracking the user's eye gaze, the AR-enabled device 140 may determine a more accurate location at which the user is staring. In these embodiments, the AR-enabled device 140 may be configured to display a detected item, only when the user is staring in the direction of the detected item.

In some implementations, the tracking system 100 and/or backend server systems 120 may be configured to maintain temperature logs on behalf of passive tracking devices 108. Traditional temperature monitoring tags are read infrequently and thus need batteries to sample at regular intervals and store the data in a log. Purely passive devices are unable to sample and store when no power source is available. Thus, in embodiments, the passive tracking devices 108 may be energized periodically for the purpose of obtaining temperature data that can be used by an upstream device (e.g., an aggregator device, a multi-mode tracking device 102, and/or a backend server system 120) to maintain temperature logs on behalf of the tracking devices 108. If passive tracking devices 108 are read more often, then the passive tracking devices 108 can take temperatures samples while energized and send the values out in respective beacons. A tracker (e.g., aggregator device 104 and/or a multi-mode tracking device 102) can send the sampled value, a time stamp, and location information to the backend server system 120. The backend server system 120 and/or the tracker may utilize this information to maintain a temperature log for each respective passive tracking device 108. While this is not a regular sampling, and only some passive tracking devices 108 may be read at any given time, cloud data analysis can group readings from passive tracking devices 108 and reconstruct the temperature and location history of a whole group of passive tracking devices 108.

In general, asset trackers rely on connectivity for location. Asset trackers may use a combination of GNSS, WiFi, Cellular and Bluetooth connectivity to obtain and transmit location information. These services are not always available and may unnecessarily consume power and resources. To mitigate these issues, in some embodiments, the tracking system 100 may implement inertial measurement unit (IMU)-based activity detection and tracking. In the same way that personal wearable activity trackers determine when a wearer is swimming, walking or running, the device in the tracking system 100 would detect activities related to asset movement. In these embodiments, the tracking algorithms may be designed, for example, to: detect that an asset is being loaded or unloaded from a delivery truck or van; detect that an asset is loaded in a pallet; detect that a pallet is being built up; detect that a pallet containing an asset is being wrapped or finished up; detect that a tracking device in a pallet is moving in a warehouse; detect that a person picks up and carries the asset; detect that an asset is dropped from a height; and the like. In some of these embodiments, the backend server 120 and/or the tracking devices may sample the motion data reported by the tracking devices and may compare the motion data to different motion signatures to classify the type of movement. The system may implement one or more machine-learned models (e.g., neural networks) to classify the types of movement.

In some scenarios, radios integrated into low power battery-operated consumer or industrial devices need to be turned on periodically to communicate data or acquire location. A radio integrated into such a device does not always have connectivity, and as such, may waste energy. Thus, in some embodiments, tracking system 100 that implements activity detection may be used to characterize the radio connectivity of an environment, building, and storage facility in terms of activity detection. As the tracking system 100 collects more data it will improve its prediction of when a particular radio can be turned on to have a higher chance of obtaining connectivity. This knowledge can be used to train other asset trackers within the same system, obtaining immediate results without previous training. For example, a tracking device (e.g., a multi-mode tracking device 102) may be trained to detect when it is being loaded into a truck for the first time, when it has a high chance of connecting to obtaining WiFi connectivity but not LIE connectivity, and the like. Based on the activity detection, the tracking device (e.g., a multi-mode tracking device 102) may turn its WiFi capabilities on or off. In another example, a tracking device associated with an asset carried on a train may determine that it has a low probability to obtain GNSS location. As such, the tracking device may never turn on its radio until the asset is determined to be no longer on the train.

In some embodiments, the tracking devices (e.g., passive tracking devices 108 or paired tracking devices 106) in the tracking system 100 may implement antenna diversity management in order to maximize power efficiency. In these embodiments, BLE beacons that support antenna diversity transmit the antenna being used in the advertising package. A receiver from a receiving device (e.g., an aggregator 104) answers with an advertising response that contains the receive RSSI and antenna used by the transmitted beacon. The tracking device (e.g., passive tracking device 108 or paired tracking device 106) uses this data to select the best antenna for transmitting, whereby the device only transmits on the selected antenna for the next few (e.g., five) beacons, until the RSSI changes significantly or the device doesn't obtain a response.

In some scenarios, it is difficult to locate an asset while moving through a supply chain or while in storage. Tracking devices today rely on individual "knowledge" of an asset's location. There can be many tracker devices deployed in a single location to track assets at any given time, but these tracking devices do not rely today on a shared knowledge.

In some embodiments, the tracking system 100 may be configured to share intelligence of individual tracking devices and/or data points collected by the tracking devices to improve the location accuracy of nearby assets. For example, the tracking devices may share pressure sensor data among many tracking devices. Low cost atmospheric pressure sensors provide relative pressure measurements. The relative nature of the data does not allow the tracking system to determine how high a pallet is stored in a warehouse, for example. By sharing the data of many other asset tracking devices nearby, the backend server system 120 can create a virtual map of a space. In embodiments, the map may be augmented by merging other sources of sensor data. For example, assets move on a warehouse at two levels, we can infer two floors. Moreover, stationary assets have different pressure readings in between these two levels. In this example, the backend server system 120 can statistically infer pallet height or storage shelf height above the levels. Such estimations can be calculated more accurately as more data is collected. The dimensions to create a virtual map can be given by orientation, acceleration, bearing, temperature, pressure, humidity, ambient light, radio-based geolocation, laser interferometry, and the like.

It is desired to be able to track devices in many different environments, and not just in controlled environments such as shipping environments or storage environments. The issue that arises, however, implementing tracking infrastructure across many different environments is an expensive approach and, due to power concerns, not always feasible. Thus, in some embodiments, user devices 160 may be configured to discover tracking devices (e.g., passive tracking devices and/or powered tracking devices) associated with tracked items and may report the discovery of such to a backend tracking system 120.

In some embodiments, the tracking devices may discover a tracking device (powered or passive) when it receives a short message from the tracking device. In embodiments, the tracking devices include powered tracking devices that are configured to periodically announce their presence by emitting a short message containing a device identifier of the tracking device and any other suitable data. In some embodiments, the tracking devices included passive tracking devices. In these embodiments, the passive tracking devices may be energized by another device (e.g., by an RF signal emitted by the other device) and in response to being energized may emit a short message containing a device identifier of the tracking device and any other suitable data. In these embodiments, user devices 160 may be configured to periodically emit a signal that energizes passive devices in its proximity. As a user of the user device 160 moves (e.g., walks, runs, bikes, etc.) through an environment having a tracked item or as a tracked item moves into the environment of a user device 160, the user device 160 may energize the passive tracking device, which emits the short message, in either scenario, a tracking device may transmit a short message containing beacon data such as a device identifier of the tracking device and any other suitable data. In response to receiving a short message from the tracking device, the user device 160 may push any beacon data received from a discovered tracking device to a backend tracking system 120. For example, the user device 160 may transmit the device identifier of the tracking device and any other data contained in the short message to the backend tracking system 120. In embodiments, the user device 160 may also communicate its geolocation (e.g., a geolocation obtained from the GPS system of the user device 160) with the beacon data to the backend tracking system 120.

In embodiments, the backend tracking system 120 may maintain a location profile for all BLE beacon tagged items. In embodiments, a location profile may correspond to an item being tracked. The location profile may indicate a set of one or more tracking devices that are associated with the tracked item (e.g., device identifiers of any items associated with the tracked item), geolocations of respective user devices 160 when they discovered a tracking device associated with the tracked item, and for each respective geolocation, a time stamp indicating when the reporting user device 160 reported the discovery of a tracking device that is associated with the tracked item. The location profile may include additional metadata as well, including a device type and/or device identifier of the user device 160 that reported a discovery, the device identifier of the tracking device that transmitted the short message to the user device 160, and/or the like in embodiments, the backend tracking system 120 may update a location profile of a tracked item in response to receiving a device identifier of a tracking device and a geolocation of a user device 160 from the user device 160. In some of these embodiments, the backend tracking system may aggregate the data in the location profile of a tracked item to determine any number of suitable insights on the tracked item. For example, the backend tracking system may determine a most recently known location of a tracked item, a route of a tracked item, patterns relating to the movement of a tracked item, and the like. The foregoing techniques may be applied to consumer items and/or industrial items.

In some cases, tracked items may be in areas that are not typically populated with user devices 160 or in areas where power issues are not of concern. For example, tracked items may be in environments such as industrial environments, manufacturing environments, shipping environments, and/or supply chain environments. Thus, in some embodiments, specialized location collector node devices (or "collector node devices"), such as fixed mount or mobile tracking devices may be installed in areas where more precise and timely location information is desired. The collector node devices may operate in the same manner as the user devices 160 described above, in that a collector node device may receive a short message emitted by a tracking device that includes beacon data that indicates a device identifier of the tracking device. In response to receiving a short message, the collector node device may report the device identifier of the tracking device and a geolocation location of the collector node device to the backend tracking system 120. The backend tracking system 120 may receive the device identifier of the tracking device and the geolocation of the collector node device and may update a location profile of a tracked item, in the manner described above.

Furthermore, in embodiments, multiple collector node devices may be placed in the same environment and may have overlapping communication ranges, so as to improve the accuracy of a location estimate of a tracked item. For example, two collector node devices may be placed at either side of a room, whereby a tracking device in the middle of the room may be in the communication range of both collector node devices, but a tracking device at either end of the room may only be in the communication range of one of the collector node devices. Thus, when the tracking device emits a short message that indicates the device identifier of the tracking device and both collector node devices report such an event to the backend tracking system 120, the backend tracking system 120 may determine that the tracking device is near the middle of the room; whereas when only one of the collector node devices report such an event, the backend tracking system may determine that the tracking device is at one of the ends of the room.

In embodiments, the collector node devices are powered by a wired connection to a power source, and as such may be implemented with a higher powered RF transmitter. In this way, the collector node devices may extend the read range of the collector node device and may detect a greater amount of tracking devices in the vicinity of the collector node device.

In some scenarios, however, the available RF energy in an environment may not be sufficient to energize a passive tracking device, or even if sufficient, the collector node device may have to harvest energy for a long time between every passive tracking device. In some embodiments, the tracking system may include RF illuminators. The RF illuminators may be placed in locations to extend the tag energizing range and/or to enable more user devices 160 to receive short messages from passive tracking devices. In embodiments, RF illuminators may be a simple transmit only devices that do not communicate with a network. In some embodiments, the illuminators may include a wired power source (e.g., a wall outlet) or a portable power source (e.g., battery). The illuminators may transmit at a frequency selected from multiple different frequencies to provide the greatest amount of RF energy without interfering with other bands. In embodiments, the illuminators may use directional antennas to create desired energizing zones, whereby a tracking device that enters a desired energizing zone may broadcast the short message to any user device 160 within a receiving range of the tracking devices. It is noted that the receiving range is typically greater in radius than the energizing zone. Therefore, user devices 160 that are outside of the energizing zone may still be located in the receiving zone.

In embodiments, the illuminators may include sensors and/or network interface devices to enable additional features. In embodiments, the illuminators may include network interface devices to enable communication with the backend tracking system and/or other illuminators. In these embodiments, the backend tracking system and/or another illuminator may transmit a command to the illuminator to begin emitting the RF energy signal or to stop transmitting the RF energy signal. In embodiments, the illuminator may include one or more motion sensors, whereby once motion is detected in the vicinity of the illuminator, the illuminator may begin emitting the RF energy signal. In these embodiments, the motion sensor triggers the illuminator to begin energizing potential tracking devices in the vicinity, only when there is motion detected, so as to record any tracking items that have recently entered the energizing zone of the illuminator. In embodiments, the illuminators may also transmit commands to the passive tracking devices over the RF energy signal. These commands may include requests for specific types of data (e.g., temperature data or light data) collected by sensors that are integrated into the tracking devices.

In embodiments, the tracking devices may include embedded sensors, such as temperature sensors, humidity sensors, light sensors, inertial sensors, shock sensors, and/or chemical sensors. These sensors collect and store data until a communication link is established, thereby allowing the collected data to be uploaded. These tracking devices, however can be much more expensive than passive tracking devices without sensors and may require expensive WAN cellular models or may require an infrastructure of readers to download the collected data from the tracking devices. A passive tracking device does not typically have the capability to store sensor data, even when the tracking device has enough RF energy harvested to take a sample from a sensor.

To assuage these concerns, in some embodiments, the various sensors may be designed to embed and operate in a passive tracking device. In these embodiments, a passive tracking device may be configured to transmit the sensor data immediately and repeatedly when there the passive tracking device has harvested sufficient power to transmit this data. The sensor data is collected by any user device 160 within receiving range of the passive tracking device. Thus, any user device 160 that is within the proximity of a passive tracking device may receive the sensor data from the passive tracking device and may upload the collected sensor data to the backend tracking system 120. While the likelihood of any one user device 160 receiving a short message containing the collected data is relatively low and random, the aggregated data log from the user devices passing by and uploading the sensor data to the backend server may nevertheless provide ample data.

One issue that arises with the user of user devices 160 to track tracking items/tracking devices is that the locations of the user devices 160 does not give the full picture of temporal events at certain types of locations or events, such as concerts, lunch wagons, kiosks, emergency response events, and the like.

In embodiments, the passive tracking devices may be configured to provide contextual data in a short message. Contextual data may include a code or other indicia that provides temporal information at a given location. Passive tracking devices (e.g., tags) applied to application-specific vehicles such as fire engines, ambulances, police cars, busses, lunch wagons, delivery trucks, etc., may provide temporal information that would not be available otherwise. Similarly, tags applied to temporary structures (e.g., concert venues, kiosks, race finish lines, etc.) may provide advertising opportunities for business on social media and/or may provide contextual information for tagged items.

In certain scenarios, it may be desirable to tag important items, such as important documents that require visual signage and/or notary authentication or valuable items such as jewelry, artwork, and expensive clothing items that may require certificates of authenticity. In embodiments, a tracking device may be configured to perform authentication using a distributed ledger, such as Blockchain. In these embodiments, a passive tracking device (e.g., a tag) may include a device identifier or other value that corresponds to an entry that is stored on the distributed register, whereby the entry associates the passive tracking device with a party (e.g., a signer of the document, a maker of a work of art, the issuer of a bond, the seller of an expensive clothing item). In this way, a party wishing to establish authenticity may adhere a passive tracking device (e.g., a tag) to an important item that is being provided to another party. The other party may scan the passive tracking device to authenticate the item. For example, in response to scanning the item with a user device 160, the user device 160 may request that a device storing a cryptographic ledger corresponding to the tag verify that there is a block having the device identifier or other indicia associated with the tag, and that the tag is associated with the party establishing the authenticity.

In some embodiments, passive BLE tags (such as the passive tracking devices discussed above) may be configured as low cost hardware crypto wallets. In these embodiments, a passive BLE tag may store one or more private keys/public keys of an owner of the tag, whereby the private keys are associated with credit card and/or crypto currency accounts of the user. The BLE tag may be energized/scanned at a point of sale, which may prompt the user to authorize a transaction with respect to an account of the user that is associated with the tag.

Detailed embodiments of the present disclosure are disclosed herein; however, it is to be understood that the disclosed embodiments are merely exemplary of the disclosure, which may be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure.

The terms "a" or "an," as used herein, are defined as one or more than one. The term "another," as used herein, is defined as at least a second or more. The terms "including" and/or "having," as used herein, are defined as comprising (i.e., open transition).

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platforms. A processor may be any kind of computational or processing device capable of executing program instructions, codes, binary instructions and the like. The processor may be or may include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor, or any machine utilizing one, may include non-transitory memory that stores methods, codes, instructions and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, Internet server, intranet server, cloud server, and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, Internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or intangible items from one state to another. The methods and systems described herein may also transform data representing physical and/or intangible items from one state to another.

The elements described and depicted herein, including in flowcharts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flowchart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium. The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples but is to be understood in the broadest sense allowable by law.

The use of the terms "a" and "an" and "the" and similar referents in the context of describing the disclosure (especially in the context of the following claims) is to be construed to cover both the singular and the plural unless otherwise indicated herein or clearly contradicted by context. The terms "comprising," "having," "including," and "containing" are to be construed as open-ended terms (i.e., meaning "including, but not limited to,") unless otherwise noted. Recitations of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one skilled in the art to make and use what is considered presently to be the best mode thereof, those skilled in the art will understand and appreciate the existence of variations, combinations, and equivalents of the specific embodiment, method, and examples herein. The disclosure should therefore not be limited by the above-described embodiment, method, and examples, but by all embodiments and methods within the scope and spirit of the disclosure.

Any element in a claim that does not explicitly state "means for" performing a specified function, or "step for" performing a specified function, is not to be interpreted as a "means" or "step" clause as specified in 35 U.S.C. § 112(f). In particular, any use of "step of" in the claims is not intended to invoke the provision of 35 U.S.C. § 112(f).

Persons skilled in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A passive tracking device comprising:
a first antenna that transmits response signals in a first frequency band;
a second antenna that receives energizing signals in a second frequency band;
an energy harvesting module that receives an energizing signal from a remote device via the second antenna and converts the energizing signal from RF electrical energy to DC electrical energy that energizes the passive tracking device;
a transmission module that modulates a response signal for transmission in the first frequency band and outputs the modulated response signal to the first antenna for transmission in accordance with a communication protocol, wherein the response signal includes a message indicating a device identifier of the passive tracking device;
a sensor module including one or more sensors, wherein, in response to being energized by the energy harvesting module, the sensor module outputs sensor data generated by the one or more sensors to the transmission module and the transmission module includes at least a portion of the sensor data in the modulated response signal for transmission via the first antenna, wherein the transmission module includes at least a portion of the sensor data in the modulated response signal when a value of the sensor data satisfies a predefined condition.

2. The passive tracking device of claim 1, wherein the one or more sensors includes one or more of a temperature sensor, a light sensor, a sound sensor, a humidity sensor, a motion sensor, a shock sensor, and an acceleration sensor.

3. The passive tracking device of claim 1, wherein the transmission module includes a temperature value obtained from a temperature sensor in the modulated response signal when the temperature value exceeds an upper threshold.

4. The passive tracking device of claim 1, wherein the transmission module includes a temperature value obtained from a temperature sensor in the modulated response signal when the temperature value is less than a lower threshold.

5. The passive tracking device of claim 1, wherein the transmission module includes sensor data generated by the one or more sensors in the modulated response signal when a value of the sensor data has met and/or exceeded a threshold.

6. The passive tracking device of claim 1, wherein the transmission module refrains from including the sensor data in the response signal when the predefined condition is not satisfied by the sensor data.

7. The passive tracking device of claim 1, wherein the transmission module is a first transmission module, the response signals are first response signals, the energizing signals are first energizing signals, the communication protocol is a first communication protocol, the message is a first message, and the device identifier is a first device identifier.

8. The passive tracking device of claim 7, wherein:
the first transmission module modulates the first response signal and outputs the modulated response signal to the first transmission module when the passive tracking device operates in a first mode; and
the sensor module outputs sensor data to the first transmission module when the passive tracking device operates in the first mode.

9. The passive tracking device of claim 8, further comprising:
a third antenna that both transmits second response signals and receives second energizing signals in a third frequency band;
a second transmission module that prepares a second response signal for transmission in the third frequency band and facilitates transmission of the prepared second response signals by toggling impedance of the third antenna when the passive tracking device operates in a second mode in accordance with a second communication protocol, and wherein the second response signal includes a second message indicating a second device identifier of the passive tracking device; and
a mode selection module that determines whether the passive tracking device is to operate in the first mode or the second mode based on a received energizing signal from a remote device via the second antenna and/or the third antenna.

10. The passive tracking device of claim 9, wherein:
the first communication protocol is one of a Bluetooth, Bluetooth Low Energy, or Wi-Fi communication protocol;

the first frequency band is suitable for carrying signals in accordance with the one of Bluetooth, Bluetooth Low Energy, or Wi-Fi communication protocol;
the second frequency band is equal to the first frequency band;
the second communication protocol is an RFID communication protocol; and
the third frequency band is suitable for carrying signals in accordance with the RFID communication protocol.

11. The passive tracking device of claim 10, wherein the first frequency band and the second frequency band are substantially equal to 2.4 GHz and the third frequency band is substantially equal to 900 MHz.

12. The passive tracking device of claim 10, wherein the second communication protocol is an EPC UHF RFID communication protocol.

13. The passive tracking device of claim 9, wherein the first response signals are modulated and transmitted according to one of a Bluetooth communication protocol, a Bluetooth Low Energy communication protocol, and a Wi-Fi communication protocol while operating in the first mode, and prepares and transmits the second response signals according to an RFID communication protocol while operating in the second mode.

14. The passive tracking device of claim 13, wherein the mode selection module determines to modulate and transmit the first response signals according to the Bluetooth Low Energy communication protocol as a default, unless the energizing signal is received on the third frequency band and contains a recognized RFID command.

15. The passive tracking device of claim 9, wherein the mode selection module determines that the passive tracking device is to operate in the first mode in response to receiving energizing signals in the second frequency band via the second antenna.

16. The passive tracking device of claim 9, wherein the mode selection module determines that the passive tracking device is to operate in the first mode in response to determining that the energizing signal received does not contain an RFID header or command.

17. The passive tracking device of claim 9, wherein the first mode selection module determines that the passive tracking device is to operate in the first mode in response to determining that the energizing signal received does not contain an EPC UHF RFID header or command.

18. The passive tracking device of claim 9, wherein the first transmission module determines when the passive tracking device is to transmit the modulated first response signal based on an amount of energy stored by the passive tracking device.

19. The passive tracking device of claim 18, wherein the first transmission module determines that the passive tracking device is to transmit the modulated first response signal substantially immediately when the amount of energy stored by the passive tracking device exceeds a first power threshold.

20. The passive tracking device of claim 18, wherein the first transmission module determines that the passive tracking device is to transmit the modulated first response signal after a delay when the amount of energy stored by the passive tracking device exceeds a second power threshold and is less than the first power threshold, the second power threshold being less than the first power threshold.

21. The passive tracking device of claim 20, wherein the first power threshold is 0 dBm and the second power threshold is −20 dBm.

22. The passive tracking device of claim 9, wherein the mode selection module determines that the passive tracking device is to operate in the second mode in response to receiving energizing signals in the third frequency band via the third antenna.

23. The passive tracking device of claim 9, wherein the mode selection module determines that the passive tracking device is to operate in the second mode based on contents of the energizing signal.

24. The passive tracking device of claim 23, wherein the mode selection module determines that the passive tracking device is to operate in the second mode in response to determining that the energizing signal includes an RFID-formatted header.

25. The passive tracking device of claim 23, wherein the mode selection module determines that the passive tracking device is to operate in the second mode in response to the energizing signals received containing a complete RFID-formatted message.

26. The passive tracking device of claim 9, wherein the first mode is a default mode of transmission and the second mode is selected by the mode selection module in response to:
receiving the energizing signal in the third frequency band via the third antenna; and
the energizing signal containing an RFID-formatted header and a complete RFID-formatted message containing an EPC command.

27. The passive tracking device of claim 9, wherein the energy harvesting module outputs the DC electrical energy to one or more of first and second transmission modules and the mode selection module.

28. The passive tracking device of claim 9, wherein the first device identifier and the second device identifier are the same.

29. The passive tracking device of claim 1, wherein the sensor module includes a bulk acoustic wave temperature sensor.

30. The passive tracking device of claim 1, wherein the transmission module includes a reference oscillator that is a bulk acoustic wave oscillator.

31. A method performed by a passive tracking device, comprising:
transmitting, via a first antenna, response signals in a first frequency band;
receiving, via a second antenna, energizing signals in a second frequency band;
receiving, via an energy harvesting module, an energizing signal from a remote device via the second antenna and converting the energizing signal from RF electrical energy to DC electrical energy that energizes the passive tracking device;
modulating, via a transmission module, a response signal for transmission in the first frequency band and outputting the modulated response signal to the first antenna for transmission in accordance with a communication protocol, wherein the response signal includes a message indicating a device identifier of the passive tracking device;
outputting, via a sensor module including one or more sensors, in response to being energized by the energy harvesting module, sensor data generated by the one or more sensors to the transmission module and the transmission module includes at least a portion of the sensor data in the modulated response signal for transmission via the first antenna, wherein modulating includes including at least a portion of the sensor data in the modulated response signal when a value of the sensor data satisfies a predefined condition.

* * * * *